(12) United States Patent
Fishel

(10) Patent No.: US 8,740,619 B2
(45) Date of Patent: Jun. 3, 2014

(54) GEOGRAPHY BASED CARD GAME AND METHOD OF PLAY

(71) Applicant: Alan G. Fishel, Vienna, VA (US)

(72) Inventor: Alan G. Fishel, Vienna, VA (US)

(*) Notice: Subject to any disclaimer, the term of this patent is extended or adjusted under 35 U.S.C. 154(b) by 0 days.

(21) Appl. No.: 14/073,675

(22) Filed: Nov. 6, 2013

(65) Prior Publication Data

US 2014/0066154 A1    Mar. 6, 2014

Related U.S. Application Data

(60) Continuation of application No. 12/851,071, filed on Aug. 5, 2010, now Pat. No. 8,602,788, which is a division of application No. 11/065,227, filed on Feb. 25, 2005, now abandoned.

(60) Provisional application No. 60/608,888, filed on Sep. 13, 2004, provisional application No. 60/547,062, filed on Feb. 25, 2004.

(51) Int. Cl.
G09B 19/22    (2006.01)

(52) U.S. Cl.
USPC .......................................................... 434/128

(58) Field of Classification Search
USPC .......... 434/128, 129, 130; 273/292, 297, 300, 273/302, 308
See application file for complete search history.

(56) References Cited

U.S. PATENT DOCUMENTS

| | | |
|---|---|---|
| 229,914 A | 7/1880 | Read |
| 791,118 A | 5/1905 | Wade |
| 1,292,184 A | 1/1919 | Wells |
| 1,745,946 A * | 2/1930 | Murray .................. 273/296 |
| 5,141,235 A | 8/1992 | Hernandez |
| 5,467,997 A | 11/1995 | Bashirzadeh |
| 5,580,252 A | 12/1996 | McCrady |
| 5,690,336 A | 11/1997 | Oliver |
| 5,927,719 A | 7/1999 | Young |
| 6,267,377 B1 * | 7/2001 | Griggs ..................... 273/292 |
| 6,457,716 B1 | 10/2002 | Prillerman |
| 7,029,281 B1 | 4/2006 | Raythen |
| 7,086,865 B2 | 8/2006 | Randhawa |
| 7,520,508 B2 * | 4/2009 | Redd ........................ 273/257 |
| 7,568,703 B1 | 8/2009 | Fernandes |
| 2006/0055111 A1 * | 3/2006 | DeWeese ................. 273/292 |
| 2009/0087820 A1 | 4/2009 | Chandless |
| 2009/0280457 A1 | 11/2009 | Elazari-Volcani |
| 2010/0038853 A1 | 2/2010 | Browne |
| 2010/0289216 A1 * | 11/2010 | Charney .................. 273/237 |

* cited by examiner

*Primary Examiner* — Kurt Fernstrom
(74) *Attorney, Agent, or Firm* — Arent Fox LLP

(57) ABSTRACT

A set of geopolitical cards and methods of play therefore. The set includes a plurality of geopolitical entity cards, each having an associated geopolitical entity represented or associated therewith, along with factual information contained in categories. The set further includes cards containing queries for use in some methods of play, the queries being answerable using the geopolitical entity cards, and cards containing categories of information for use in some methods of play, the categories of information corresponding to categories of the geopolitical entity cards. Variations of play with the cards include dealing cards to each player, and scoring for each player based on play of the game played. In some variations, queries and categories are selected for answers using the geopolitical entity cards. In other variations of play, players' hands are compared to determine scoring and winning.

2 Claims, 17 Drawing Sheets

```
Color-Coded Border reflecting Applicable Continent

Size Rankings      Country Name    Population Rankings

Picture of Flag

Life Expectancy    Capital                       Time Zone

Three Highly Populated Cities in Country (and picture of
location of cities)

Border Countries of Country (and picture of locations of
border countries)

Government

Language

Currency (and picture of currency)

Religions
```

Color-Coded Border reflecting Applicable Continent

Size Rankings      Country Name   Population Rankings

Picture of Flag

Life Expectancy  Capital              Time Zone

Three Highly Populated Cities in Country (and picture of location of cities)

Border Countries of Country (and picture of locations of border countries)

Government

Language

Currency (and picture of currency)

Religions

```
┌─────────────────────────────────────────────────────────────────────┐
│              Color-Coded Border Reflecting Applicable State          │
│                                                                      │
│ Size Ranking              State Name              Population Ranking │
│                                                                      │
│                         Picture of State Flag                        │
│                                                                      │
│                         Statehood Ranking                            │
│                                                                      │
│                         State Capital                                │
│                                                                      │
│ Three Highly Populated Cities in State (and picture of location of cities) │
│                                                                      │
│ Border State of state (and picture of locations of border states)    │
│                                                                      │
│ State Flower   (and picture of state flower)    State Bird (and picture of state bird) │
│                                                                      │
└─────────────────────────────────────────────────────────────────────┘
```

GEOGRAPHY BASED CARD GAME AND METHOD OF PLAY

CROSS-REFERENCED TO RELATED APPLICATIONS

This application is a Continuation of U.S. application Ser. No. 12/851,071, filed Aug. 5, 2010, which is a Divisional of U.S. application Ser. No. 11/065,227, filed Feb. 25, 2005, which claims priority to Provisional Application Nos. 60/608,888, filed Sep. 13, 2004 and 60/547,062, filed Feb. 25, 2004, the disclosure of each of these prior applications being hereby incorporated in their entirety by reference.

BACKGROUND OF THE INVENTION

1. Field of the Invention

The present invention relates to the field of games, and in particular to card games that include play variations based on geography information.

2. Background of the Technology

It is known in the art to provide entertaining card games that have educational features. There is constantly a need for new attractions and features in the games market.

SUMMARY OF THE INVENTION

Among other advantages, the present invention provides a fun and entertaining way of learning geography.

The present invention contains a number of cards for play, or representations thereof, the cards being referred to in one exemplary embodiment (and interchangeably referred to herein) as "GeoPlunge cards." In one embodiment, cards or representations thereof are included, one for each country in the world (e.g., 193 cards for each of 193 countries), with the cards or representations being used in a number of variations of play. In another variation, 50 cards are used, one for each state. Some variations of play include use of cards or representations containing queries, referred to in one embodiment (and referred to interchangeably herein) as "GeoChallenge" cards, as well as cards containing categories of information for certain variations of play, these cards being referred to in one embodiment (and referred to interchangeably herein) as "GeoPower" cards. In one exemplary embodiment of the present invention, 45 GeoChallenge cards and 18 GeoPower cards are included. Other numbers of cards may likewise be used.

Exemplary cards for use with the present invention will now be described in greater detail. In this exemplary embodiment, various information aspects are included on each of the geopolitical entity cards. As will be clear to those skilled in the art, other information details by country or region could similarly be included with the present invention.

In one embodiment, near the top of each GeoPlunge card is the name of the country (listed within a color coded border based on the continent the country is located in), the capital of the country (with a star next to it), and a picture of the country's flag. For the continents, the color coded border is red for Africa, green for Asia, blue for North America, purple for Europe, orange for South America and teal for the Oceanus. (Note that Russia is listed in Asia because most of Russia is located in Asia).

In addition, near the top of each card, listed from left to right, are the country's ranking in size (both within its continent and then within the world), the year (or, if the year is unknown, the approximate time) in which the country gained its independence, and the country's ranking in terms of population (both within its continent and then within the world). Below the size ranking is the life expectancy of the residents of the country, and below the population ranking is the time zone of the country (a positive number listing in the time zone means that the time zone for the country is that many hours ahead of Greenwich time; a negative number listing in the time zone means that the time zone for the country is that many hours behind Greenwich time). If a country is located in more than one time zone, the time zone used is that of the capital of the country.

Below the information for life expectancy, capital and time zone for the country are the listing of three highly populated cities in the country, which are called "3 Top Cities" (however, in some countries less than three cities are listed). These cities, the first of which is listed in red ("Red Top City"), the second in blue ("Blue Top City") and the third in green ("Green Top City") are listed in order from most to least populated. Each GeoPlunge card also lists the border countries for the country. Each card also has a picture of the country, which shows the general location of the border countries. Each GeoPlunge card also includes a listing of the type of government for the country, one or more of the languages spoken in the country, the currency used in the country (including a picture of the currency) and one or more of the religions worshiped in the country. (Note that all pictures included on the cards (e.g., country's flag) are approximations only and are not intended to be to scale).

In other embodiments of the present invention, cities, counties, states or other geopolitical divisions (also interchangeably referred to herein as "geopolitical entities") replace the country cards. The information placed on each card is variable and may reflect any information related to geopolitical entity represented by the card. For example, this information could include, but is not limited to cities, border countries, size ranking, independence date, population ranking, time zone, life expectancy, religions, government, languages, currency, flag, physical features (e.g., rivers, mountain, plains), or birds, mammals, fish, amphibians, population, industry, products, arts, history, science, inventors, authors, or other aspects of the country.

In some variations of play with the present invention, the GeoChallenge cards are used in the GeoPlunge Challenge games to determine which clues will be provided in those games, and the GeoPower cards are used in the GeoPlunge Power games to determine which cards are powerful in those games.

Any number of variations of games may be played with the GeoPlunge cards and these other cards, as described further herein. In general, for some variations, the first player (or first team, if the game is being played with teams) to reach a predetermined number of points (e.g., 50 points for many games in which each GeoPlunge card is a representation of a different state in the United States represent states, and 200 points for many games in which each GeoPlunge card is a representation of a different country) wins. For example, each game may be played one hand a time, with each hand beginning with the players being dealt a certain number of GeoPlunge cards (which number of cards varies depending upon the game). To determine who is the dealer for the first hand of any game, each player randomly draws a card from the GeoPlunge card deck, and whichever player draws the highest ranking size card (Russia has the highest size ranking overall) is the dealer. For subsequent hands, whoever won the prior hand (e.g., won the most points in a hand) is the dealer for the next hand, and if it is a tie for most points, then the dealer for the prior hand deals again. Alternatively, the dealing may pass by rotation or other sequential manner. In some variations, for each game, all of the card decks used are reshuffled after each hand.

The challenge and power cards reflect the information contained on the country cards. If the country cards were replaced by cities, counties, states or other geopolitical divisions, then the challenge and power cards would reflect information related to these geopolitical entities.

Embodiments of the present invention include a method for playing games using the cards of the present invention. The games may also be played with representations of any of the features described. For example, the games are playable in an electronic or partially electronic manner using a terminal, such as a personal computer, microcomputer, minicomputer, mainframe computer, or other device having a processor and display, such as an electronic hand-held game device, for which representative images of cards, and credit for correct answers are displayed on a screen via a graphical user interface (GUI). The games are also playable in conjunction with performance of selected functions on a network, such as the Internet or an intranet or using, for example, a slot machine or other device, including use with other variations of play amenable to the type of machine and preferences or limitations for that machine.

Additional advantages and novel features of the invention will be set forth in part in the description that follows, and in part will become more apparent to those in the art upon examination of the following or upon learning by practice of the invention.

BRIEF DESCRIPTION OF THE FIGURES

In the drawings:

FIGS. 1A and 1B illustrate exemplary front sides for country and state cards respectively, that may be used in one embodiment of the invention.

DETAILED DESCRIPTION

The present invention provides various components and exemplary games playable with the components to provide a fun and entertaining way of learning geography and to provide other features and advantages. To make it easy to understand how to play various games in accordance with the present invention, for each related group of exemplary games (e.g., games that are similar to the other games in the group) described further below, an overview of the general rules that apply to all of the games in the group is provided. The general rules description is followed by a description of the additional exemplary game-specific rules (which, for example, are not covered in the more general rules because they vary by game) for each specific game.

The challenge and power cards used with some games in accordance with embodiments of the present invention reflect the information contained on the GeoPlunge Challenge Cards. In variations in which the cards replaced by other geography based aspects, such as cards based on cities, counties, regions, or other geopolitical divisions, then the challenge and power cards may be varied to reflect information related to these geopolitical entities. FIGS. 1A and 1B illustrate exemplary front sides for country and state cards respectively, that may be used in one embodiment of the invention.

Figure 2:
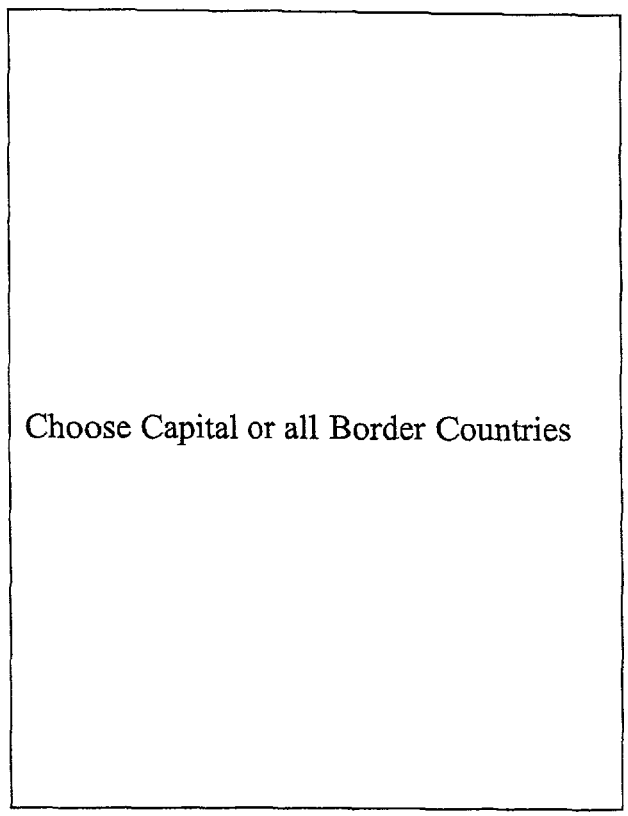
FIG. 2 illustrates an exemplary front side for challenge cards that may be used in one embodiment of the invention.
Figure 3:
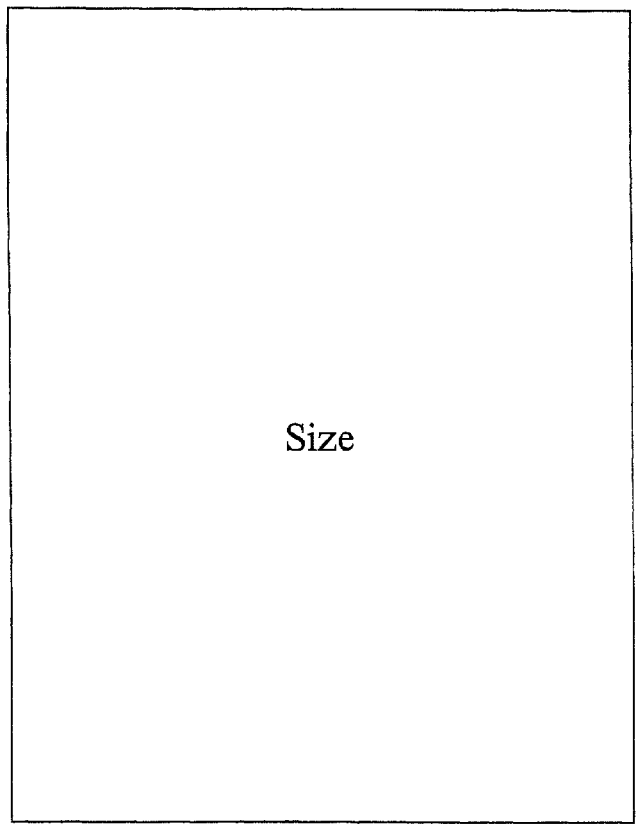
FIG. 3 illustrates an exemplary front side for power cards that may be used in one embodiment of the invention.

In general, with some variations of the present invention, listed variations of play with the GeoPlunge Challenge Cards each involves one or more of the following indicated clue-related features:

No One Chooses
1. No Clue
2. Capital
3. Time Zone
4. Size
5. Population
6. Independence
7. Red Top City
8. Blue Top City
9. Green Top City
10. All Border Countries
11. Life Expectancy and Continent
12. Government
13. Languages
14. Religion
15. Currency Person Guessing Chooses
1. Any 1 Clue
2. Any 1 Clue but Capital
3. Any 1 Clue but Capital or Top City
4. Size and Population or Independence and Time Zone
5. Capital or All Border Countries
6. Size and Independence or Population and Continent
7. Continent and Life Expectancy or Time Zone and Life Expectancy
8. Capital or All Top Cities
9. All Top Cities or All Border Countries
10. Government and Religions or Currency and Languages
11. Red Top City or Size, Population and Independence
12. Blue Top City or Government, Religions and Continent
13. Green Top City or Currency, Languages and Continent
14. Continent or Time Zone
15. Continent and Time Zone or Continent, Number of Border Countries and Life Expectancy Person Giving the Clue Chooses
1. Any 1 Clue
2. Size or Population
3. Population or Independence
4. Size or Independence
5. Time Zone or Continent and Life Expectancy
6. Size or Time Zone and Life Expectancy
7. Population or Government and Languages
8. Independence or Religions and Currency
9. 1 Top City
10. 2 Top Cities
11. 2 Border Countries 12. 4 Border Countries
13. Government or Religions
14. Currency or Languages
15. Government and Currency or Religions and Languages FIG. 3 illustrates an exemplary front side for power cards that may be used in one embodiment of the invention, indicating "size" as the power feature. Other exemplary front sides indicate, for example, Population, Independence, Life Expectancy, Time Zone, or other features relating to the GeoPlunge Challenge Cards. Where the GeoPlunge cards consist of one for each state, the features on the power cards may have front sides indicating, for example, Size, Statehood, or Population or other features relating to the GeoPlunge Challenge Cards In general, with some variations of the present invention, listed variations of play with the GeoPlunge Challenge Cards each involves one or more of the following indicated clue-related features:

No One Chooses
1. No Clue
2. Capital
3. Time Zone and Number of Border States
4. Size
5. Population
6. Statehood
7. Red Top City
8. Blue Top City
9. Green Top City
10. All Border States
11. State Flower
12. State Bird Person Guessing Chooses
1. Any 1 Clue
2. Any 1 Clue but Capital
3. Any 1 Clue but Capital or Top City
4. Time Zone or Number of Borders
5. Capital or All Rankings
6. Flower or Bird
7. One Ranking
8. Two Rankings
9. Flower and Bird or All Border States
10. Red Top City or All Rankings
11. Blue Top City or all Border States
12. Green Top City or Flower and Bird Person Giving the Clue Chooses
1. Any 1 Clue
2. One Ranking
3. Two Rankings
4. One Border State
5. Two Border States
6. One Top City
7. Flower or Bird
8. One Ranking or One Border State
9. Two Rankings or Two Border States
10. Red Top City or Two Rankings
11. Blue Top City or Two Border States
12. Green Top City or Time Zone and Number of Borders Some or all of the geographic entity's size, population, and historical information, such as statehood (e.g., when the state came into the union rankings) are used in play in some games (where the GeoPlunge cards are one for each country, these rankings relate to size, population, time zone, life expectancy and independence). Size with these cards (where there is a card for each state in the United States) refers to land mass, but size can also include the water part of the geographic area for the entity under another version of these games).

In some games, these rankings (such as size, statehood and population rankings where the GeoPlunge cards are each a different state in the United States) are either used in trivia like games to try to guess the geographic area of the card a player is holding, based on clues that provide one or more of the rankings to the guessing player. In some of these games, some of the time the person receiving the clue may have some choice (but usually not total choice) as to what clue to receive and sometimes the person giving the clue may have some choice as to what clue to give (and sometimes will have some choice as to which state to give the clue about) and other times there will be no discretion whatsoever and a certain clue must be given.

In other games, these rankings are used to determine which player has played the better (or best, if there are more than two players) card (or sometimes it will be more than one card) on a trick and therefore wins that trick (and the winner of the most tricks will either directly receive points, or it may be that the winner of the most tricks in a hand (which is comprised of a group of tricks) wins the hand, and points are received for winning the hand). In some games, there are cards (which in one embodiment each say either size, statehood or population (and in a different embodiment each say size, independence, population, time zone, or life expectancy)) that are used to determine which ranking will be the determinative ranking (e.g., size, statehood or population) for that trick, or it may be the determinative ranking for each trick in that hand, such that on each trick in that hand the card's or cards' worth is measured in whole or in part by its relevant ranking. In some of these games, multiple cards that say either size, statehood or population are laid out on the table and each player gets to remove at least one of these cards until only one remains and that remaining card determines what is the relevant ranking for that hand. In other games, one card from the deck that says size, statehood or population is just randomly chosen (usually the then top card in that deck) to determine the relevant ranking. In most games involving tricks, a trick consists of each player, one at a time, playing one card from his or her hand. In some games, players may play more than one card in a trick, and in some games players may not be permitted to play any card on a trick. Also, in some games players may each play his or her card or cards simultaneously during a trick.

In other games, players try to obtain one or more groups of cards that for each group, the group consists of cards that have a certain number (it may be two, three, or it may be more than three, depending on the game) of consecutive numbered rankings for one or more of the types of rankings (e.g., size, statehood or population in one embodiment). For example, a player could have a group of cards that constitute three in a row for size (e.g., $6^{th}$, $7^{th}$ and $8^{th}$ largest states in size), and a separate group that constitutes four in a row for statehood (e.g., the $21^{st}$, $22^{nd}$, $23^{rd}$, and $24^{th}$ ranked cards in statehood (i.e., which reflects when they came into the union). In a different embodiment, the groups the players try to obtain may be close in number, but not necessarily consecutive, in rankings or facts such as size, statehood, independence, time zone or life expectancy).

In other games (e.g., GeoPlunge Challenge Match games), a player will try to "match" the card thrown by another player during a trick to try to win the trick, and to "match" the card thrown by the prior player, a player must throw a card that is one lower or one higher in rank for size, statehood or population than the card thrown by the prior player (and in a different embodiment players try to match by playing a card that is sufficiently close to the card thrown by another player with regard to size, independence, population, time zone or life expectancy). In some of these games another player throwing even later in the trick could still win the trick by throwing a card that "matches" the most recently played matching card in that trick. In the type of game described above, the last person to match during a trick wins the hand. In other types of games, players try to match in a similar way and if they match they get to discard a certain number of cards including some or sometime all of the matching cards and the first player to discard all of his or her cards would win the hand or game. In other games, there is also a combination with the games in which players try to guess the other players' cards in that players first do some guessing of some of each other's cards to determine how many cards each player will start with during the matching part of the game.

In other games, there is a combination where a player can play one or more of his or her ranking cards to help determine which ranking will then be powerful for a trick, and it may even vary within a trick.

In some games, players may risk (e.g., in effect wager) some of their other cards on a certain trick (the winner of which will be determined by who has the better (although it can also be played with who has the worst) card or group of cards, out of the then selected cards, in the relevant ranking) and the relevant ranking will be determined by some type of selection of the cards that, in one embodiment, state either size, statehood or population (in a different embodiment these cards will state either size, independence, population, life expectancy or time zone).

In some games, a player will try to form different groups based on each state's (or country's, in a different embodiment) rankings where different rankings must be used in the same group and the rankings must be sufficiently close to be in the same group. In these types of games rankings don't need to be consecutive.

In some games, players will try to use close (but need not be one apart) rankings to match cards and help them win.

In some games players try to use these rankings in part to obtain the best hand, like in poker type games.

Some or all of each state's border states (or in a different embodiment, each country's border countries) are taken into account to play the games. In some games, these borders states (or border countries in a different embodiment) are either used in trivia like games to try to guess the state card (or country card in a different embodiment) a player is holding based on some or all of its border states. In some of these games some of the time the person receiving the clue may have some choice (but usually not total choice) as to what clue to receive and sometimes the person giving the clue may have some choice as to what clue to give (and sometimes will have some choice as to which state (or which country in a different embodiment) to give the clue about) and other times there will be no discretion whatsoever and a certain clue must be given.

In other games players to try to obtain one or more groups of cards that for each group, the group consists of cards, usually three or more per group, in which in some instances one of the cards in the group is a state that is a border state of each other card in the group, in some instances each state in the group borders each other state in the group, and in some instances you can travel from any state in the group to any other state in the group without ever traveling across any state other than a state in the group. In another embodiment, these same principles are applied to border countries to form winning groups.

In other games, a player will try to "match" the card thrown by another player during a trick to try to win the trick, and to "match" the card thrown by the prior player, a player must throw a card that is a border state (or border country in a different embodiment) of the card thrown by the prior player. In some of these games another player throwing even later in the trick could still win the trick by throwing a card that "matches" the most recently played matching card in that trick. In the type of game described above, the last person to match during a trick wins the hand. In other types of games, players try to match in a similar way and if they match they get to discard a certain number of cards including some or sometime all of the matching cards and the first player to discard all of his or her cards would win the hand or game. In other games, there is also a combination in that players first do some guessing of some of each other's cards to determine how many cards each player will start with during the matching part of the game.

In some games, players may in effect risk (e.g., wager) some of their other cards on a certain trick (the winner of which will be determined by who has the card or cards with the most border states (and it can also be played in reverse with players seeking the least border states) out of the then selected cards. This may also be played in a similar fashion with border countries in a different embodiment.

In some games a player will try to form different groups based on states bordering each other within a group where the group consists of cards, usually three or more per group, in which in some instances one of the cards in the group is a state that is a border state of each other card in the group, in some instances each state in the group borders each other state in the group, and in some instances you can travel from any state in the group to any other state in the group without ever traveling across any state other than a state in the group. In a similar fashion, this can be played with border countries in a different embodiment.

In some games players will try to use states bordering other states to match cards and help them win. In some games, a player will try to form different groups based on bordering states being in the same group. Borders can also be relevant in poker type games.

These same types of principles also apply with regard to cards who state capitals all begin with the same first letter. Similarly, these same type of principles also apply to cards who are same relations capitals (see series games for definitions). Also, these same principles apply to cards in the same time zone, and in some of these games the state's time zones are equivalent to the suits of the cards. In many of these games the person or team that wins the most tricks during a hand receives points. All of these concepts can also apply to countries (rather than states) in a different embodiment and in that embodiment the continents are equivalent to the suits of the cards.

In one embodiment, rankings in size, statehood and population are used to play the games, and particularly to play games where those rankings can be used to determine which is the best card played on a trick, trivia games, which cards "match" other cards to win a trick, in games in which groups of cards form winning series, and in games that are poker type games or other games where other cards in a player's hand are risked during the hand based on rankings. In other games, states' border states are used to determining matching to win tricks during a game, and also to determine which is best card played on a trick, to form winning series, and games that are poker type games. For example, in some variations, the same first letter of state capitals are used for matching and series types games and poker type games.

In any of the games described herein the points awarded are exemplary only and any other amounts of points could be used as well in those games. Also, generally speaking, the number of cards dealt each player is exemplary only as well as and can be greatly varied for each game.

Figure 4:
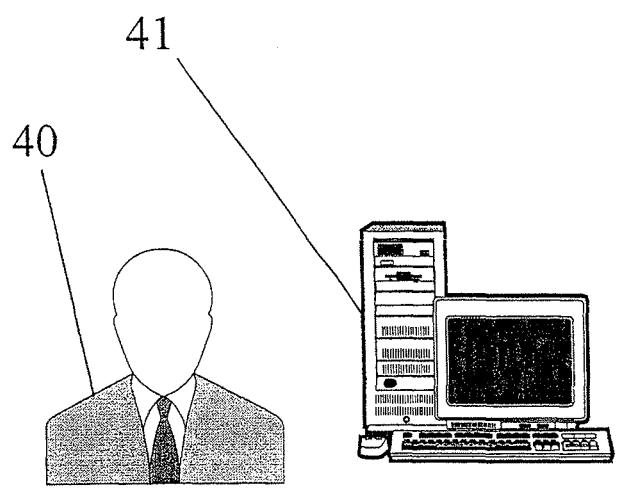
FIG. 4 depicts various components for use in electronic play of the game, in accordance with one embodiment of the present invention.

FIG. 4 depicts various components for use in electronic play of the game, in accordance with one embodiment of the present invention. As shown in FIG. 4, in this embodiment, a player 40 plays at a terminal 41, such as a personal computer, a minicomputer, a microcomputer, a main frame computer, or other device having a display, processor and GUI, including a hand-held electronic game, or other device, such as a slot machine.

Figure 5:
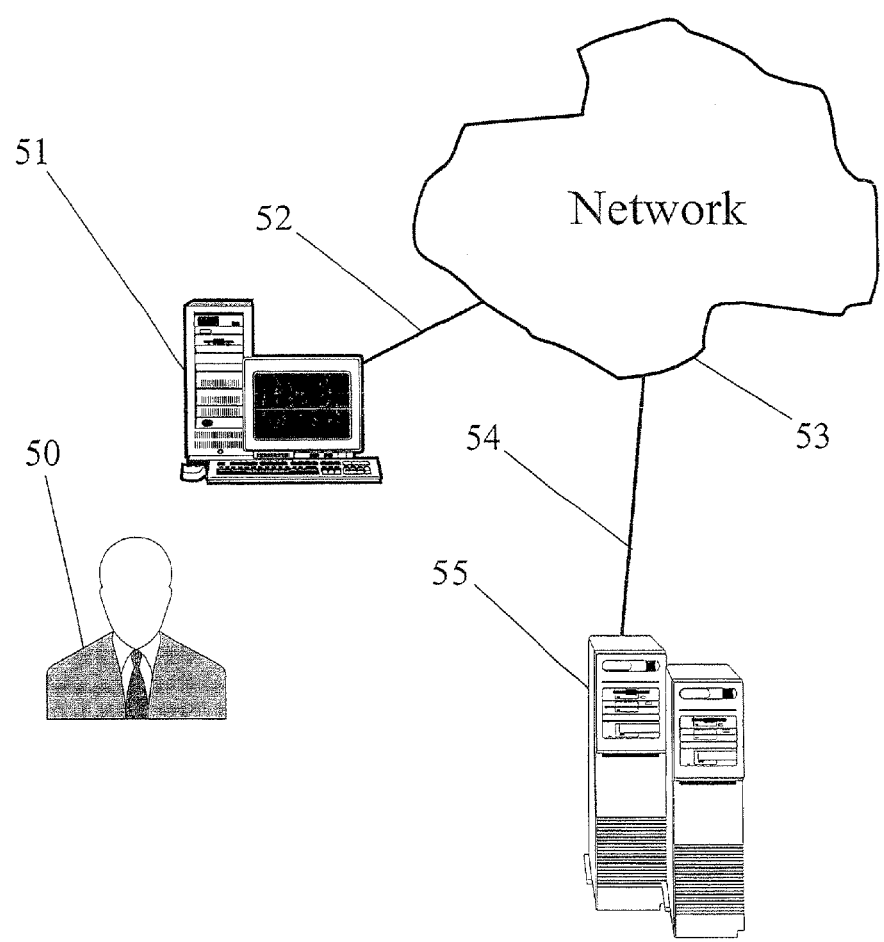
FIG. 5 presents components for electronic play of the game via a network, such as the Internet or an intranet, in accordance with another embodiment of the present invention.

FIG. 5 presents components for electronic play of the game via a network, such as the Internet or an intranet, in accordance with another embodiment of the present invention. As shown in FIG. 5, a player 50 plays at a terminal 51, such as a personal computer, a minicomputer, a microcomputer, a main frame computer, or other device having a display and processor. The terminal 51, is connected 52, 54, for example, via wired, wireless, or fiber optic coupling, and a network 53, such as the Internet or an intranet, to a server 55, such as personal computer, a minicomputer, a microcomputer, a main frame computer, or other device having a processor.

Figure 6:
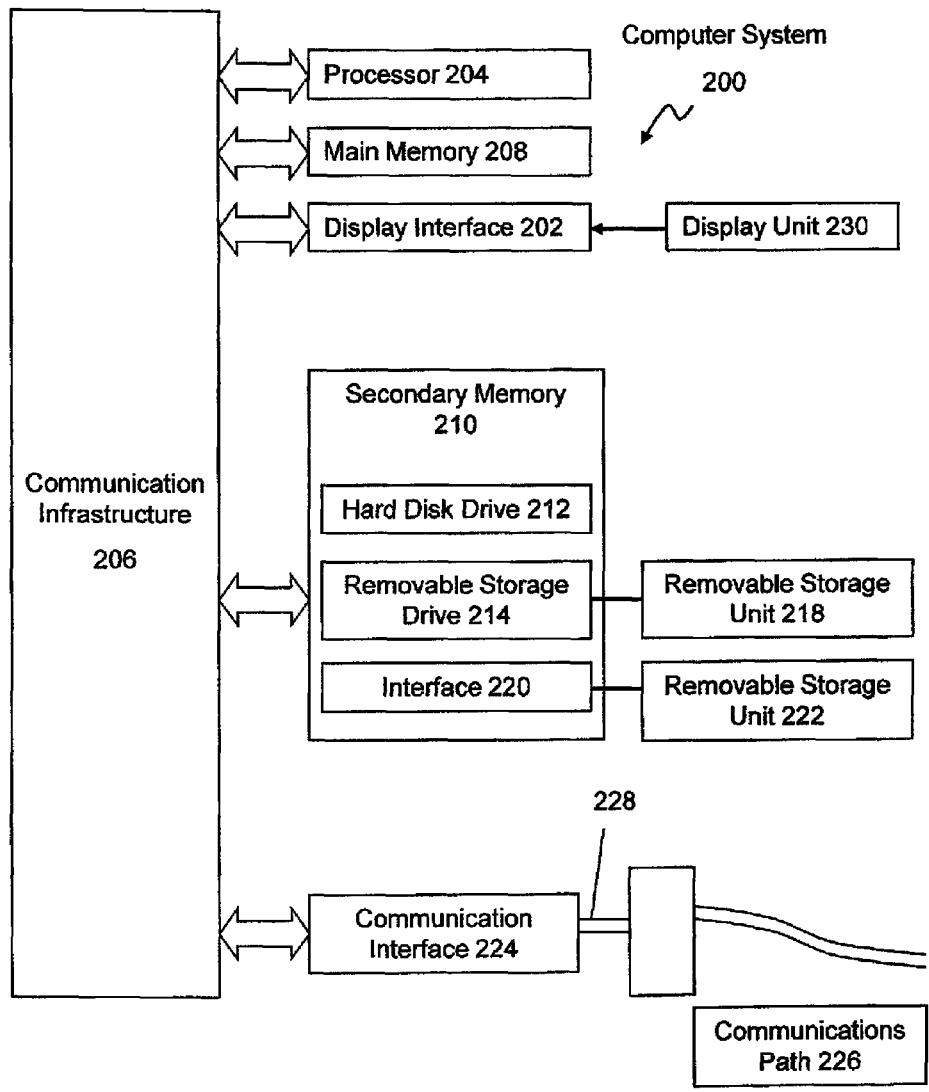
FIG. 6 illustrates exemplary computer system features usable with embodiments of the present invention.

The present invention may be implemented using hardware, software or a combination thereof and may be implemented in one or more computer systems or other processing systems. In one embodiment, the invention is directed toward one or more computer systems capable of carrying out the functionality described herein. An example of such a computer system 200 is shown in FIG. 6.

Computer system 200 includes one or more processors, such as processor 204. The processor 204 is connected to a communication infrastructure 206 (e.g., a communications bus, cross-over bar, or network). Various software embodiments are described in terms of this exemplary computer system. After reading this description, it will become apparent to a person skilled in the relevant art(s) how to implement the invention using other computer systems and/or architectures.

Computer system 200 can include a display interface 202 that forwards graphics, text, and other data from the communication infrastructure 206 (or from a frame buffer not shown) for display on the display unit 230. Computer system 200 also includes a main memory 208, preferably random access memory (RAM), and may also include a secondary memory 210. The secondary memory 210 may include, for example, a hard disk drive 212 and/or a removable storage drive 214, representing a floppy disk drive, a magnetic tape drive, an optical disk drive, etc. The removable storage drive 214 reads from and/or writes to a removable storage unit 218 in a well known manner. Removable storage unit 218, represents a floppy disk, magnetic tape, optical disk, etc., which is read by and written to removable storage drive 214. As will be appreciated, the removable storage unit 218 includes a computer usable storage medium having stored therein computer software and/or data.

In alternative embodiments, secondary memory 210 may include other similar devices for allowing computer programs or other instructions to be loaded into computer system 200. Such devices may include, for example, a removable storage unit 222 and an interface 220. Examples of such may include a program cartridge and cartridge interface (such as that found in video game devices), a removable memory chip (such as an erasable programmable read only memory (EPROM), or programmable read only memory (PROM)) and associated socket, and other removable storage units 222 and interfaces 220, which allow software and data to be transferred from the removable storage unit 222 to computer system 200.

Computer system 200 may also include a communications interface 224. Communications interface 224 allows software and data to be transferred between computer system 200 and external devices. Examples of communications interface 224 may include a modem, a network interface (such as an Ethernet card), a communications port, a Personal Computer Memory Card International Association (PCMCIA) slot and card, etc. Software and data transferred via communications interface 224 are in the form of signals 228, which may be electronic, electromagnetic, optical or other signals capable of being received by communications interface 224. These signals 228 are provided to communications interface 224 via a communications path (e.g., channel) 226. This path 226 carries signals 228 and may be implemented using wire or cable, fiber optics, a telephone line, a cellular link, a radio frequency (RF) link and/or other communications channels. In this document, the terms "computer program medium" and "computer usable medium" are used to refer generally to media such as a removable storage drive 214, a hard disk installed in hard disk drive 212, and signals 228. These computer program products provide software to the computer system 200. The invention is directed to such computer program products.

Computer programs (also referred to as computer control logic) are stored in main memory 208 and/or secondary memory 210. Computer programs may also be received via communications interface 224. Such computer programs, when executed, enable the computer system 200 to perform the features of the present invention, as discussed herein. In particular, the computer programs, when executed, enable the processor 204 to perform the features of the present invention. Accordingly, such computer programs represent controllers of the computer system 200.

In an embodiment where the invention is implemented using software, the software may be stored in a computer program product and loaded into computer system 200 using removable storage drive 214, hard drive 212, or communications interface 224. The control logic (software), when executed by the processor 204, causes the processor 204 to perform the functions of the invention as described herein.

In another embodiment, the invention is implemented primarily in hardware using, for example, hardware components, such as application specific integrated circuits (ASICs). Implementation of the hardware and software so as to perform the functions described herein will be apparent to persons skilled in the relevant art(s).

In yet another embodiment, the invention is implemented using a combination of both hardware and software.

Various exemplary games using the components of the present invention will now be described.

General Rules for Exemplary Games

An unlimited number of games can be played with the GeoPlunge cards and the other cards described herein. For many of the games, the first player (or first team, if the game is being played with teams) to reach a certain number of points (which is often 50 points where the GeoPlunge cards representing states are used and 200 points where the GeoPlunge cards representing countries are used) wins. In some variations, each game is played one hand a time, with each hand beginning with the players being dealt a certain number of GeoPlunge cards (which number of cards varies depending upon the game). To determine who is the dealer for the first hand of many of the games, each player, without looking, draws a card from the GeoPlunge card deck whoever draws the highest ranking size card (if the GeoPlunge cards representing countries are used) or highest ranking statehood card (if the GeoPlunge cards representing states are used) is the dealer. Thereafter, for many of the games whoever wins the prior hand (e.g., gets the most points in a hand) is the dealer for the next hand, and if it is a tie for most points, then the dealer for the prior hand deals again. For many of the games, all of the card decks used are reshuffled after each hand.

Features of Exemplary State Based Games

One embodiment of the present invention contains state based GeoPlunge cards. The state based set of one embodiment contains 50 GeoPlunge cards (one for each U.S. state), 36 GeoChallenge cards, and 12 GeoPower cards. Near the top of each GeoPlunge card is the state name (listed within a color coded border based on the state's time zone), the state capital (with a star next to it), and a picture of the state flag. For the time zones, the color coded border is red for eastern states, green for central states, blue for mountain states and purple for Alaska, Hawaii and pacific states (referred to as the pacific/other time zone for purposes of the games). For purposes of playing many of the games with the cards of the set of this embodiment, if a state is located in two time zones, the state is considered to be in, and the color coded border reflects, the time zone most of the state is located in (and the portion of the state not in that time zone is shaded a different color in the state's picture near the bottom of the card so that the player is aware that the state is in two time zones).

In addition, near the top of each GeoPlunge card for this set, listed from left to right, are the state's rankings in size (considering land mass only), statehood and population (based on information from the U.S. census bureau). Each GeoPlunge card also lists the state's border states, and three highly populated cities in the state (called the "Top 3 Cities"). These cities, the first of which is listed in red ("Red Top City"), the second in blue ("Blue Top City") and the third in green ("Green Top City") are, in general, listed in order from most to least populated based on information from the U.S. Census Bureau. Each card also has a picture of the state showing the general location of the border states, the state capital (indicated by a star), and the Top 3 Cities (each indicated by a circle, or a star if it is the capital, in the same color as the listing of the city). Each GeoPlunge card also includes the names and pictures of the state flower and bird. All pictures are approximations only and are not intended to be to scale.

GeoChallenge, GeoPlunge, and GeoPower Cards for Exemplary State Based Card Variations The GeoChallenge cards are used in the GeoPlunge Challenge games to determine which clues will be provided in those games. The GeoPower cards are used in the GeoPlunge Power games to determine which cards are powerful in those games.

Similar to the state based variations described above, other geopolitical based cards of varying numbers may be used.

Several exemplary game descriptions will now be provided.

GeoPlunge Challenge Games

General Rules to GeoPlunge Challenge Games

Various GeoPlunge Challenge games may be played, such as the following exemplary embodiments: GeoPlunge Head-to-Head Challenge (played with two players), GeoPlunge Multiple Challenge (played with three, four, five, six, seven, or eight players, except that where the GeoPlunge state cards are used, rather than the country cards, six is the maximum number of players), and GeoPlunge Team Challenge (played with either two teams of two players each, three teams of two players each, four teams of two players each, two teams of three players each, or two teams of four players each, except that where the GeoPlunge state cards are used, rather than the country cards, six is the maximum number of players) in which game the teammates sit across from each other, and not next to each other. The GeoPlunge cards and the GeoChallenge cards are used. In some embodiments, each hand, each player is dealt 3 GeoPlunge cards (in other versions of GeoPlunge Challenge games players may be dealt fewer or more than 3 GeoPlunge cards so long as each player is dealt the same number of cards and there are a sufficient number of cards in the GeoPlunge deck for each player to receive that same number of cards). A player removes a card from his or her hand only when another player correctly guesses the country of that card (except that where the GeoPlunge state cards are used, a player must correctly guess the state of that card, rather than the country of that card). A hand ends when only one player has any GeoPlunge cards remaining in his or her hand, except that in GeoPlunge Team Challenge a hand also ends if the only players that have cards remaining in their hands are on the same team.

Specific GeoPlunge Challenge Game Rules

1. GeoPlunge Head-to-Head Challenge: Two Players (See FIG. 7 for Flow Diagram of Play)

Figure 7:
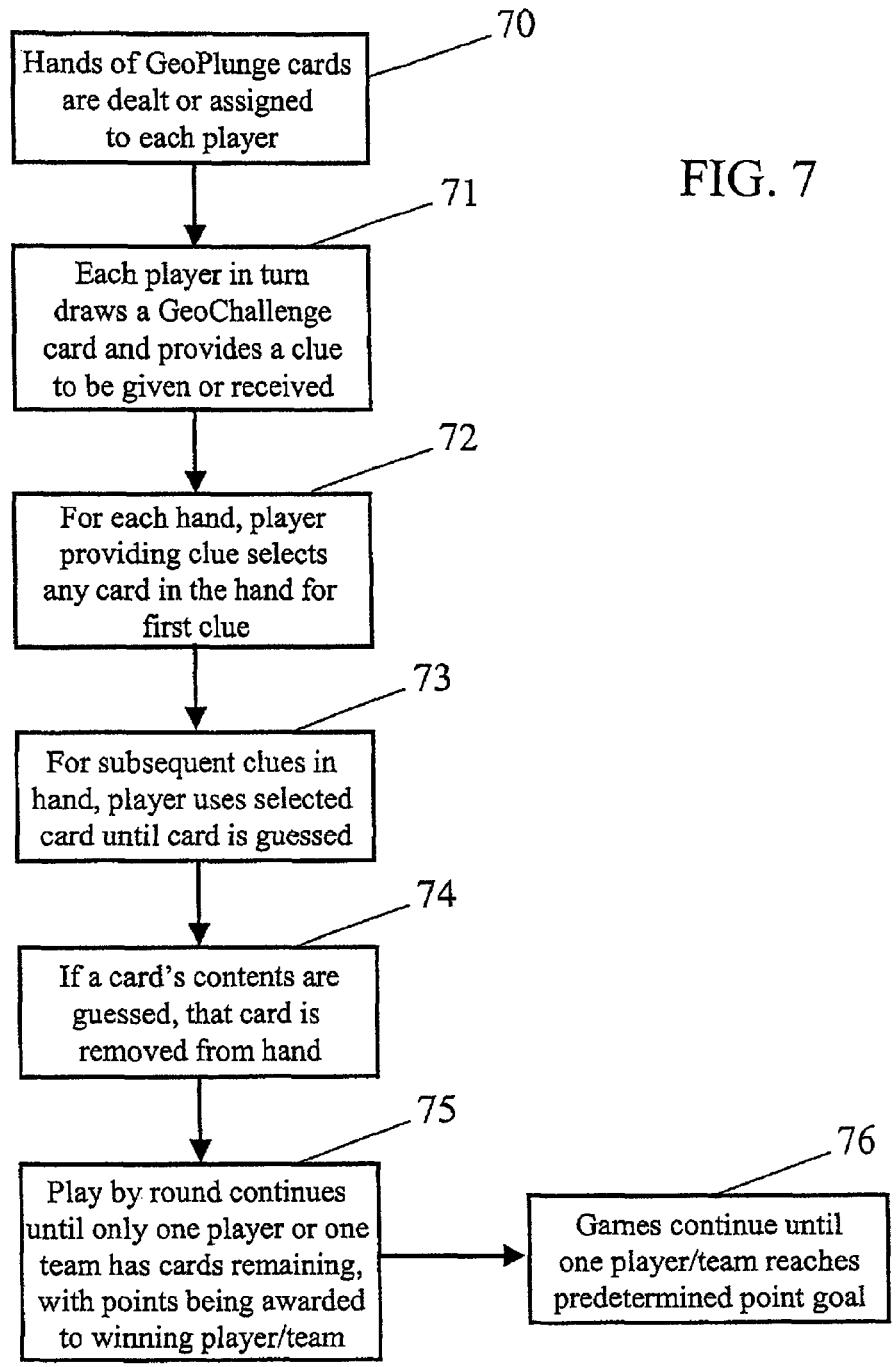
FIG. 7 shows a flow diagram of an example method of play of a first variation of a geography related game, in accordance with an embodiment of the present invention.

Playing the Game:

The object of the game is to correctly guess all three countries in the other player's hand before the other player correctly guesses all three countries held in your hand (but in another embodiment, where the GeoPlunge state cards are used, the object of the game is to correctly guess all three states in the other player's hand before the other player correctly guesses all three states held in your hand). As shown in FIG. 7, after each player is dealt three GeoPlunge cards 70, the players give each other clues about the GeoPlunge cards in their hands, and the GeoChallenge cards determine the clues that are given 71.

The players take turns picking the top card in the GeoChallenge card deck. The player whose turn it is to guess picks and reads the GeoChallenge card. Some GeoChallenge cards indicate exactly what clue is to be given, other cards give the guesser some option as to what clue to receive, and others give the clue-giver (referred to as the "Opponent" in the GeoChallenge cards) some option as to what clue to give. A GeoChallenge card is placed at the bottom of the deck after it is used.

Each hand, the dealer gives the first clue. For each player, the first time in a hand that the player gives a clue about one of his or her GeoPlunge cards 72, the player may select which of the three GeoPlunge cards to give the clue about, and may make this selection after the GeoChallenge card is read by the other player. Thereafter, the player must give clues only about that same GeoPlunge card 73 until the other player correctly guesses the country or other geographic entity of that card (such as the state where the GeoPlunge state cards are used) 74, or the hand is over. Once the country of that card (or the state of that card, where the state cards are used) is correctly guessed, the same rules apply to the second card in the clue-giver's hand for which clues will be given. Whenever a clue-giver has more than one choice of which clue to give, the clue-giver must, if possible, give a clue that he or she has not given before for that GeoPlunge card during that hand.

Scoring:

The first player to guess all of the other player's GeoPlunge cards correctly in a hand 75 receives a predetermined number of points (e.g., 40 points where the country cards are used and 10 points where the state cards are used). Bonus points (e.g., 60 points where country cards are used and 15 points where the state cards are used) are awarded if the winner correctly guesses all of the other player's GeoPlunge cards before the other player has correctly guessed any of the winner's GeoPlunge cards. Play may be repeated until a predetermined total point level (e.g., 200 points where the country cards are used and 50 points where the state cards are used) is reached by one player.

2. GeoPlunge Multiple Challenge:

All of the rules of GeoPlunge Head-to-Head Challenge apply, except as follows.

Playing the Game:

Each hand, the dealer will be the first clue-giver, followed by the player to the left of the dealer, followed by the player second to the left of the dealer, and so on. Each player other than the clue-giver gets to guess what the clue-giver's card is until one of the players guesses correctly or each has had a chance to guess. If each player guesses incorrectly, that same GeoPlunge card will be guessed at next time by each player when it is the clue-giver's turn to give a clue again, which turn will occur once all of the other players have had their next turn giving a clue on one of their GeoPlunge cards. The player to the immediate left of the clue-giver picks the GeoChallenge card, is the first guesser, and where the guessers have some choice as to what clue to receive based on the GeoChallenge card picked, is also the person who determines the clue for the guessers to receive (i.e., each guesser does not get to pick a separate GeoChallenge card; instead the guessers make their guess based on the GeoChallenge card picked by the player to the immediate left of the clue-giver). Once all of a player's GeoPlunge cards have been guessed correctly in a hand, that player may no longer give clues but may still guess as to the GeoPlunge cards other players have. The winner of the hand is the last player to have any GeoPlunge cards remaining.

Scoring:

The winner of the hand receives a predetermined number of points (e.g., 60 where the country cards are used, and 15 where the state cards are used), except that if that player has all three GeoPlunge cards remaining when everyone else has none, that player receives bonus points (e.g., 60 where the country cards are used, and 15 where the state cards are used). The next to last person to have any GeoPlunge cards remaining receives additional points (e.g., 30 where the country cards are used, and 8 where the state cards are used), and where there are four or more players in the game, the third to last person to have any GeoPlunge cards remaining receives additional points (e.g., 15 where the country cards are used, and 4 where the state cards are used).

3. GeoPlunge Team Challenge:

All of the rules of GeoPlunge Multiple Challenge apply except that (i) a hand also ends if the only players that have cards remaining in their hands are on the same team; (ii) the clue-giver's teammate(s) does not guess at the clue-giver's cards; (iii) the team that wins the hand receives a predetermined number of points (e.g., 60 where the country cards are used, and 15 where the state cards are used); (iv) bonus points (e.g., 40 where the country cards are used, and 10 where the state cards are used are awarded to the winning team for the hand if any of the members of the team has all of his or her cards remaining at the end of the hand, or all of the members of the team have at least one card remaining at the end of the hand; (v) where there are three or more teams playing, the next to last team to have any GeoPlunge cards remaining in one of their player's hands receives additional points (e.g., 30 where the country cards are used, and 8 where the state cards are used); and (vi) where there are four teams playing, the third to last team to have any GeoPlunge cards remaining in one of their player's hands receives additional points (e.g., 15 where the country cards are used, and 4 where the state cards are used).

GeoPlunge Match Games

General Rules to GeoPlunge Match Games

Numerous variations of GeoPlunge Match games may be played, including the following exemplary embodiments where the GeoPlunge country cards are used: GeoPlunge Continent Match, GeoPlunge Basic BC (i.e., Border and Capital) Match, GeoPlunge Basic SIP (i.e., Size, Independence or Population) Match, GeoPlunge Basic GR (i.e., Government and Religion) Match, GeoPlunge Basic LC (i.e., Language and Currency) Match; GeoPlunge Basic TL (i.e., Time Zone and Life Expectancy) Match (each of which may be played with two, three, four, five, six, seven, or eight players); and GeoPlunge Advanced BC Match, GeoPlunge Advanced SIP Match, GeoPlunge Advanced GR Match, GeoPlunge Advanced LC Match; and GeoPlunge Advanced TL Match (each of which may be played with three, four, five, six, seven, or eight players); and the following exemplary embodiments where the GeoPlunge state cards are used: GeoPlunge Basic Border Match, GeoPlunge Advanced Border Match, GeoPlunge Basic SSP Match, GeoPlunge Advanced SSP Match, and GeoPlunge Capitals Match. Only the GeoPlunge cards are used. In addition, all of the GeoPlunge Match games may also be played with two teams of two players each, three teams of two players each, four teams of two players each, two teams of three players each or two teams of four players each, except that in those games using the state cards, there can only be two teams of two players each (and in each of these games with teams, teammates sit across from each other, not next to each other).

For example, in each hand, in some embodiments each player is dealt 10 cards, and 10 tricks are played during the hand (but the number of cards dealt, and the number of tricks played during a hand, can vary in any of the embodiments of the GeoPlunge Match games so long as there are at least 3 cards dealt to each player and at least 3 tricks played, and in each hand the number of cards dealt to each player will equal the number of tricks played on that hand; therefore, for example, players may, if they wish, have 4 cards dealt to each player, and 4 tricks on each hand). A trick consists of each player, in clockwise order, one at a time, playing (i.e., placing onto the table or other playing surface) one of his or her GeoPlunge cards. For each hand, on the first trick the dealer is the first person to play a card (this is called leading). Thereafter, whoever wins a trick leads on the next trick. For each trick, each player can play any card then remaining in his or her hand (a player cannot play any card he or she has already played on a prior trick).

In each GeoPlunge Match game, whoever wins the most tricks wins the hand and gets a certain number of points, for example, 40 points may be given where the country cards are used and 10 points where the state cards are used (unless that player unsuccessfully seeks to GeoPlunge as described below). If it is a tie, the player who took the last trick between those who tied wins the points. Where the players are playing the games such that at least 8 cards are dealt to each player (and therefore there are at least 8 tricks per hand), a player gets bonus points (e.g., 60 points where the country cards are used or 15 points may be given where the state cards are used) if he or she announces before more than half the tricks are played in a hand that he or she is seeking to GeoPlunge and that player wins at least all but 2 of the 10 tricks (or, unless the game is being played with teams, at least all but 3 of the tricks if there are at least three players, or at least all but four of the tricks if there are at least five players). Otherwise, he or she does not receive any points even if that player wins the majority of the tricks.

If a GeoPlunge Match game is played with teams, the scoring is the same as above, except that it applies to the team rather than the individual. For example, whichever team wins the most tricks wins the hand and gets points (e.g., 40 may be given where the country cards are used and 10 may be given where the state cards are used), unless that team unsuccessfully seeks to GeoPlunge. If a player on a team announces before more than half the tricks have been played in a hand that the team is seeking to GeoPlunge, that team gets bonus points (e.g., 60 may be given where the country cards are used and 15 may be given where the state cards are used) if it wins at least all but two of the tricks (or at least all but three of the tricks if there are at least three teams). Otherwise, that team gets no points even if it wins the majority of the tricks. The tricks won by a team equals the sum of the tricks won by each player on the team.

Specific GeoPlunge Match Game Rules

1. GeoPlunge Continent Match—Two to Eight Players Playing the Game:

The person who leads on a trick will win the trick if none of the other players play a card on that trick that is of the same continent as the card led. If one player plays a card that is the same continent as the card led, that player wins the trick. If two or more players play a card that is the same continent as the card led, the last to play such a card (i.e., the last to match) wins the trick.

2. GeoPlunge Basic BC Match—Two to Eight Players Playing the Game:

The person who leads on a trick will win the trick if none of the other players play a card on that trick that is either a border country of the card led or whose country's capital begins with the same first letter as the capital of the country of the card led. If one player plays a card that is a border country of the card led or whose country's capital begins with the same first letter as the capital of the country of the card led, that player wins the trick. If two or more players play a card that is a border country of the card led or whose country's capital begins with the same first letter as the capital of the country of the card led, the last to play such a card (i.e., the last to match) wins the trick.

3. GeoPlunge Advanced BC Match—Three to Eight Players Playing the Game:

The rules for GeoPlunge Basic BC Match apply, except as follows. After one person plays a card (the "matching card") that is a border country of the card led on a trick or whose country's capital begins with the same first letter as the capital of the country of the card led, for a subsequent player to take that trick he or she must do the following: play a card (the "new matching card") that is a border country of the matching card or whose country's capital begins with the same first letter as the capital of the country of the matching card. A player whose turn is after the subsequent player's turn could still take the trick by playing a GeoPlunge card that is a border country of the new matching card or whose country's capital begins with the same first letter as the capital of the country of the matching card, and so on.

4. GeoPlunge Basic SIP Match—Two to Eight Players Playing the Game:

The person who leads on a trick will win the trick if none of the other players play a card on that trick that (i) is ten or less lower or higher in rank for Size or Population than the card led; or (ii) has a year of independence that is within ten years of the year of independence of the card led. If one player plays a card that (i) is ten or less lower or higher in rank for Size or Population than the card led; or (ii) has a year of independence that is within ten years of the year of independence of the card led, that player wins the trick. If two or more players play such a card, the last to play such a card (i.e., the last to match) wins the trick.

5. GeoPlunge Advanced SIP Match—Three to Eight Players Playing the Game:

The rules for GeoPlunge Basic SIP Match apply, except as follows. After one person plays a card (the "matching card") that (i) is ten or less lower or higher in rank for Size or Population than the card led; or (ii) has a year of independence that is within ten years of the year of independence of the card led, for a subsequent player to take that trick he or she must do the following: play a card (the "new matching card") that (i) is ten or less lower or higher in rank for Size or Population than the matching card; or (ii) has a year of independence that is within ten years of the year of independence of the matching card. A player whose turn is after the subsequent player's turn could still take the trick by playing a card that (i) is ten or less lower or higher in rank for Size or Population than the new matching card; or (ii) has a year of independence that is within ten years of the year of independence of the new matching card, and so on.

6. GeoPlunge Basic GR Match—Two to Eight Players Playing the Game:

The person who leads on a trick will win the trick if none of the other players play a card on that trick whose country has the same type of government as the card led or whose country has the same religions as the card led. If one player plays a card whose country has the same type of government as the card led or whose country has the same religions as the card led, that player wins the trick. If two or more players play a card whose country has the same type of government as the card led or whose country has the same religions as the card led, the last to play such a card (i.e., the last to match) wins the trick.

7. GeoPlunge Advanced GR Match—Three to Eight Players Playing the Game:

The rules for GeoPlunge Basic GR Match apply, except as follows. After one person plays a card (the "matching card") whose country has the same type of government as the card led or whose country has the same religions as the card led, for a subsequent player to take that trick he or she must do the following: play a card (the "new matching card") whose country has the same type of government as the matching card or whose country has the same religions as the matching card. A player whose turn is after the subsequent player's turn could still take the trick by playing a card whose country has the same type of government as the new matching card or whose country has the same religions as the new matching card, and so on.

8. GeoPlunge Basic LC Match—Two to Eight Players Playing the Game:

The person who leads on a trick will win the trick if none of the other players play a card on that trick whose country has the same languages or currency as the card led. If one player plays a card whose country has the same languages or currency as the card led, that player wins the trick. If two or more players play a card whose country has the same languages or currency as the card led, the last to play such a card (i.e., the last to match) wins the trick.

9. GeoPlunge Advanced LC Match—Three to Eight Players Playing the Game:

The rules for GeoPlunge Basic LC Match apply, except as follows. After one person plays a card (the "matching card") whose country has the same languages or currency as the card led, for a subsequent player to take that trick he or she must do the following: play a card (the "new matching card") whose country has the same languages or currency as the matching card. A player whose turn is after the subsequent player's turn could still take the trick by playing a card whose country has the same languages or currency as the new matching card, and so on.

10. GeoPlunge Basic TL Match—Two to Eight Players Playing the Game:

The person who leads on a trick will win the trick if none of the other players play a card on that trick that (i) is within two of the time zone of the card led; or (ii) within two of the life expectancy of the card led. If one player plays a card that (i) is within two of the time zone of the card led; or (ii) within two of the life expectancy of the card led, that player wins the trick. If two or more players play such a card, the last to play such a card (i.e., the last to match) wins the trick.

11. GeoPlunge Advanced TL Match—Three to Eight Players Playing the Game:

The rules for GeoPlunge TL Match apply, except as follows. After one person plays a card (the "matching card") that (i) is within two of the time zone of the card led; or (ii) within two of the life expectancy of the card led, for a subsequent player to take that trick he or she must do the following: play a card (the "new matching card") that (i) is within two of the time zone of the matching card; or (ii) within two of the life expectancy of the matching card. A player whose turn is after the subsequent player's turn could still take the trick by playing a card that (I) is within two of the time zone of the new matching card; or (ii) within two of the life expectancy of the new matching card, and so on.

12. GeoPlunge Basic Border Match—Two to Five Players

The person who leads on a trick will win the trick if none of the other players play a card on that trick that is a border state of the card led. If one player plays a card that is a border state of the card led, that player wins the trick. If two or more players play a card that is a border state of the card led, the last to play such a card (i.e., the last to match) wins the trick.

13. GeoPlunge Advanced Border Match—Three to Five Players

The rules for GeoPlunge Basic Border Match apply, except as follows. After one person plays a card (the "matching card") that is a border state of the card led on a trick, for a subsequent player to take that trick he or she must do the following: play a card (the "new matching card") that is a border state of the matching card. The new matching card does not have to be a border state of the GeoPlunge card led. A player whose turn is after the subsequent player's turn could still take the trick by playing a GeoPlunge card that is a border state of the new matching card, and so on.

14. GeoPlunge Basic SSP Match—Two to 5 Players

The person who leads on a trick will win the trick if none of the other players play a card on that trick that is one lower or one higher in rank for Size, Statehood or Population than the card led. If one player plays a card that is one lower or one higher in rank for Size, Statehood or Population than the card led, that player wins the trick. If two or more players play such a card, the last to play such a card (i.e., the last to match) wins the trick.

15. GeoPlunge Advanced SSP Match—Three to Five Players

The rules for GeoPlunge Basic SSP Match apply, except as follows. After one person plays a card (the "matching card") that is one lower or one higher in rank for Size, Statehood or Population than the card led on any trick, for a subsequent player to take that trick he or she must do the following: play a card (the "new matching card") that is one lower or one higher in rank for Size, Statehood or Population than the matching card. The new matching card does not have to be one lower or one higher in rank for Size, Statehood or Population than the card led. A player whose turn is after the subsequent player's turn could still take the trick by playing a card that is one lower one higher in rank for Size, Statehood or Population than the new matching card, and so on.

16. GeoPlunge Capital Match—Two to Five Players

The person who leads on a trick will win the trick if none of the other players play a card on that trick in which the state capital of the card played begins with the same first letter as the state capital of the card led. If one player plays a card in which the state capital of the card played begins with the same first letter as the state capital of the card led, that player wins the trick. If two or more players play such a card, the last to play such a card (i.e., the last to match) wins the trick.

Figure 8:
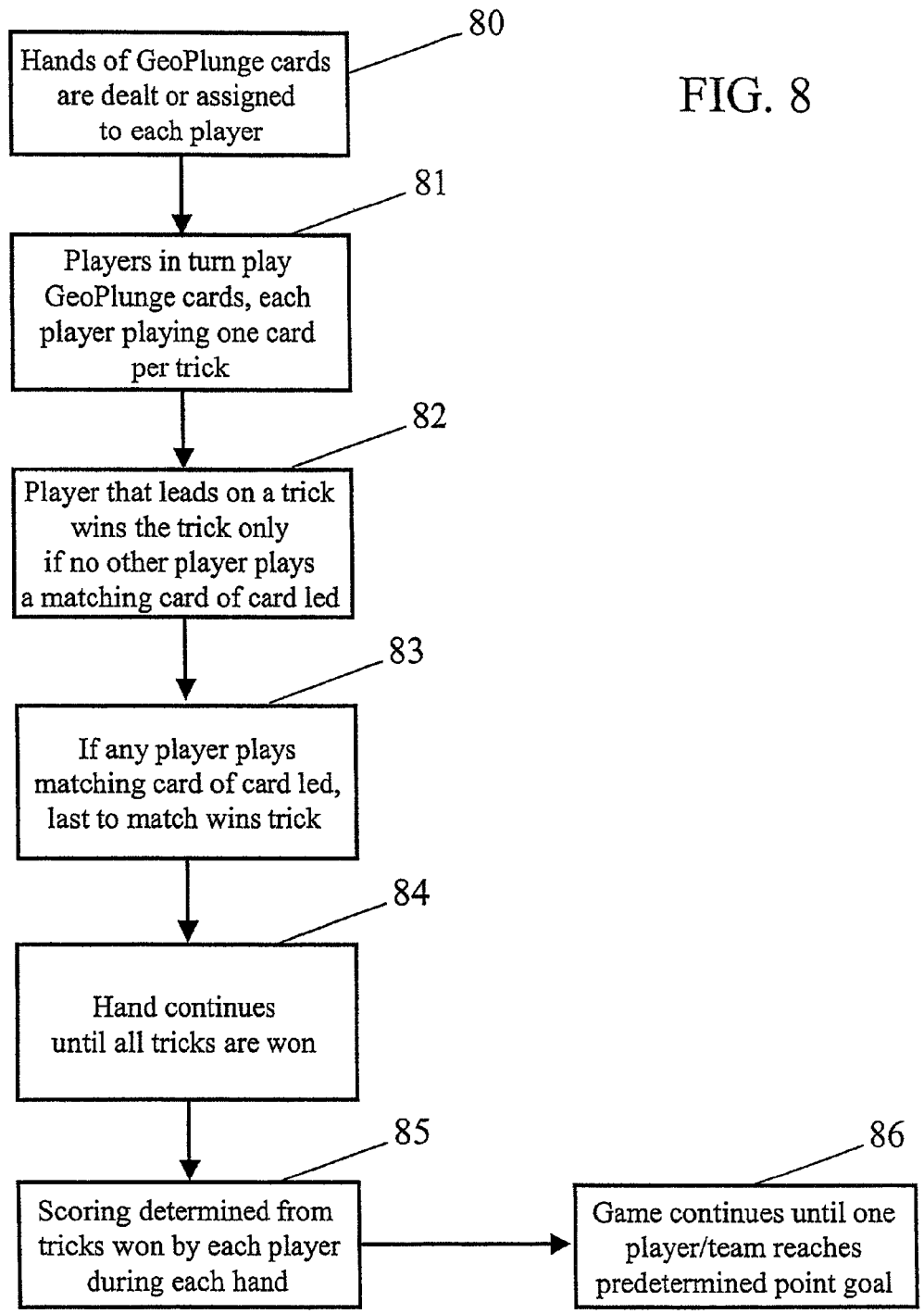
FIG. 8 presents a flow diagram of an example method of play of a second variation of a geography related game, in accordance with an embodiment of the present invention.

FIG. 8 presents a flow diagram of play of an exemplary GeoPlunge Match Game, in accordance with an embodiment of the present invention. As shown in FIG. 8, hands of GeoPlunge cards are dealt or assigned to each player 80. Players in turn play GeoPlunge cards, each player playing one card per trick 81. The player that leads on a trick wins the trick only if no other player plays a matching card of card led 82. If any player plays matching card of card led, the last player to present a card that matches the card led wins the trick (and in some games once one player plays matching card, next person must match most recent matching card to win trick) 83.

Whether a card matches another card varies by game and may be based on one or more of the following, depending on the game, where the state cards are used: (ii) a similar ranking (such as two cards have consecutive rankings in either size, statehood or population); (ii) cards are border states of each other (or it may be they both share a common border in some games); (iii) cards are in the same time zone; and/or (iv) the state capital of each card begins with the same first letter. Where the country cards are used, the matches may be based on the factors listed earlier under those games.

Play continues until all of the tricks are won 84. Scoring is determined from tricks won by each player during each hand 85. The game continues until one player/team reaches a predetermined point goal, such as a point total 86.

GeoPlunge Series Games

General Rules to GeoPlunge Series Games

Various GeoPlunge Series games may be played, such as the following variations where the GeoPlunge country cards are used: GeoPlunge Continent Series, GeoPlunge BC (i.e., Border and Capital) Series, GeoPlunge SIP (i.e., Size, Independence and Population) Series, GeoPlunge GRT (Government, Religion and Time Zone) Series, GeoPlunge LCL (Language, Currency and Life Expectancy) Series and GeoPlunge Dealer Selects Series; and the following variations where the GeoPlunge state cards are used: GeoPlunge Border Series, GeoPlunge SSP Series, GeoPlunge Capital Series and GeoPlunge Dealer Select Series. Each GeoPlunge Series game is played with two, three, or four players. Only the GeoPlunge cards are used. For each hand, the player to the dealer's immediate left is dealt eight cards and each of the other players, including the dealer, receives seven cards. (In other variations of these games, the players may be dealt any different number of cards so long as each player is dealt at least two cards and all the players, other than the player to the dealer's left who receives one more card than the other players, receive the same number of cards. In other embodiments of these games, including where a different number of cards are dealt to each player, the size of the groups, and the number of the groups may change (e.g., where five cards are dealt to each player (other than the player to the left of the dealer who receives six cards, the games may be played where each player needs one winning group of five cards to receive points, or the games may be played where each player needs a winning group of three cards and another winning group of two cards to receive points).

Where there are two players, for each GeoPlunge Series game, the play of the hand starts with the non-dealer discarding a card from his or her hand face up. The dealer then either selects the card discarded or the next card in the deck. After taking the discarded card or the next card in the deck, the dealer discards a card from his or her hand face up. Except as described in the next paragraph, until one of the players wins the hand, each player in turn will continue to either take the card discarded by the other player or pick the next card in the deck, and then discard a card from his or her hand (the card the player then discards from his or her hand can be, if the player wishes, the card the player just picked from the deck). (Also, a player may not look at the next card in the deck until and unless the player selects that card). Where there are three or four players, play begins with the player to the immediate left of the dealer discarding a card face up, and play proceeds in clockwise order with each player in turn then either selecting the card discarded by the player to his or her right (except as described below) or selecting the next card in the deck, and then discarding a card from his or her hand.

During each hand, each player is permitted to twice discard cards face down, but a player cannot do so the first time he or she discards a card during a hand (the cards a player decides to discard face down are called "Untouchable" cards for that hand). When an Untouchable card is discarded, the player whose turn it is to select is not allowed to pick or look at that card and must pick the next card from the deck. If no player has won the hand after all of the cards have been picked, the discarded cards other than the Untouchable cards are reshuffled and play is then continued. (The players may, if they agree, vary the games so that there are no Untouchable cards, 1 Untouchable Card, or more than 2 Untouchable Cards, and if they wish the players may also vary the games so that an Untouchable Card could be played the first time a player plays a card).

Specific GeoPlunge Series Game Rules

1. GeoPlunge Continent Series—Two to Four Players

Playing the Game:

To win a player must have in his or her hand a group of four cards, and a separate group of three cards, where for each group (a) all of the cards in the group are in the same continent. In addition, to win, a player must have two different types of groups (e.g., a player's group of four cards and group of three cards cannot both be cards in Africa), and at least one of the groups must be made up of cards that are either all in North America, all in South America or all in the Oceanus. No card can be used in more than one group.

Scoring:

Points (e.g., 30) are awarded for winning the hand. Bonus points (e.g., 50) are awarded if the group of four cards are all in South America or are all in the Oceanus. Bonus points (e.g., 30) are awarded if the group of three cards are all in South America or are all in the Oceanus.

2. GeoPlunge BC Series—Two to Four Players

Playing the Game:

To win a player must have in his or her hand two groups of cards. One of the groups must consist of four cards where either (i) one of the countries in the group borders each of the other three countries in the group (a "Border 4") or all of the countries in the group have capitals that being with the same first letter (a "Capital 4"). The other group must consist of three cards where (i) one of the countries in the group borders each of the other two countries in the group (a "Border 3") or all of the countries in the group have capitals that being with the same first letter (a "Capital 3"). No card can be used in more than one group. In addition to win, one group must be a border group (i.e., either a Border 4 or Border 3), and the other group must be a capital group (i.e., either a Capital 4 or Capital 3)

Scoring:

Points (e.g., 30) are awarded for winning the hand. Bonus points (e.g., 50) are awarded if the group of four cards consists of four countries that all border each other (which is called a "4 Border All") or a Capital 4 where all four countries are in the same continent (which is called a "4 Capital All"). Additional bonus points (e.g., 30) are awarded if the group of three cards consists of three countries that all border each other (which is called a "3 Border All") or a Capital 3 where all three countries are in the same continent (which is called a "3 Capital All").

3. GeoPlunge SIP Series—Two to Four Players

Playing the Game:

To win a player must have in his or her hand a group of four cards, and a separate group of three cards, where for each group all of the cards in the group have "Close Ranks in Size," "Close Ranks in Population," or "Close Dates of Independence". Cards in a group have "Close Ranks in Size" if the difference in size rankings between the highest and lowest size rankings of the cards in the group is no more than ten (e.g., size rankings of 48, 53, 54 and 58). Cards have "Close Ranks in Population" if the difference in population rankings between the highest and lowest population ranking of the cards in the group is no more than ten (e.g., population rankings of 113, 116, 117 and 122). Cards in a group have Close Dates of Independence if the difference in the years of independence between the earliest date of independence and the latest date of independence of the cards in the group is no more than 10 years (e.g., years of independence of 1984, 1991, 1991, and 1992). To win, a player also must have two different types of groups (e.g., the group of four cards and the group of three cards cannot both be groups that have close rankings in Size). No card can be used in more than one group.

Scoring:

Points (e.g., 30) are awarded for winning the hand. Bonus points (e.g., 40) are awarded if the group of four cards is comprised of countries whose size or population rankings are no more than five apart or whose years of independence are all no more than five apart. Additional bonus points (e.g., 20) are awarded if the group of three cards is comprised of countries whose size or population rankings are all no more than five apart or whose years of independence are all no more than five apart.

4. GeoPlunge GRT Series—Two to Four Players

Playing the Game:

To win a player must have in his or her hand a group of four cards, and a separate group of three cards, where for each group all of the cards in the group have the same type of government, the same religions, or the same time zone. To win, a player also must have two different types of groups (e.g. the group of four cards and the group of three cards cannot both be groups relating to the same type of government). No card can be used in more than one group.

Scoring:

Points (e.g., 30) are awarded for winning the hand. Bonus points (e.g., 40) are awarded if the group of four cards is comprised of countries that all are in the same time zone. Bonus points (e.g., 20) are awarded if the group of three cards is comprised of countries that all are in the same time zone.

5. GeoPlunge LCL Series—Two to Four Players
   Playing the Game:
   To win, a player must have in his or her hand a group of four cards, and a separate group of three cards, where for each group all of the cards in the group have the same language, the same currency or have life expectancies that are two or less years apart. To win, a player also must have two different types of groups (e.g. the group of four cards and the group of three cards cannot both be groups relating to the same languages). No card can be used in more than one group.
   Scoring:
   Points (e.g., 20) are awarded for winning the hand. Bonus points (e.g., 40) are awarded if the group of four cards is comprised of countries that have life expectancies that are two or less years apart. Additional bonus points (e.g., 20) are awarded if the group of three cards is comprised of countries that have life expectancies that are two or less years apart.
6. GeoPlunge Dealer Selects Series—Two to Four Players
   Playing the Game and Scoring:
   For each hand, after the cards are dealt but before any cards are played, the dealer chooses whether for that hand the players will have the play of the hand and the scoring based on GeoPlunge Continent Series, GeoPlunge BC (i.e., Border and Capital) Series, GeoPlunge SIP (i.e., Size, Independence and Population) Series, GeoPlunge GRT (Government, Religion and Time Zone) Series, or GeoPlunge LCL (Language, Currency and Life Expectancy) Series.
7. GeoPlunge Border Series—Two to Four Players
   Playing the Game:
   To win a player must have in his or her hand two groups of cards. One of the groups must consist of four cards where one of the states in the group borders each of the other three states in the group. The other group must consist of three cards where one of the states in the group borders each of the other two states in the group. No card can be used in more than one group.
   Scoring:
   Eight points are awarded for winning the hand. Ten bonus points are awarded if the group of four cards consists of four states that all border each other (which is called a "4 All"). Five bonus points are awarded if the group of three cards consists of three states that all border each other (which is called a "3 All").
8. GeoPlunge Capital Series Two to Four Players
   Playing the Game:
   To win a player must have in his or her hand a group of 4 cards, and a separate group of 3 cards, where for each group (a) all of the state capitals in the group begin with the same first letter (which is called "Same First Letter Capitals"); or (b) all of the state capitals in the group are the same in relation to the Top 3 Cities (which is called "Same Relation Capitals"). All of the cards in a group are Same Relation Capitals only if (a) all of the state capitals are Red Top Cities (which are called "Red Top City Capitals"); or (b) all of the state capitals are Blue Top Cities (which are called "Blue Top City Capitals"); or (c) all of the state capitals are Green Top Cities (which are called "Green Top City Capitals"); or (d) none of the state capitals is a Red Top City, Blue Top City or a Green Top City (which are called "No Top City Capitals"). In addition, to win, a player must have two different types of groups (e.g., a player's group of 4 cards and group of 3 cards cannot both be Blue Top City Capital groups), and at least one of the groups must be Same First Letter Capitals, Blue Top City Capitals or Green Top City Capitals. No card can be used in more than one group.
   Scoring:
   Eight points are awarded for winning the hand. Ten bonus points are awarded if the group of four cards is Same First Letter Capitals or Green Top City Capitals. Five bonus points are awarded if the group of three cards is Same First Letter Capitals or Green Top City Capitals.
9. GeoPlunge Capital Series—Two to Four Players
   Playing the Game:
   To win a player must have in his or her hand a group of 4 cards, and a separate group of 3 cards, where for each group all of the cards in the group have successive ranks of Size, all have successive ranks of Statehood, or all have successive ranks of Population (e.g., ranking as the $5^{th}$ through $8^{th}$ most populated states). To win, a player also must have two different types of groups (e.g. the group of 4 cards and the group of 3 cards cannot both be groups having successive ranks of Size). No card can be used in more than one group.
   Scoring:
   Eight points are awarded for winning the hand. Ten bonus points are awarded if the group of four cards is comprised of states all in the same Zone. Five bonus points are awarded if the group of three cards is comprised of states all in the same Zone. (The Zone of each card is determined by the color of the border at the top of the card).
10. GeoPlunge Dealer Selects Series—Two to Four Players
    Playing the Game and Scoring:
    For each hand, after the cards are dealt but before any cards are played, the dealer chooses whether for that hand the players will have the play of the hand and the scoring based on GeoPlunge Border Series, GeoPlunge SSP Series, or GeoPlunge Capital Series.

Figure 9:
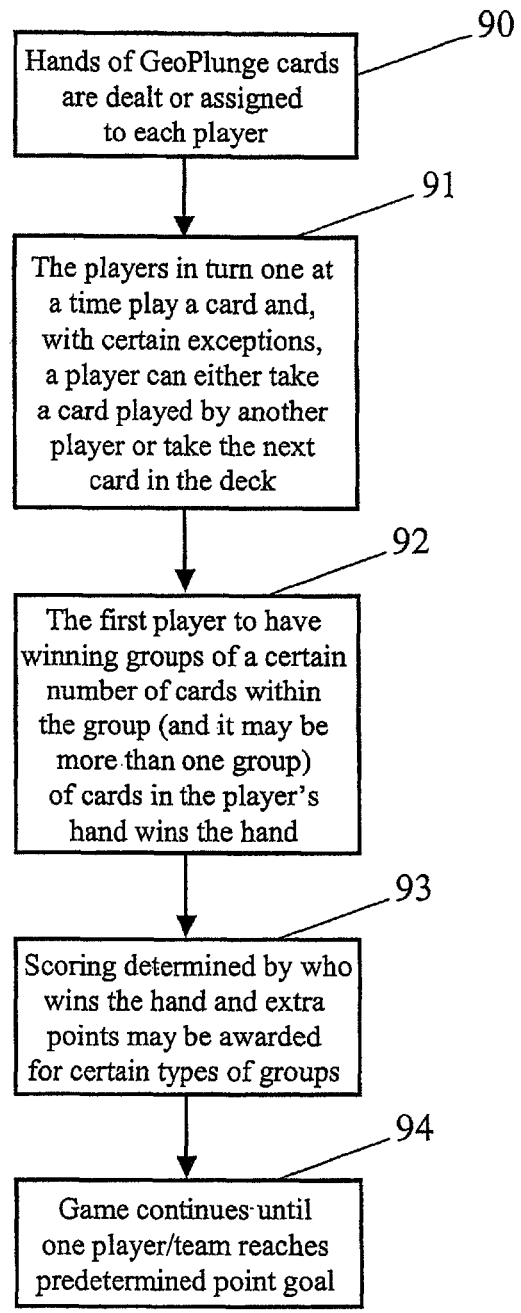
FIGS. 9-16 show flow diagrams of additional exemplary methods of play of additional variations of geography related games, in accordance with embodiments of the present invention.

FIG. 9 presents a flow diagram of play of an exemplary GeoPlunge Series Game, in accordance with an embodiment of the present invention. Hands of GeoPlunge cards are dealt or assigned to each player 90. The players in turn, one at a time, play a card and, with certain exceptions, a player can either take a card played by another player or take the next card in the deck 91. The first player to have winning groups of a certain number of cards within the group (and it may be more than one group) of cards in the player's hand wins the hand 92.

Whether groups of cards are winning groups varies by game and may be based on one or more of the following where the GeoPlunge state cards are used, depending on the game: (i) groups of cards that have consecutive rankings in size, statehood or population; (ii) groups of cards in which one card in the group is a border state of each of the other cards in the group (or in some games it must be that a person can travel from one state in the group to another state in the group while crossing all of the other states in the group and not any other states); (iii) groups of cards in the same time zone; (iv) groups of cards in which each state capital in the group begins with the same first letter; (v) groups of cards in which each card in the group has a state capital that is the most populous city in its state, or groups of cards in which each card in the group has a state capital that is the second most populous city in the state, or groups of card in which each card in the group has a state capital that is the third most populous city in its state; or (iv) groups of cards in which each card in the group has a state capital that is not the first, second or third most populous city in its state. Where the GeoPlunge country cards are used, examples of the groupings are set forth in games described above.

Scoring is determined by which player wins the hand, and extra points may be awarded for certain types of groups 93. The game continues until one player/team reaches a predetermined point goal, such as a point total 94.

GeoPlunge Power Games
General Rules that Apply to All of the GeoPlunge Power Games Various GeoPlunge Power games may be played, such as the following: GeoPlunge Basic Power (Country Version), GeoPlunge Intermediate Power (Country Version), GeoPlunge Advanced Power (Country Version), GeoPlunge Basic Power, GeoPlunge Intermediate Power, and GeoPlunge Advanced Power. Each GeoPlunge Power game Country Version may be played with two, three, four, five, six, seven, or eight players, and each other GeoPlunge Power game may be played with two, three or four players. Each GeoPlunge Power game Country Version may also be played with two teams of two players each, three teams of two players each, four teams of two players each, two teams of three players each, or two teams of four players each, and each other GeoPlunge Power game may also be played with two teams of two players each (if the game is played with teams, teammates should sit across from each other, not next to each other). Both the GeoPlunge cards and the GeoPower cards are used.

In some embodiments, each hand, each player is dealt nine cards, and nine tricks are played during the hand (but the number of cards dealt, and the number of tricks played during a hand, can vary in any of the embodiments of the GeoPlunge Power games so long as there are at least 3 tricks cards dealt to each player and at least 3 tricks played, and in each hand the number of cards dealt to each player will equal the number of tricks played on that hand; therefore, for example, players may, if they wish, have 4 cards dealt to each player, and 4 tricks on each hand). A trick consists of each player, in clockwise order, one at a time, playing (i.e., placing onto the table or other playing surface) one of his or her GeoPlunge cards. For each hand, on the first trick the dealer is the first person to play a card (this is called leading). Thereafter, whoever wins a trick leads on the next trick. (During a hand, a player cannot play any card he or she has already played on a prior trick in that hand).

Each hand, after the players are dealt their GeoPlunge cards, the players select from the GeoPower card deck the Control GeoPower card for that hand, which card helps determine which GeoPlunge cards will be powerful during that hand. To determine what will be the Control GeoPower card, the dealer lays face up in the middle of the table or other playing surface a certain number of GeoPower cards. The number of GeoPower cards laid face up should be two greater than the number of players (or in other embodiments it can be just one card laid face up, which will automatically be the Control GeoPower card, or it can be less than or more than two greater than the number of players (for example, it may be one more than the number of players in which case each player will remove one GeoPower card and the remaining card will be the Control GeoPower card).

In the embodiment where the number of GeoPower cards laid face up is two greater than the number of players, the dealer removes two of the GeoPower cards laying face up. Each other player in turn (going in clockwise order) then removes one of the remaining GeoPower cards so that only one GeoPower card remains laying face up. The remaining GeoPower card is the Control GeoPower card for that hand.

Specific GeoPlunge Power Game Rules

GeoPlunge Basic Power (Country Version)—Two to Eight Players

Playing the Game and Ranking of the GeoPlunge Cards:

For each trick during a hand, each player can play any card then remaining in his or her hand, and whoever plays the highest ranking GeoPlunge card wins that trick. The Control GeoPower card for that hand determines the ranking of the GeoPlunge cards. For each hand in which the Control GeoPower card says:

(1) Size, the GeoPlunge cards are ranked based on the size of the country, with Russia as the highest ranking card;
(2) Independence, the GeoPlunge cards are ranked based on their year of independence, with the country that has had independence for the longest period as the highest ranking card cards (if two players play a card with the same year of independence, the first to play such a card wins as between those two players);
(3) Population, the GeoPlunge cards are ranked based on the population of the country, with China as the highest ranking card;
(4) Time Zone, the GeoPlunge cards are ranked based on the time zone of the country, with the countries with the earliest time zones (i.e., the largest, in terms of absolute value, negative numbers) as the highest ranking cards (if two players play a card with the same time zone, the first to play such a card wins as between those two players);
(5) Life Expectancy, the GeoPlunge cards are ranked based on the life expectancy of the people in the country, with the countries with the greatest life expectancies as the highest ranking cards (if two players play cards with the same life expectancy, the first to play such a card wins as between those two players).

Scoring:

Unless a player seeks to GeoPlunge (as described below), the player who wins the most tricks each hand gets a predetermined number of points (e.g., 40). If it is a tie, the player who took the last trick among the tied players gets the points. In embodiments where the players are dealt at least 8 cards each, if a player announces before more than half the tricks have been played in a hand that the player is seeking to GeoPlunge, that player gets bonus points (e.g., 80) if he or she wins at least all but one of the tricks (or, unless the game is being played with teams, at least all but two of the tricks if there are at least three players, or at least all but three of the tricks if there are at least five players). Otherwise, that player gets no points even if he or she wins the majority of the tricks.

If the game is played with teams, the scoring is the same as above, except that it applies to the team rather than the individual. For example, whichever team wins the most tricks wins the hand and gets the predetermined points (unless that team unsuccessfully seeks to GeoPlunge). If a player on a team announces before more than half the tricks in a hand have been played that the team is seeking to GeoPlunge, that team gets the bonus points if it wins at least all but one of the tricks (or at least all but two of the tricks if there are at least three teams). Otherwise, that team gets no points even if it wins the majority of the tricks. The tricks won by a team equals the sum of the tricks won by each player on the team.

2. GeoPlunge Intermediate Power (Country Version—Two to Eight Players

All of the scoring rules for GeoPlunge Basic Power (Country Version) apply, and all of the other rules in GeoPlunge Basic Power apply, except as follows.

Playing the Game:

For each trick, the person who plays the highest ranking card in the continent of the card that is led wins the trick. Just like in GeoPlunge Basic Power (Country Version), for each trick, the player who leads on that trick can play any card then remaining in his or her hand. However, in GeoPlunge Intermediate Power, for each trick, each player who does not lead on that trick must, if possible, play a card from his or her hand that is in the same continent as the card led. If a player does not have a card remaining in his or her hand that is in the same continent as the card led, the player may play any card then remaining in his or her hand.

3. GeoPlunge Advanced Power (Country Version)—Two to Eight Players (See FIG. 10 for Flow Diagram of Play)

Ranking of the GeoPlunge Cards:

Each hand, both the Control GeoPower card, and a Governing card will help determine which GeoPlunge cards will be powerful during that hand. The Governing card will be one of the GeoPlunge cards that is not dealt to the players during that hand.

To determine the Governing card for a hand, following dealing of the hands, immediately after the Control GeoPower card is selected, the dealer lays face up in the middle of the table or other playing surface a certain number of GeoPlunge cards from the top of the deck. The number of GeoPlunge cards laid face up should be two greater than the number of players (or in other embodiments it can be just one card laid face up, which will automatically be the Governing card, or it can be less than or more than two greater than the number of players (for example, it may be one more than the number of players in which case each player will remove one GeoPlunge card laid face up and the remaining card will be the Governing card).

In the embodiment where the number of GeoPlunge cards laid face up is two greater than the number of players, the dealer then removes two of the GeoPlunge cards laid face up. Each other player in turn (going in clockwise order) then removes one of the remaining GeoPlunge cards laid face up so that only one GeoPlunge card remains face up. That card is the Governing card for that hand. (The GeoPlunge cards that were removed are not used in the hand).

For each hand, the GeoPlunge cards dealt to the players are ranked as follows:

(1) Capital GeoDynamo cards have the highest ranking (these are cards whose country's capital begins with the same first letter as the Governing card's country's capital).
(2) Ranked just below Capital GeoDynamo cards are the other type of GeoDynamo cards, which are called Natural GeoDynamo cards (these are cards that are in the same continent as the Governing card, except that Capital GeoDynamo cards are not considered to be Natural GeoDynamo cards even if they are in the same continent as the Governing card).
(3) Ranked below Natural GeoDynamo cards are Ordinary cards (these are cards that are neither Capital GeoDynamo cards nor Natural GeoDynamo cards).

Each Capital GeoDynamo card has the same ranking as each other Capital GeoDynamo card for that hand (i.e., tied for the highest ranking). Natural GeoDynamo cards do not have the same ranking as each other for a hand. Similarly, Ordinary cards do not have the same ranking as each other for a hand. In both of those instances, the Control GeoPower card helps determine which cards have higher rankings. As between two Natural GeoDynamo cards, or as between two Ordinary cards, which one has a higher ranking depends upon which one has the higher:

(1) Size ranking, if the Control GeoPower card says Size for that hand (Russia has the highest size ranking);
(2) Independence ranking, if the Control GeoPower card says Independence for that hand (the country that has been independent the longest has the highest independence ranking);
(3) Population ranking, if the Control GeoPower card says Population for that hand (China has the highest Population ranking);
(4) Time Zone ranking, if the Control GeoPower card says Time Zone for that hand (the countries with the largest, in terms of absolute value, negative number have the highest Time Zone ranking); and
(5) Life Expectancy ranking, if the Control Power card says Life Expectancy for that hand (the countries with the highest life expectancy have the highest Life Expectancy ranking).

Playing the Game:

For each trick, the player who leads on that trick (i.e., plays the first card played on that trick) can play any card then remaining in his or her hand. For each trick in which a GeoDynamo card is led, each other player must, if possible, play a GeoDynamo card from his or her hand on that trick. If a player does not have any GeoDynamo cards remaining in his or her hand when a GeoDynamo card is led, that player may play any card remaining in his or her hand.

For each trick in which an Ordinary card is led, each other player must (unless that player decides to play a GeoDynamo card), if possible, play an Ordinary card from his or her hand that is in the same continent as the card that is led. If the player does not have any Ordinary cards remaining that are in the same continent as the Ordinary card that is led, the player may play any card from his or her hand. (The players may, in the alternative, play that if an Ordinary Card is led, another play cannot play a GeoDynamo card if that other player has an Ordinary Card in his or her hand that is in the same continent as the card that is led).

To determine who wins each trick, the following rules apply:

(1) If two or more Capital GeoDynamo cards are played on a trick, the player who played a Capital GeoDynamo card first wins the trick.
(2) If one Capital GeoDynamo card is played on a trick, the player who played that card wins the trick.
(3) If two or more Natural GeoDynamo cards are played on a trick (and no Capital GeoDynamo cards are played on that trick), the player who plays the highest ranking Natural GeoDynamo card of those that are played wins the trick (if two or more players play Natural GeoDynamo cards that are of the same rank, and they are the highest ranking Natural GeoDynamo cards played on the trick, the first to play such a card wins the trick).
(4) If one Natural GeoDynamo card is played on a trick (and no Capital GeoDynamo cards are played on that trick), the player who played the Natural GeoDynamo card wins the trick.
(5) If no GeoDynamo cards are played on a trick, whoever plays the highest ranking Ordinary card in the continent that is led wins the trick (if two or more players play Ordinary cards in the continent that is led that are of the same rank and they are the highest ranking Ordinary cards in the continent that is led played on the trick, the first to play such a card wins the trick).

Scoring:

Unless a player seeks to GeoPlunge (as described below), the player who wins the most tricks each hand gets a predetermined number of points (e.g., 30). If it is a tie, the player who took the last trick among the tied players gets the points. Additional points (e.g., 20) are awarded to the player who has in his or her hand at the time play begins the highest ranking Natural GeoDynamo card. Points (e.g., 12) are given to the first player during the hand to win a trick where a border country of the Governing card country was played on that trick. In embodiments where each player receives at least 8 cards, if a player announces before more than half the tricks have been played in a hand that the player is seeking to GeoPlunge, that player gets bonus points (e.g., 50) for the hand if he or she wins at least all but one of the tricks (or, unless the game is being played with teams, at least all but two of the tricks if there are at least three players, or at least all but three of the tricks if there are at least five players). Otherwise, that player gets no points for the hand even if the player otherwise would have received points.

If the game is played with teams, the scoring is the same as above, except that it applies to the team rather than the individual. For example, whichever team wins the most tricks wins the hand and gets the predetermined points (unless that team unsuccessfully seeks to GeoPlunge). In embodiments where each player receives at least 8 cards, if a player on a team announces before more than half the tricks have been played in a hand that the team is seeking to GeoPlunge, that team gets the bonus points if it wins at least all but one of the tricks (or at least all but two of the tricks if there are at least three teams). Otherwise, that team gets no points even if it otherwise would have received points. The tricks won by a team equals the sum of the tricks won by each player on the team.

4. GeoPlunge Basic Power—Two to Four Players

Playing the Game and Ranking of the GeoPlunge Cards:

For each trick during a hand, each player can play any card then remaining in his or her hand, and whoever plays the highest ranking GeoPlunge card wins that trick. The Control GeoPower card for that hand determines the ranking of the GeoPlunge cards. For each hand in which the Control GeoPower card says (1) Size, the GeoPlunge cards are ranked based on the size of the state, with Alaska as the highest ranking card;
(2) Statehood, the GeoPlunge cards are ranked based on their date of entry into the union, with Delaware as the highest ranking card; or
(3) Population, the GeoPlunge cards are ranked based on the population of the state, with California as the highest ranking card.

Scoring:

Unless a player seeks to GeoPlunge (as described below), the player who wins the most tricks each hand gets 10 points. If it is a tie, the player who took the last trick among the tied players gets the 10 points. In embodiments where each player receives at least 8 cards, if a player announces before more than half the tricks have been played in a hand that the player is seeking to GeoPlunge, that player gets 20 bonus points if he or she wins at least all but one of the tricks (or, unless there are two teams playing, at least all but two of the tricks if there are at least 3 players). Otherwise, that player gets no points even if he or she wins the majority of the tricks.

If the game is played with two teams of 2 players each, the scoring is the same as above, except that it applies to the team rather than the individual. For example, whichever team wins the most tricks wins the hand and gets 10 points (unless that team unsuccessfully seeks to GeoPlunge). The tricks won by a team equals the sum of the tricks won by each player on the team.

5. GeoPlunge Intermediate Power—Two to Four Players

All of the scoring rules for GeoPlunge Basic Power apply, and all of the other rules in GeoPlunge Basic Power apply, except as follows. Playing the Game: In GeoPlunge Intermediate Power, for each trick, the person who plays the highest ranking card in the Zone of the card that is led wins the trick. (The Zone of each card is determined by the color of the border at the top of the card). Just like in GeoPlunge Basic Power, for each trick, the player who leads on that trick can play any card then remaining in his or her hand. However, in GeoPlunge Intermediate Power, for each trick, each player who does not lead on that trick must, if possible, play a card from his or her hand that is in the same Zone as the card led. If a player does not have a card remaining in his or her hand that is in the same Zone as the card led, the player may play any card then remaining in his or her hand.

6. GeoPlunge Advanced Power—Two to Four Players

Ranking of the GeoPlunge Cards:

Each hand, both the Control GeoPower card, and a Governing card will help determine which GeoPlunge cards will be powerful during that hand. The Governing card will be one of the GeoPlunge cards that is not dealt to the players during that hand.

To determine the Governing card for a hand, following dealing of the hands, immediately after the Control GeoPower card is selected (which is selected in the same manner that the Control GeoPower card is selected in GeoPlunge Basic Power), the dealer lays face up in the middle of the table or other playing surface a certain number of GeoPlunge cards from the top of the deck. The number of GeoPlunge cards laid face up should be two greater than the number of players (or in other embodiments it can be just one card laid face up, which will automatically be the Governing card, or it can be less than or more than two greater than the number of players (for example, it may be one more than the number of players in which case each player will remove one GeoPlunge card laid face up and the remaining card will be the Governing card.)

In the embodiment where the number of GeoPlunge cards laid face up is two greater than the number of players, the dealer then removes two of the GeoPlunge cards laid face up. Each other player in turn (going in clockwise order) then removes one of the remaining GeoPlunge cards laid face up so that only one GeoPlunge card remains face up. That card is the Governing card for that hand. (The GeoPlunge cards that were removed are not used in the hand).

For each hand, the GeoPlunge cards dealt to the players are ranked as follows:

(1) Capital GeoDynamo cards have the highest ranking (these are cards whose state's capital begins with the same first letter as the Governing card's state's capital).
(2) Ranked just below Capital GeoDynamo cards are the other type of GeoDynamo cards, which are called Natural GeoDynamo cards (these are cards that are in the same time zone as the Governing card (and for purposes of this game two cards are in the same time zone if they have the same color coded border at the top of the cards), except that Capital GeoDynamo cards are not considered to be Natural GeoDynamo cards even if they are in the same time zone as the Governing card).
(3) Ranked below Natural GeoDynamo cards are Ordinary cards (these are cards that are neither Capital GeoDynamo cards nor Natural GeoDynamo cards).

Each Capital GeoDynamo card has the same ranking as each other Capital GeoDynamo card for that hand (i.e., tied for the highest ranking). Natural GeoDynamo cards do not have the same ranking as each other for a hand. Similarly, Ordinary cards do not have the same ranking as each other for a hand. In both of those instances, the Control GeoPower card helps determine which cards have higher rankings. As between two Natural GeoDynamo cards, or as between two Ordinary cards, which one has a higher ranking depends upon which one has the higher:

(1) Size ranking, if the Control GeoPower card says Size for that hand (Alaska has the highest size ranking);
(2) Statehood ranking, if the Control GeoPower card says Independence for that hand (Delaware has the highest statehood ranking);

(3) Population ranking, if the Control GeoPower card says Population for that hand (California has the highest Population ranking);

Playing the Game:

For each trick, the player who leads on that trick (i.e., plays the first card played on that trick) can play any card then remaining in his or her hand. For each trick in which a GeoDynamo card is led, each other player must, if possible, play a GeoDynamo card from his or her hand on that trick. If a player does not have any GeoDynamo cards remaining in his or her hand when a GeoDynamo card is led, that player may play any card, remaining in his or her hand.

For each trick in which an Ordinary card is led, each other player must (unless that player decides to play a GeoDynamo card), if possible, play an Ordinary card from his or her hand that is in the same time zone as the card that is led. If the player does not have any Ordinary cards remaining that are in the same time zone as the Ordinary card that is led, the player may play any card from his or her hand. (The players may, in the alternative, play that if an Ordinary Card is led, another play cannot play a GeoDynamo card if that other player has an Ordinary Card in his or her hand that is in the same time zone as the card that is led).

To determine who wins each trick, the following rules apply:

(1) If two or more. Capital GeoDynamo cards are played on a trick, the player who played a Capital GeoDynamo card first wins the trick.

(2) If one Capital GeoDynamo card is played on a trick, the player who played that card wins the trick.

(3) If two or more Natural GeoDynamo cards are played on a trick (and no Capital GeoDynamo cards are played on that trick), the player who plays the highest ranking Natural GeoDynamo card of those that are played wins the trick (if two or more players play Natural GeoDynamo cards that are of the same rank, and they are the highest ranking Natural GeoDynamo cards played on the trick, the first to play such a card wins the trick).

(4) If one Natural GeoDynamo card is played on a trick (and no Capital GeoDynamo cards are played on that trick), the player who played the Natural GeoDynamo card wins the trick.

(5) If no GeoDynamo cards are played on a trick, whoever plays the highest ranking Ordinary card in the Zone (i.e., time zone) that is led wins the trick.

Scoring:

Unless a player seeks to GeoPlunge (as described below), the player who wins the most tricks each hand gets a predetermined number of points (e.g., 8). If it is a tie, the player who took the last trick among the tied players gets the points. Additional points (e.g., 5) are awarded to the player who has in his or her hand at the time play begins the highest ranking Natural GeoDynamo card. Points (e.g., 12) are given to the first player during the hand to win a trick where a border state of the Governing card state was played on that trick. In embodiments where each player receives at least 8 cards, if a player announces before more than half the tricks have been played in a hand that the player is seeking to GeoPlunge, that player gets bonus points (e.g., 12) for the hand if he or she wins at least all but one of the tricks (or, unless the game is being played with teams, at least all but two of the tricks if there are at least three players). Otherwise, that player gets no points for the hand even if the player otherwise would have received points.

If the game is played with teams, the scoring is the same as above, except that it applies to the team rather than the individual. For example, whichever team wins the most tricks wins the hand and gets the predetermined points (unless that team unsuccessfully seeks to GeoPlunge). In embodiments where each player receives at least 8 cards, if a player on a team announces before more than half the tricks have been played in a hand that the team is seeking to GeoPlunge, that team gets the bonus points if it wins at least all but one of the tricks. Otherwise, that team gets no points even if it otherwise would have received points. The tricks won by a team equals the sum of the tricks won by each player on the team.

Figure 10:
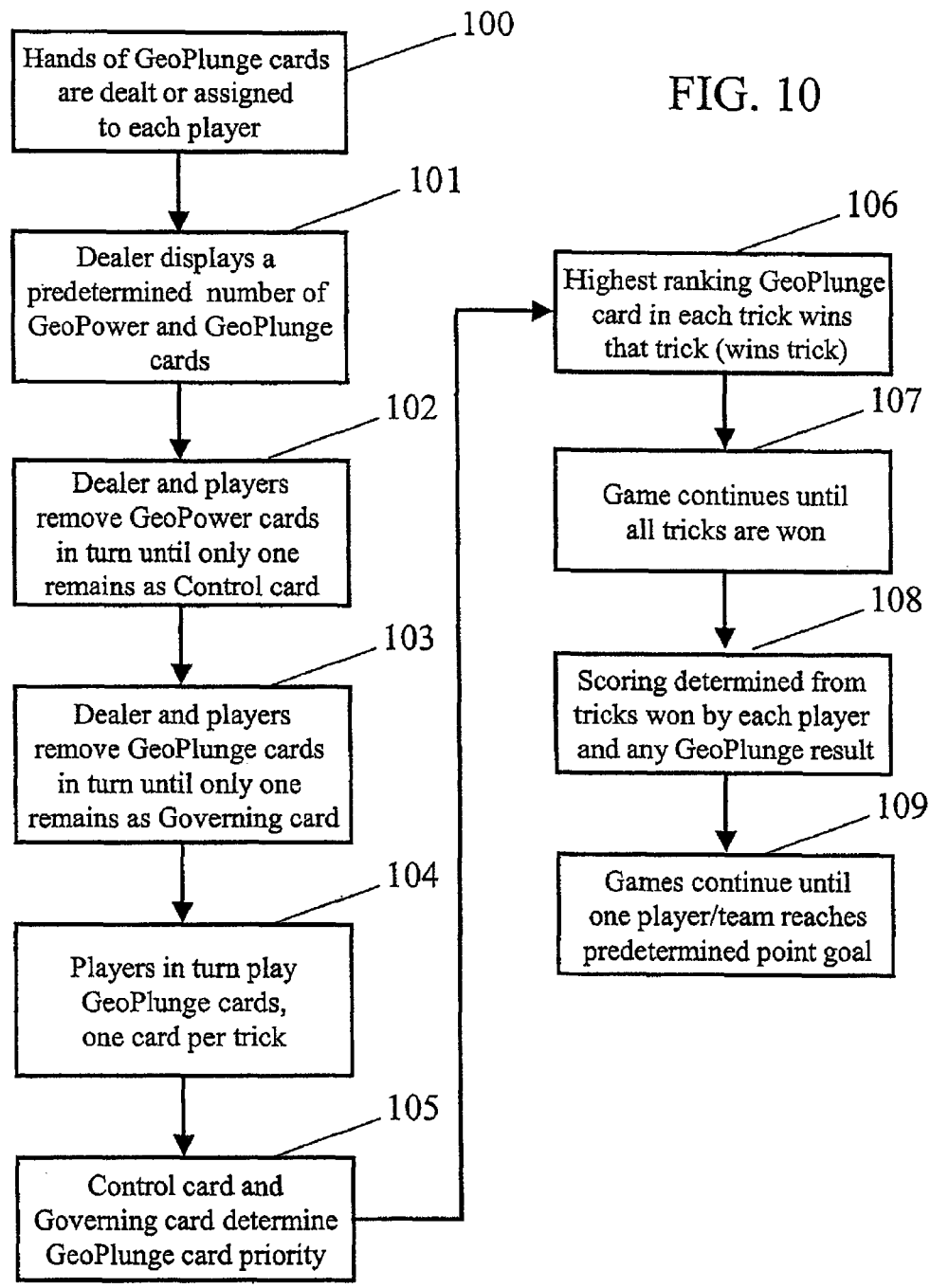

FIG. 10 presents play of GeoPlunge Advanced Power, in accordance with an embodiment of the present invention. As shown in FIG. 10, hands of GeoPlunge cards are dealt or assigned to each player 100. The dealer then presents a predetermined number of GeoPower and GeoPlunge cards 101. The dealer and players remove GeoPower cards until only one remains as the Control card 102, and the dealer and players remove GeoPlunge cards until only one remains as the Governing card 103.

Players in turn play GeoPlunge cards, one card per trick 104. The Control card and the Governing card determine GeoPlunge card priority 105. The highest ranking GeoPlunge card in each hand wins that hand 106. The game continues until all tricks are won 107. Scoring for each player is determined from tricks won by each player and any GeoPlunge result 108. Additional games continue until one player or team reaches a predetermined point total 109.

Additional exemplary games, with exemplary scoring, card numbers, geographic areas, and other variables, will now be discussed in detail.

GeoPlunge Power SSP Plus and Borders Plus Games

General Rules that Apply to All GeoPlunge Power Plus Games

Various GeoPlunge Power Plus games may be played, including the following exemplary embodiments: GeoPlunge Power SSP Plus 1, GeoPlunge Power SSP Plus 1 Reverse, GeoPlunge Power Borders Plus 1, GeoPlunge Power Borders Plus 1 Reverse, GeoPlunge Power SSP Plus 2, GeoPlunge Power SSP Plus 2 Reverse, GeoPlunge Power Borders Plus 2, and GeoPlunge Power Borders Plus 2 Reverse. Both the GeoPlunge cards and the GeoPower cards are used in these games.

GeoPlunge Power Plus Games may be played with anywhere from 2 to 8 players, each playing individually.

With 2 to 4 players, one GeoPlunge deck is used. With 5 to 8 players, 2 GeoPlunge decks are used.

If there are two players, each player is dealt 25 GeoPlunge cards. If there are three or six players, each player is dealt 16 GeoPlunge cards. If there are four or eight players, each player is dealt 12 GeoPlunge Cards. If there are five players, each player is dealt 20 GeoPlunge cards, and if there are seven players, each player is dealt 14 GeoPlunge cards.

To determine who is the dealer, each player, without looking, draws a card from the GeoPlunge card deck and whoever draws the highest ranking statehood card among the cards drawn (Delaware has the highest statehood ranking) is the dealer.

Each game is played one trick at a time. A trick consists of each player playing a certain number of GeoPlunge cards on that trick (the number of cards played varies by game), and it may also consist of players "Risking" other GeoPlunge cards on that trick.

Whichever player wins the trick wins all of the cards played on that trick (which are called "Current Top Cards," see below) and all of the cards "Risked" on that trick. Where there are 3, 4 or 7 players, whoever wins the first trick of the game also wins the two cards that were not originally dealt to any player. Where there are 6 or 8 players, whoever wins the first trick of the game also wins the four cards that were not originally dealt to any player.

The player that wins a trick lays those cards won on the trick to the side and after that player has no more cards (other than those cards he or she laid to the side), that player shuffles those cards and continues to play, now using those cards.

A player is eliminated from the game when the player has no GeoPlunge cards remaining. The last player to have any GeoPlunge cards remaining wins the game. Alternatively, if the players wish, they can play for a predetermined amount of time (e.g., ½ hour) and whoever has the most GeoPlunge cards at the expiration of that time wins the game. In addition, the games discussed below involve the players playing only one (in some games) or two (in other games) GeoPlunge cards on a trick (excluding the additional cards risked). Similar variations can be played with the players playing three or more GeoPlunge cards on a trick (excluding the additional cards risked) with the same principles set forth below but just extended to additional cards being played. In addition, all of the games set forth below use the state GeoPlunge cards, but games using the same principles can be played using the country GeoPlunge cards (such that in the SSP games set forth below, in the country version the rankings, in one embodiment would be size, independence, population, time zone, and life expectancy, and in the Border games set forth below, the concept of the number of border states would be replaced by the concept of the number of border countries. Also, in other embodiments, the number of cards permitted to be risked on a hand may be more or less than 5 cards.

GeoPlunge Power SSP Plus 1

Playing the Game:

For each trick, each player plays (by placing face down on the table or other playing surface) the then top GeoPlunge card (i.e., the card at the top of the player's pile of cards) in that player's possession (the "Current Top Card"). A player may look at his or her Current Top Card but a player may not look at any of his or her other GeoPlunge cards.

For each trick, each player must also decide whether to "Risk" 1, 2, 3, 4 or 5 other GeoPlunge cards then in the player's possession during that trick. If a player decides to Risk 1, 2, 3, 4 or 5 other GeoPlunge cards then in the player's possession during that trick, except as provided in the next paragraph below, each other player can only remain in that trick (i.e., in contention to win that trick) if that player also Risks the same number of additional GeoPlunge cards in that player's possession. Therefore, for example, if one player Risks 2 additional GeoPlunge cards for a trick, each other player can only remain in the trick if that other player also Risks 2 additional GeoPlunge cards for that trick. Unless the players otherwise agree to not enforce this rule, under no circumstances shall a player be required to Risk more than 5 additional GeoPlunge cards in that player's possession during a trick to remain in contention for that trick. Therefore, for example, if one player forces the other players to Risk 2 additional GeoPlunge cards to remain in on a trick, another player can force each player to Risk at most 3 additional GeoPlunge cards to remain in on that trick. Once a player Risks additional GeoPlunge cards on a trick, a player loses those cards automatically if the player later goes out before the end of the trick. In addition, if a player goes out before the end of the trick, that player automatically loses that player's Current Top Card for that trick.

If a player does not have enough cards left (including any cards the player has put on the side because he or she won an earlier trick) to Risk the same number of cards on a trick that someone else has Risked, a player can remain in contention on that trick by Risking any remaining cards that player has (if the players agree in advance, they can play such that such player wins only a pro rata portion of the cards played on that trick if others have Risked more cards). If that player then loses that trick, that player is eliminated from the game.

Players may not look at the GeoPlunge cards they are going to Risk before deciding whether to Risk those cards (and they only may look at them if they decide to Risk them, and then only after all decisions regarding Risking cards have been made for that trick). The GeoPlunge cards a player Risks are always the then top GeoPlunge cards in the player's hand that are immediately below the Current Top Card for that player on that trick.

On each trick each player will have an option as to whether to Risk additional GeoPlunge cards, and the players will make their selection one at a time in clockwise order until each player has either gone out on that trick or risked the same number of GeoPlunge cards as each other player remaining in on that trick (except as otherwise stated above where a player does not have enough cards left in his or her possession).

On the first trick, the first player to decide whether to Risk any additional GeoPlunge cards will be the player to the immediate left of the dealer. On the second trick, it will be the player second to the left of the dealer (or the dealer if there are only two players), and so on.

On each trick, if no player has yet Risked any additional GeoPlunge cards, a player whose turn it is to decide may either Risk 1, 2, 3, 4 or 5 additional cards, or not, at that time, Risk any additional cards. If, however, one or more players who have not yet had a turn to Risk on that trick later Risk additional GeoPlunge cards on that trick, that earlier player may stay in the trick only if he or she agrees to Risk the same number of additional GeoPlunge cards (except as otherwise stated above where a player does not have enough cards left in his or her possession).

On each trick, if a player has Risked 1, 2, 3 or 4 additional GeoPlunge cards, another player whose turn it is to then decide what to do, may either go out for that trick, Risk the same number of additional cards risked by the earlier player, or Risk additional GeoPlunge cards (but 5 is the total additional amount that may be Risked).

On each trick, if a player has Risked 5 additional GeoPlunge cards, another player whose turn it is to then decide what to do, may either go out for that trick, or Risk 5 additional GeoPlunge cards as well.

After the players have decided how many additional GeoPlunge cards to Risk on a trick (and after each player decides whether to remain in on a trick), the Control GeoPower card (defined below) is then turned face up (i.e., looked at by all of the players) for the trick.

For each trick, the GeoPower card used on that trick (which is simply the then top GeoPower card in the deck) is called the Control GeoPower Card for that trick.

For each trick in which the Control GeoPower Card says:
1. Size, the Current Top Card for each player on that trick is ranked based on the size of the state, with Alaska as the highest ranking card;
2. Statehood, the Current Top Card for each player on that trick is ranked based on their date of entry into the union, with Delaware as the highest ranking card; or
3. Population, the Current Top Card for each player on that trick is ranked based on the population of the state, with California as the highest ranking card.

After a GeoPower card is the Control GeoPower Card, it is removed from the game until all of the GeoPower cards have been used on tricks. At that time, the GeoPower card deck is reshuffled.

For each trick, the player who wins the trick is the player who has the Current Top Card with the highest ranking (and the relevant ranking for a trick is based on the Control GeoPower Card for that trick) for that trick among those players who remained in for the trick. For example, where there are two players in the game, if the Control GeoPower card for a trick says Population, and the first player's Current Top Card for that trick is ranked $12^{th}$ in population, and the second player's Current Top Card for that trick is ranked $19^{th}$ in population, the first player wins the trick.

Where multiple decks are used, if two players tie on a trick for best hand (which can only occur where their Current Top Cards are the same state), the players each keep their own cards, and split evenly the cards played and Risked by the other players on that trick (if there are an uneven number of cards to split, the player closest to the dealer's left takes the extra card).

GeoPlunge Power SSP Plus 1 Reverse

All of the rules of GeoPlunge Power SSP Plus 1 apply, except that in GeoPlunge Power SSP Plus 1 Reverse, for each trick, the player who wins the trick is the player who has the Current Top Card with the lowest ranking (and the relevant ranking for a trick is based on the Control GeoPower Card for that trick) for that trick among those players who remained in for the trick. For example, where there are two players in the game, if the Control GeoPower card for a trick says Population, and the first player's Current Top Card for that trick is ranked $12^{th}$ in population, and the second player's Current Top Card for that trick is ranked $19^{th}$ in population, the second player wins the trick.

GeoPlunge Power Borders Plus 1

All of the rules of GeoPlunge Power SSP Plus 1 apply to GeoPlunge Power Borders Plus 1, except as follows:

For each trick, the player who wins the trick is the player whose Current Top Card has the most border states among those players who remained in for the trick. For example, where there are two players in the game, if the first player's Current Top Card is a state that has four border states, and the second players Current Top Card is a state that has two border states, the first player wins the trick.

If two or more players' Current Top Cards on a trick are tied for the most border states among those players who remained in for the trick, to determine who wins the trick among those players who tied, the tiebreaker is as follows: among those tied players, the trick is completed in the same manner as a trick would be completed in GeoPlunge Power SSP Plus 1. That is, the next GeoPower card in the GeoPower card deck is turned face-up and that becomes the Control GeoPower Card for that trick among the tied players.

For example, where there are two players in the game, if each of their Current Top Cards have four border states, and the Control GeoPower Card for that trick is Population, whichever player's Current Top Card has a better population ranking wins the trick.

Except where a tiebreaker is necessary, the GeoPower cards are not used (i.e., there is not a Control GeoPower Card for each trick, but only for tricks in which a tiebreaker is necessary).

GeoPlunge Power Borders Plus 1 Reverse

All of the rules of GeoPlunge Power Borders Plus 1 apply to GeoPlunge Power Borders Plus 1 Reverse, except as follows:

For each trick, the player who wins the trick is the player whose Current Top Card has the fewest border states among those players who remained in for the trick. For example, where there are two players in the game, if the first player's Current Top Card is a state that has four border states, and the second player's Current Top Card is a state that has two border states, the second player wins the trick.

If two or more players' Current Top Cards on a trick are tied for the fewest border states among those players who remained in for the trick, to determine who wins the trick among those players who tied, the tiebreaker is as follows: among those tied players, the trick is completed in the same manner as a trick would be completed in GeoPlunge Power SSP Plus 1 Reverse. That is, the next GeoPower card in the GeoPower card deck is turned face-up and that becomes the Control GeoPower Card for that trick among the tied players.

For example, where there are two players in the game, if each of their Current Top Cards have four border states, and the Control GeoPower Card for that trick is Population, whichever player's Current Top Card has a worse population ranking wins the trick.

Except where a tiebreaker is necessary, the GeoPower cards are not used (i.e., there is not a Control GeoPower Card for each trick, but only for tricks in which a tiebreaker is necessary).

GeoPlunge Power SSP Plus 2

Playing the Game:

For each trick, each player plays (by placing face down on the table or other playing surface) the then top 2 GeoPlunge cards (i.e., the cards at the top of the player's pile of cards) in that player's possession (the "Current Top Two Cards"). A player may look at his or her Current Top Two Cards but a player may not look at any of his or her other GeoPlunge cards.

For each trick, each player must also decide whether to "Risk" 1, 2, 3, 4 or 5 other GeoPlunge cards then in the player's possession during that trick. If a player decides to Risk 1, 2, 3, 4 or 5 other GeoPlunge cards then in the player's possession during that trick, except as provided in the next two paragraphs below, each other player can only remain in that trick (i.e., in contention to win that trick) if that player also Risks the same number of additional GeoPlunge cards in that player's possession. Therefore, for example, if one player Risks 2 additional GeoPlunge cards for a trick, each other player can only remain in the trick if that other player also Risks 2 additional GeoPlunge cards for that trick. Unless the players otherwise agree to not enforce this rule, under no circumstances shall a player be required to Risk more than 5 additional GeoPlunge cards in that player's possession during a trick to remain in contention for that trick. Therefore, for example, if one player forces the other players to Risk 2 additional GeoPlunge cards to remain in on a trick, another player can force each player to Risk at most 3 additional GeoPlunge cards to remain in on that trick. Once a player Risks additional GeoPlunge cards on a trick, a player loses those cards automatically if the player later goes out before the end of the trick. In addition, if a player goes out before the end of the trick, that player automatically loses that player's Current Top Two Cards for that trick.

If a player does not have enough cards left (including any cards the player has put on the side because he or she won an earlier trick) to Risk the same number of cards on a trick that someone else has Risked, a player can remain in contention on that trick by Risking any remaining cards that player has (if the players agree in advance, they can play such that such player wins only a pro rata portion of the cards played on that trick if others have Risked more cards). If that player then loses that trick, that player is eliminated from the game.

Under no circumstances can a player have only one card remaining in his or her possession at the end of a trick. Therefore, if a player has only one card remaining, a player must Risk that card, even if this requires the player to risk 6 additional cards on that trick (and in such event the other players need to risk only 5 additional cards on that trick to remain in on that trick).

Players may not look at the GeoPlunge cards they are going to Risk before deciding whether to Risk those cards (and they only may look at them if they decide to Risk them, and then only after all decisions regarding Risking cards have been made for that trick). The GeoPlunge cards a player Risks are always the then top GeoPlunge cards in the player's hand that are immediately below the Current Top Two Cards for that player on that trick.

On each trick each player will have an option as to whether to Risk additional GeoPlunge cards, and the players will make their selection one at a time in clockwise order until each player has either gone out on that trick or risked the same number of GeoPlunge cards as each other player remaining in on that trick (except as otherwise stated above where a player does not have enough cards left in his or her possession or where a player would otherwise have only one card remaining in his or her possession).

On the first trick, the first player to decide whether to Risk any additional GeoPlunge cards will be the player to the immediate left of the dealer. On the second trick, it will be the player second to the left of the dealer (or the dealer if there are only two players), and so on.

On each trick, if no player has yet Risked any additional GeoPlunge cards, a player whose turn it is to decide may either Risk 1, 2, 3, 4 or 5 additional cards, or not, at that time, Risk any additional cards. If, however, one or more players who have not yet had a turn to Risk on that trick later Risk additional GeoPlunge cards on that trick, that earlier player may stay in the trick only if he or she agrees to Risk the same number of additional GeoPlunge cards (except as otherwise stated above where a player does not have enough cards left in his or her possession).

On each trick, if a player has Risked 1, 2, 3 or 4 additional GeoPlunge cards, another player whose turn it is to then decide what to do, may either go out for that trick, Risk the same number of additional cards risked by the earlier player, or Risk additional GeoPlunge cards (but 5 is the total additional amount that may be Risked).

On each trick, if a player has Risked 5 additional GeoPlunge cards, another player whose turn it is to then decide what to do, may either go out for that trick, or Risk 5 additional GeoPlunge cards as well.

After the players have decided how many additional GeoPlunge cards to Risk on a trick (and after each player decides whether to remain in on a trick), the Control GeoPower card (defined below) is then turned face up (i.e., looked at by all of the players) for the trick.

For each trick, the GeoPower card used on that trick (which is simply the then top GeoPower card in the deck) is called the Control GeoPower Card for that trick.

For each trick in which the Control GeoPower Card says:
1. Size, the Current Top Two Cards for each player on that trick is ranked based on the size of the state, with Alaska as the highest ranking card;
2. Statehood, the Current Top Two Cards for each player on that trick is ranked based on their date of entry into the union, with Delaware as the highest ranking card; or
3. Population, the Current Top Two Cards for each player on that trick is ranked based on the population of the state, with California as the highest ranking card.

After a GeoPower card is the Control GeoPower Card, it is removed from the game until all of the GeoPower cards have been used on tricks. At that time, the GeoPower card deck is reshuffled.

For each trick, the player who wins the trick is the player whose Current Top Two Cards played on that trick have the best combined (i.e., lowest numerical) total ranking (and the relevant rankings for a trick are based on the Control GeoPower Card for that trick) among those players who remained in for the trick. For example, if the Control GeoPower Card for a trick says Population, and the dealer's Current Top Two Cards for that trick are the $7^{th}$ and $20^{th}$ ranked states in population, and the other player's Current Top Two Cards for that trick are the $4^{th}$ and $30^{th}$ ranked states in population, the dealer would win the trick since the combined population rankings of the cards the dealer played on that trick (27) are better (i.e., lower numerically) than the combined population rankings of the other player's cards played on that trick (34). If it is a tie on any trick for best cards, whoever, among those who tied, played the card with the best (i.e., lowest numerical) relevant ranking wins that trick.

Where multiple decks are used, if two players tie for best hand on a trick where they each have the exact same Current Top Two Cards, the players each keep their own cards, and split evenly the cards played and Risked by the other players on that trick (if there are an uneven number of cards to split, the player closest to the dealer's left takes the extra card).

GeoPlunge Power SSP Plus 2 Reverse

All of the rules of GeoPlunge Power SSP Plus 2 apply, except that in GeoPlunge Power SSP Plus 2 Reverse, for each trick, the player whose Current Top Two Cards played on that trick have the worst combined (i.e., highest numerical) total ranking (and the relevant rankings for a trick are based on the Control GeoPower Card for that trick) among those players who remained in for the trick. For example, if the Control GeoPower Card for a trick says Population, and the dealer's Current Top Two Cards for that trick are the $7^{th}$ and $40^{th}$ ranked states in population, and the other player's Current Top Two Cards for that trick are the $4^{th}$ and $30^{th}$ ranked states in population, the dealer would win the trick since the combined population rankings of the cards the dealer played on that trick (47) are worse (i.e., higher numerically) than the combined population rankings of the other player's cards played on that trick (34). If it is a tie on any trick as to who wins the trick, whoever, among those who tied, played the card with the worst (i.e., highest numerical) relevant ranking wins that trick.

GeoPlunge Power Borders Plus 2

All of the rules of GeoPlunge Power SSP Plus 2 apply to GeoPlunge Power Borders Plus 2, except as follows:
For each trick, the player who wins the trick is the player whose Current Top Two Cards have the most total border states among those players who remained in for the trick. For example, where there are two players in the game, if the first player's Current Top Two Cards are states that have six and four border states, respectively (i.e., ten border states in total) and the second player's Current Top Two Cards are states that have seven and two border states, respectively (i.e., nine border states in total), the first player wins the trick.

If two or more players' Current Top Two Cards on a trick are tied for the most total border states among those players who remained in for the trick, to determine who wins the trick among those players who tied, the tiebreaker is as follows: among those tied players, the trick is completed in the same manner as a trick would be completed in GeoPlunge Power SSP Plus 2. That is, the next GeoPower card in the GeoPower card deck is turned face-up and that becomes the Control GeoPower Card for that trick among the tied players.

For example, where there are two players in the game, if each of their Current Top Two Cards have, in the aggregate, ten border states, and the Control GeoPower Card for that trick is Population, whichever player's Current Top Two Cards have a better combined (i.e. lower numerical) total population ranking wins the trick.

Except where a tiebreaker is necessary, the GeoPower cards are not used (i.e., there is not a Control GeoPower Card for each trick, but only for tricks in which a tiebreaker is necessary).

GeoPlunge Power Borders Plus 2 Reverse

All of the rules of GeoPlunge Power Borders Plus 2 apply to GeoPlunge Power Borders Plus 2 Reverse, except as follows:

For each trick, the player who wins the trick is the player whose Current Top Two Cards have the fewest total border states among those players who remained in for the trick. For example, where there are two players in the game, if the first player's Current Top Two Cards are states that have seven and three border states, respectively (i.e., ten border states in total) and the second player's Current Top Two Cards are states that have five and four border states, respectively (i.e., nine border states in total), the second player wins the trick.

If two or more players' Current Top Two Cards on a trick are tied for the fewest border states among those players who remained in for the trick, to determine who wins the trick among those players who tied, the tiebreaker is as follows: among those tied players, the trick is completed in the same manner as a trick would be completed in GeoPlunge Power SSP Plus 2 Reverse. That is, the next GeoPower card in the GeoPower card deck is turned face-up and that becomes the Control GeoPower Card for that trick among the tied players.

For example, where there are two players in the game, if each of their Current Top Two Cards have, in the aggregate, ten border states, and the Control GeoPower Card for that trick is Population, whichever player's Current Top Two Cards have a worse combined (i.e., higher numerical) total population ranking wins the trick.

Except where a tiebreaker is necessary, the GeoPower cards are not used (i.e., there is not a Control GeoPower Card for each trick, but only for tricks in which a tiebreaker is necessary).

Figure 11:
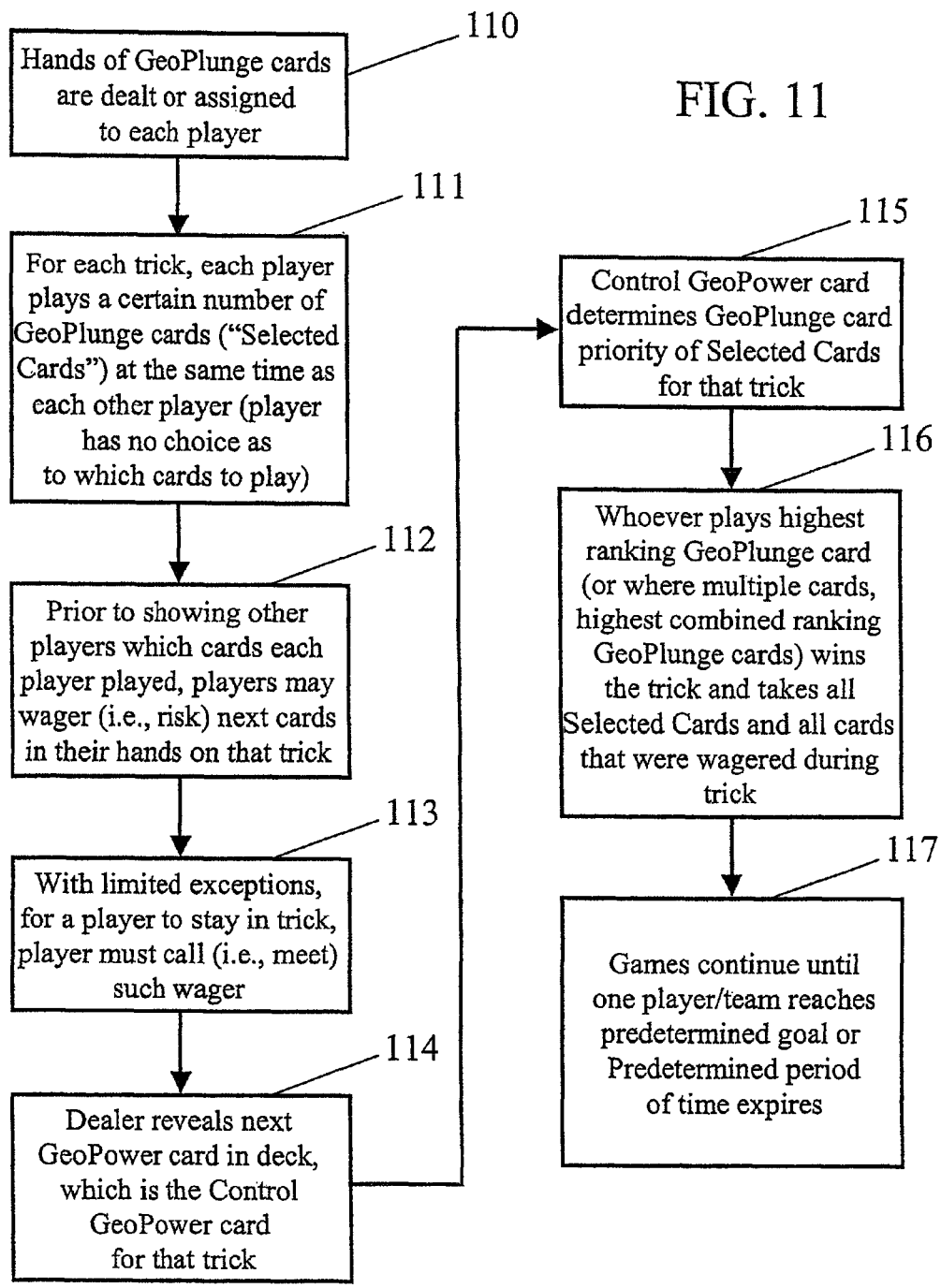

FIG. 11 presents a flow diagram of play of an exemplary GeoPlunge Power Plus Game, in accordance with an embodiment of the present invention. As shown in FIG. 11, hands of GeoPlunge cards are dealt or assigned to each player 110. For each trick, each player plays a certain number of GeoPlunge cards ("Selected Cards") at the same time as each other player (player has no choice as to which cards to play) 111. Prior to showing other players which cards each player played, players may wager (i.e., risk) next cards in their hands on that trick 112. With limited exceptions, for a player to stay in trick, player must call (i.e., meet) such wager 113.

The Dealer reveals the next GeoPower card in deck, which is the Control GeoPower card for that trick 114. The Control GeoPower card determines the GeoPlunge card priority of Selected Cards for that trick 115. Whoever plays the highest ranking GeoPlunge card (or where multiple cards, the highest combined ranking GeoPlunge cards) wins the trick and takes all Selected Cards and all cards that were wagered during the trick 116. The game ends when one player has all the GeoPlunge cards, or the game ends at a predetermined time 117.

GeoPlunge Classroom Series Games

General Rules that Apply to All GeoPlunge Classroom Series Games

Various GeoPlunge Classroom Series games may be played, including the following exemplary embodiments: GeoPlunge Classroom Border Series, GeoPlunge Classroom SSP Series, GeoPlunge Classroom Capital Series, and GeoPlunge Classroom Mixed Series. Only the GeoPlunge cards are used in these games. Each of these games may be played with anywhere from 14 to 100 players.

Playing the Games:

With two exceptions (described below), the players are divided into teams of 9 to 12 players each. Every team should have the same number of players, but if that is not possible then at most some teams should have one more player than the other teams.

Unless there are fewer than 18 players in the game (in which case at least 1 team will have 8 players or less), no team should have less than 9 players. Unless there are exactly 25 or 26 players (in which case at least 1 team will have 13 players), no team should have more than 12 players.

If there are 26 or fewer players, the teacher should divide the class into 2 teams. If there are more than 26 players, the teacher should divide the class into the greatest number of teams that are possible with at least 9 players being on each team. Therefore, there would be 3 teams if there are between 27 and 35 players; 4 teams if there are between 36 and 44 players; 5 teams if there are between 45 and 53 players; and so on.

If necessary, more than one GeoPlunge deck should be used, depending on how many players are in the game. If there are 16 or fewer players, 1 GeoPlunge deck is used. If there are between 17 and 33 players, 2 GeoPlunge decks are used. If there are between 34 and 50 players, 3 GeoPlunge decks are used. If there are between 51 and 66 players, 4 GeoPlunge decks are used. If there are between 67 and 83 players, 5 GeoPlunge decks are used. If there are between 84 and 100 players, 6 GeoPlunge decks are used.

A game consists of a specified number of rounds, played one round at a time. In one embodiment of the games, four rounds are played. The GeoPlunge cards are shuffled at the beginning of the game and after each round.

Players on the same team should be in close proximity to each other (i.e., sitting or standing right near each other) while the game is played.

For each round, under one embodiment each player is dealt 3 GeoPlunge cards (in other variations, players may be given any number of GeoPlunge cards so long as each player receives the same number of cards). No player may look at any of his or her cards (or anyone else's cards) until all players have been dealt their cards and the teacher says the "Starting Words" (which are different for each game; see under specific game descriptions below the Starting Words for each game).

Once the teacher says the Starting Words, the players may look at their own cards and their teammates' cards, but not look at the cards of players on other teams. Players may talk to other players on their team throughout each round but may not talk to players on other teams.

Under no circumstances may a player give to any other player (including a player on his or her own team) or trade with any other player (including a player on his or her own team) any of that player's cards. If a player does so, his or her team automatically loses the round. (Teachers, if they wish to do so, may decide not to enforce this rule).

In each round, a player can only use one of his cards during that round (the "Selected Card" for that player), and each player may make the determination of which card to use at any time during the round. (In other variations, a player may be permitted to use more than one, or even all, of his or her cards (which each would be Selected Cards). Also, in other variations, the teacher may decide to increase or decrease the number of groups needed to win a round, and increase or decrease the number of cards needed in each group).

If multiple decks are used, two or more players on the same team cannot choose the same state during a hand to be each player's Selected Card. For example, if two teammates are both dealt the Texas GeoPlunge card during a hand, at most one of those players can use the Texas card as that player's Selected Card for that hand.

The way in which a team wins a round differs for each game (see specific game descriptions below for how a team wins a round in that game).

The teacher will decide how a team announces it has won a round. It can be announced by having the team captain (which should vary per round) raise his or her hand, by having the team captain be the first team captain to sit in the "winning seat" in that round (which may be a chair chosen by the teacher to be used as the winning seat), or by any other method the teacher chooses.

Once a team announces it has won a round, all other teams must stop talking, and the team that announces it won must immediately show it has done so. If it has incorrectly announced it has won the round or cannot immediately show that it has won the round, that team automatically loses the round, and the other team wins the round (unless there is more than one other team remaining in which case the other teams continue the round, communicating once again among teammates).

If after 3 minutes (or any other period of time chosen by the teacher), no team has accurately announced that it has won the round, the teacher will announce that this is a GeoPlunge Shortcut Round. The way in which a team wins a GeoPlunge Shortcut Round differs per game (see specific game descriptions below).

If after 2 additional minutes (or any other period of time chosen by the teacher), neither team has accurately announced that it has won the round, the round ends in a tie.

Scoring:

The winning team is team that has the most points at the end of the game.

All of the other scoring rules are game specific (see specific game descriptions below)

Figure 12:
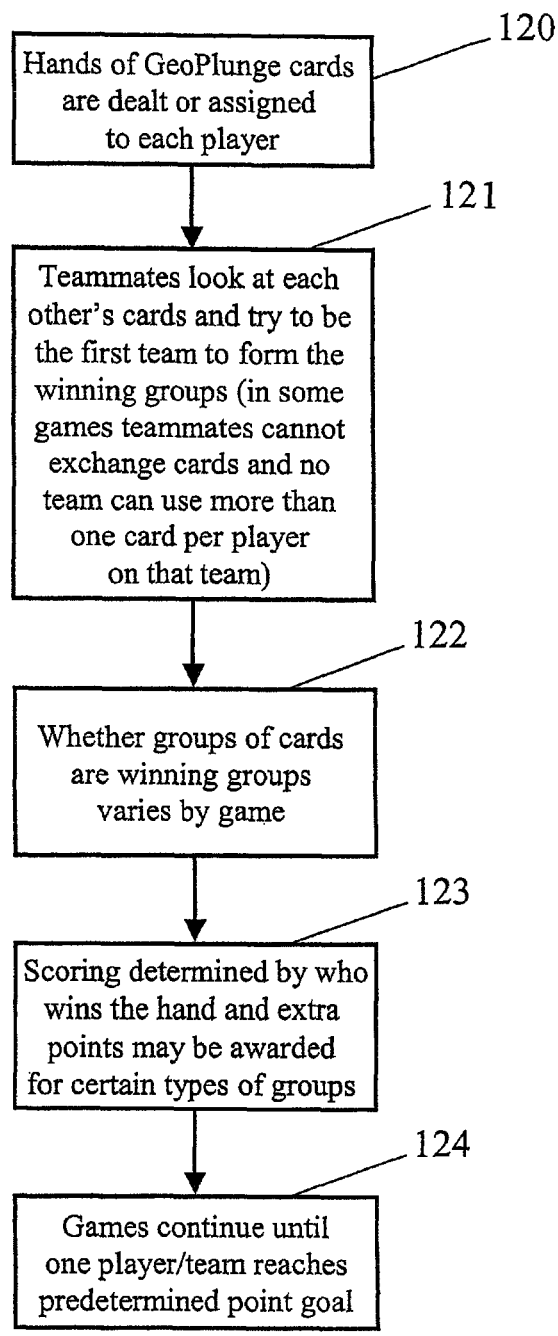

FIG. 12 presents a flow diagram of play of an exemplary GeoPlunge Classroom Series Game, in accordance with an embodiment of the present invention. As shown in FIG. 12, each player is dealt or assigned a certain number of GeoPlunge cards 120. Teammates look at each other's cards and try to be the first team to form the winning groups (in some games teammates cannot exchange cards and no team can use more than one card per player on that team) 121. Teams are in essence racing against other teams to be the first team to find winning groups from their cards.

Whether groups of cards are winning groups varies by game 122 and may be based on one or more of the following where the cards used are the state GeoPlunge cards, depending on the game: (i) groups of cards that have consecutive rankings in size, statehood or population; (ii) groups of cards in which one card in the group is a border state of each of the other cards in the group (or in some games it must be that a person can travel from one state in the group to another state in the group while crossing all of the other states in the group and not any other states); (iii) groups of cards in the same time zone; (iv) groups of cards in which each state capital in the group begins with the same first letter; (v) groups of cards in which each card in the group has a state capital that is the most populous city in its state, or groups of cards in which each card in the group has a state capital that is the second most populous city in the state, of groups of card in which each card in the group has a state capital that is the third most populous city in its state; or (iv) groups of cards in which each card in the group has a state capital that is not the first, second or third most populous city in its state. Scoring is determined by who wins the hand, and extra points may be awarded for certain types of groups 123. (Where the cards used are country cards, such as the GeoPlunge country cards, these same types of games described below (which descriptions are based on use of the state cards) may be played and the types of groups that may be formed are, for example, the types of groups that may be formed for those GeoPlunge Series games described earlier that use the GeoPlunge country cards). The game continues until one player/team reaches predetermined a point goal, such as a point total 124.

Specific rules for various exemplary GeoPlunge Classroom Series Games will now be described in greater detail.

GeoPlunge Classroom Border Series—14 to 100 Players

Playing the Game:

To begin each round, the teacher says the "Starting Words," which for GeoPlunge Classroom Border Series is "GeoPlunge Borders."

In GeoPlunge Classroom Border Series, to win the round a team must be the first team to accurately announce that it has a "4 Border Group" and a "3 Border Group" (as each are defined below).

A "4 Border Group" is a group of four players in which one player's Selected Card is a border state of each of the other three players' Selected Cards.

A "3 Border Group" is a group of three players in which one player's Selected Card is a border state of each of the other two players' Selected Cards.

No player's Selected Card can be used in both groups.

The same team cannot have the same 4 Border Group or the same 3 Border Group more than once in a game. That is, the same team cannot use the exact same cards in two different rounds to form a 4 Border Group, and the same team cannot use the exact same cards in two different rounds to form a 3 Border Group. Some of the same cards can be used again by a team in two different rounds as long as some different cards are also used to form the groups. (Teachers, if they wish to do so, may decide not to enforce this rule).

Where, during the round, the teacher announces that this is a GeoPlunge Shortcut Round, thereafter for that round the first team to accurately announce that it has two 3 Border Groups wins the round.

Scoring:

During the first two rounds, the team that wins the round receives 10 points. During the first two rounds, if the winning team has a "4 All" (defined below) it receives 10 bonus points and if it has a 3 All (defined below) it receives 5 bonus points.

During the third and fourth rounds, the team that wins the round receives 20 points. During those rounds, if the winning team has a "4 All" (defined below) it receives 20 bonus points and if it has a 3 All (defined below) it receives 10 bonus points.

A 4 All is a group of 4 players where each player's Selected Card is a border state of each of the other three player's Selected Cards.

A 3 All is a group of 3 players where each player's Selected Card is a border state of each of the other two player's Selected Cards.

GeoPlunge Classroom SSP Series—14 to 100 Players

Playing the Game:

To begin each round, the teacher says the "Starting Words," which for GeoPlunge Classroom SSP Series is "GeoPlunge SSP."

In GeoPlunge Classroom SSP Series, to win the round a team must be the first team to accurately announce that it has a "4 SSP Group" and a "3 SSP Group" (as each are defined below).

A "4 SSP Group" is a group of four players in which those four players' Selected Cards have successive ranks of Size, have successive ranks of Statehood, or have successive ranks of Population (e.g., ranking as the $5^{th}$ through $8^{th}$ most populated states).

A "3 SSP Group" is a group of three players in which those three players' Selected Cards have successive ranks of Size, have successive ranks of Statehood, or have successive ranks of Population.

No player's Selected Card can be used in both groups.

To win, a team also must have two different types of groups (e.g. the 4 SSP Group and the 3 SSP Group cannot both be groups having successive ranks of Size).

The same team cannot have the same 4 SSP Group or the same 3 SSP Group more than once in a game. That is, the same team cannot use the exact same cards in two different rounds to form a 4 SSP Group, and the same team cannot use the exact same cards in two different rounds to form a 3 SSP Group. Some of the same cards can be used again by a team in two different rounds as long as some different cards are also used to form the groups. (Teachers, if they wish to do so, may decide not to enforce this rule).

Where, during the round, the teacher announces that this is a GeoPlunge Shortcut Round, thereafter for that round the first team to accurately announce that it has two 3 SSP Groups wins the round.

Scoring:

During the first two rounds, the team that wins the round receives 10 points. During the first two rounds, if the winning team has a "4 Zone All" (defined below) it receives 10 bonus points and if it has a 3 Zone All (defined below) it receives 5 bonus points.

During the third and fourth rounds, the team that wins the round receives 20 points. During those rounds, if the winning team has a "4 Zone All" (defined below) it receives 20 bonus points and if it has a 3 Zone All (defined below) it receives 10 bonus points.

A 4 Zone All is where all 4 Selected Cards in the 4 SSP Group are considered to be in the same time zone for the purposes of this game (see below). That is, all of the states in that group must have color coded borders at the top of the card that all are red, or that all are green, or that are all are blue, or that all are purple.

A 3 Zone All is where all 3 Selected Cards in the 3 SSP Group are considered to be in the same time zone for the purposes of this game (see below). That is, all of the states in that group must have color coded borders at the top of the card that all are red, or that all are green, or that are all are blue, or that all are purple.

The color coded border at the top of the GeoPlunge cards is red for eastern time zone states, green for central time zone states, blue for mountain time zone states and purple for Alaska, Hawaii and pacific time zone states (referred to as the pacific/other time zone for purposes of this game). For purposes of playing this game, if a state is located in two time zones, the state is considered to be in, and the color coded border reflects, the time zone most of the state is located in. (The portion of the state not in that time zone is shaded a different color in the state's picture near the bottom of the card so that the player is aware that the state is in two time zones, although that will not impact the playing of the game).

GeoPlunge Classroom Capital Series—14 to 100 Players

Playing the Game:

To begin each round, the teacher says the "Starting Words," which for GeoPlunge Classroom Capital Series is "GeoPlunge Capitals."

In GeoPlunge Classroom Capital Series, to win the round a team must be the first team to accurately announce that it has a "4 Same Relations Capital Group" and a "3 Same First Letter Capitals Group" (as each are defined below).

A "4 Same Relations Capital Group" is a group of four players whose Selected Cards are each the same in relation to the Top 3 Cities for their respective states (which is called "Same Relation Capitals"). That is, all of the cards in a 4 Same Relations Capital Group must be such that (a) all of the state capitals are Red Top Cities (which are called "Red Top City Capitals"); or (b) all of the state capitals are Blue Top Cities (which are called "Blue Top City Capitals"); or (c) all of the state capitals are Green Top Cities (which are called "Green Top City Capitals"); or (d) none of the state capitals is a Red Top City, Blue Top City or a Green Top City (which are called "No Top City Capitals").

A "3 Same First Letter Capitals Group" is a group of three players whose Selected Cards have state capitals that all begin with the same first letter.

No player's Selected Card can be used in both groups.

The same team cannot have the same 4 Same Relations Capital Group or the same 3 Same First Letter Capitals Group more than once in a game. That is, if a team had Red Top Cities Capitals as its 4 Same Relations Capital Group, it cannot have Red Top Cities Capitals as its 4 Same Relations Capital Group for the remainder of the game. Similarly, if a team had a Same First Letter Capitals Group of state capitals all beginning with the letter "A," a team cannot for the remainder of the game have a Same First Letter Capitals Group beginning with the letter "A." (Teachers, if they wish to do so, may decide not to enforce this rule).

Where, during the round, the teacher announces that this is a GeoPlunge Shortcut Round, thereafter for that round the first team to accurately announce that it has a 4 Same Relations Capital Group and a 2 Same First Letter Capitals Group wins the round.

Scoring:

During the first two rounds, the team that wins the round receives 10 points. During the first two rounds, if the winning team has Green Top City Capitals as its 4 Same Relations Capital Group it receives 10 bonus points and if it has Blue Top City Capitals as its 4 Same Relations Capital Group it receives 5 bonus points.

During the third and fourth rounds, the team that wins the round receives 20 points. During those rounds, if the winning team has Green Top City Capitals as its 4 Same Relations Capital Group it receives 20 bonus points and if it has Blue Top City Capitals as its 4 Same Relations Capital Group it receives 10 bonus points GeoPlunge Classroom Mixed Series—14 to 100 Players Playing the Game and Scoring:

A game consists of 4 rounds, played one at a time.

For the $1^{st}$ round, all of the rules for playing the game and scoring of GeoPlunge Classroom Border Series apply.

For the $2^{nd}$ round, all of the rules for playing the game and scoring of GeoPlunge Classroom SSP Series apply.

For the $3^{rd}$ round, all of the rules for playing the game and scoring of GeoPlunge Classroom Capital Series apply.

For the final round, all of the rules for playing the game and scoring of whichever of the three above games the teacher chooses (i.e., GeoPlunge Classroom Border Series, GeoPlunge Classroom SSP Series, or GeoPlunge Classroom Capital Series apply).

GeoPlunge Classroom Match Games

There are various GeoPlunge Classroom Match games, including the following: GeoPlunge Classroom Border Match, GeoPlunge Classroom SSP Match, GeoPlunge Classroom Capitals Match, GeoPlunge Classroom Mix and Match, and GeoPlunge Classroom Total Match. Only the GeoPlunge cards are used in these games, and the GeoPlunge cards are reshuffled after every hand. Each game may be played with anywhere from 14 to 50 players.

General Rules that Apply to All GeoPlunge Classroom Match Games

Playing the Games and Scoring:

For these games, the teacher divides the class into teams, and, if possible, every team should have the same number of players, which number of players per team should be between 7 and 10 (and the teacher should make the decision as to whether the number of players on each team are 7, 8, 9, or 10 based on the goal of having each team have the same number of players). If it is impossible for each team to have the same number of players (which will be the case if there are 23 players playing, for example), then each hand the team or teams with one extra player will have a player sit out that hand (and it should be a different player each time so that no player should be sitting out very often).

The teacher will give each team a team number, such that one team will be team no. 1, another team will be team no. 2 and so forth. Before each hand begins, players on the same team should be in close proximity to each other (i.e., sitting or standing right near each other). In addition, each team should be placed in close proximity to the team that is one team number higher or lower than them.

These games are played one hand at a time. Team no. 1 is the dealer for the first hand. Thereafter, whichever team wins the hand is the team that deals on the next hand.

For each hand, one of the players on the team whose turn it is to be the dealing team deals each player one GeoPlunge card (other than a player that may be sitting out that hand if one or more teams has an extra player). (In other variations, there may be fewer numbers on a team and each player may be dealt more than one card). Team members should look at each other's cards, but no player should show his or her card to a player on another team.

For each hand, the number of tricks played during the hand equals the number of players playing for each team. For example, there will be 8 tricks per hand if there are 8 players on each team playing during a hand.

A trick consists of one player on each team, one at a time, playing his or her GeoPlunge card. A player plays his or her GeoPlunge card by walking to the front of the room, or other area of open space designated by the teacher, holding his or her GeoPlunge card for everyone to see and reading the name of the state on the card for everyone to hear.

On the first trick of each hand, the team that was the dealer for that hand will be the first team to have a player play his or her GeoPlunge card on that trick (this is called leading). Thereafter, for each other trick of a hand, the team that will lead on that trick (i.e., the first team to have a player play his or her GeoPlunge card on that trick) will be whichever team won the immediately preceding trick.

For each trick, after the team leading on the trick plays a card, the next team to play a card is the team whose team number is one number higher than the team that led, and the following team to play a card will be the team whose team number is one number higher than the second team to have thrown a card on that trick, and so on, except that after the team with the highest team number plays a card, the next team to play a card is team no. 1. For example, if team no. 3 leads on a trick and there are five teams in the game, team no. 4 will play a card next, followed by team no. 5, followed by team no. 1, followed by team no. 2.

For each trick, each team can play any card then remaining in that team's hand (a team cannot play any card that the team has already played on a prior trick in that hand; that is, each player will play his or her card on exactly one trick during the hand).

If there is any disagreement among team members as to which card should be played by the team on a trick, either the teacher will decide which card will be played (or, if there is a team captain, the team captain will decide). Where there is a team captain, the player who is the team captain should alternate after each hand.

After each trick, each of the players who played a card during that trick should sit or stand in a group together in a location near the team that won the trick so that everyone will remember which team won that trick.

Each of the specific game descriptions below will include the rules for determining, for each trick in that specific game, which team won the trick. (The game descriptions below refer to games in which the GeoPlunge state cards are used. The games may also be played with country cards, such as the GeoPlunge country cards, in which case the types of matches permitted will be the same types permitted in those GeoPlunge Match games that use country cards that were described earlier.)

The team that wins the most tricks during the hand wins the hand. If two or more teams tie for the most tricks won during a hand, the team that took the last trick among the teams that tied, wins the hand. Whichever team wins the hand receives 10 points.

Where there are exactly two teams, if one team wins all but one or two of the tricks during a hand, that team is considered to have a "super win" for that hand. Where there are three or more teams, if one team wins the majority of tricks during the hand, that team is considered to have a "super win" for that hand. If a team has a "super win" for a hand, that team receives 10 bonus points (i.e., 20 points total).

If one team wins all of the tricks during the hand, that team is considered to have the "ultimate win" for that hand. If a team has the "ultimate win" for a hand, that team receives 30 bonus points (i.e., 40 points total).

The first team to reach 50 points wins the game (or, if the teacher prefers, whichever team has the most points at the time the teacher decides the game has ended wins the game).

Specific GeoPlunge Classroom Match Game Rules will now be discussed in greater detail.

GeoPlunge Classroom Border Match—14 to 50 Players

Playing the Game:

The team that leads on a trick will win the trick only if none of the other teams play a card on that trick that is a border state of the card led.

If another team does throw a card on a trick that is a border state of the card led, then the last team to "Border Match" (as defined below) on that trick wins the trick.

To "Border Match" on a trick, a team must play a card that is a border state of the card that is then (i.e., at the time the team is playing its card) the "Action Card" for that trick.

For each trick, the "Action Card" is initially the card led on that trick. Once a team Border Matches on a trick, the card it played on that trick becomes the new Action Card for that trick. If another team, playing later on that trick, also Border Matches on the trick, then its card becomes the new Action Card for the trick, and so on. (If a team does not Border Match on a trick, the card it played cannot be the Action Card for that trick).

A couple of examples will help here (see immediately below). In each of these examples, there are four teams in the game and team no. 1 leads on the trick.

Example No. 1

None of the other three teams play a card that borders the state of the card led by team no. 1—Team no. 1 wins the trick.

Example No. 2

Team no. 2 plays a card that borders the state of the card led by team no. 1, and neither team no. 3 nor team no. 4 plays a card that borders the state of the card played by team no. 2—Team no. 2 wins the trick.

Example No. 3

Team no. 2 plays a card that borders the state of the card led by team no. 1, team no. 3 plays a card that borders the state of the card played by team no. 2, and team no. 4 does not play a card that borders the state of the card played by team no. 3—Team no. 3 wins the trick.

Example No. 4

Neither team no. 2 nor team no. 3 plays a card that borders the state of the card led by team no. 1, but team no. 4 does play a card that borders the state of the card led by team no. 1—Team no. 4 wins the trick.

GeoPlunge Classroom SSP Match—14 to 50 Players

Playing the Game:

The team that leads on a trick will win the trick only if none of the other teams play a card on that trick that is one lower or one higher in rank for Size, Statehood or Population than the card led.

If another team does throw a card on a trick that is one lower or one higher in rank for Size, Statehood or Population than the card led, then the last team to "SSP Match" (as defined below) on that trick wins the trick.

To "SSP Match" on a trick, a team must play a card that is one lower or one higher in rank for Size, Statehood or Population than the card that is then (i.e., at the time the team is playing its card) the "Action Card" for that trick.

For each trick, the "Action Card" is initially the card led on that trick. Once a team SSP Matches on a trick, the card it played on that trick becomes the new Action Card for that trick. If another team, playing later on that trick, also SSP Matches on the trick, then its card becomes the new Action Card for the trick, and so on. (If a team does not SSP Match on a trick, the card it played cannot be the Action Card for that trick).

A couple of examples will help here (see immediately below). In each of these examples, there are four teams in the game and team no. 1 leads on the trick.

Example No. 1

None of the other three teams play a card that is one lower or one higher in rank for Size, Statehood or Population than the state of the card led by team no. 1—Team no. 1 wins the trick.

Example No. 2

Team no. 2 plays a card that is one lower or one higher in rank for Size, Statehood or Population than the state of the card led by team no. 1, and neither team no. 3 nor team no. 4 plays a card that is one lower or one higher in rank for Size, Statehood or Population than the state of the card played by team no. 2—Team no. 2 wins the trick.

Example No. 3

Team no. 2 plays a card that is one lower or one higher in rank for Size, Statehood or Population than the state of the card led by team no. 1, team no. 3 plays a card that is one lower or one higher in rank for Size, Statehood or Population than the state of the card played by team no. 2, and team no. 4 does not play a card that is one lower or one higher in rank for Size, Statehood or Population than the state of the card played by team no. 3—Team no. 3 wins the trick.

Example No. 4

Neither team no. 2 nor team no. 3 plays a card that is one lower or one higher in rank for Size, Statehood or Population than the state of the card led by team no. 1, but team no. 4 does play a card that is one lower or one higher in rank for Size, Statehood or Population than the state of the card led by team no. 1—Team no. 4 wins the trick.

GeoPlunge Classroom Capitals Match—14 to 50 Players

The team that leads on a trick will win the trick only if none of the other teams play a card on that trick in which the state capital of the card played begins with the same first letter as the state capital of the card led.

If only one team, who did not lead on the trick, plays a card on the trick in which the state capital of the card played begins with the same first letter as the state capital of the card led, that team wins the trick. If two or more teams play such a card on the trick, the last team to play such a card on the trick wins the trick.

GeoPlunge Classroom Mix and Match—14 to 50 Players

Before the start of each hand, either the teacher (or, if the teacher wishes, one of the teams on a rotating basis) will decide whether for that hand the game will be played under the rules of GeoPlunge Classroom Border Match, GeoPlunge Classroom SSP Match or GeoPlunge Classroom Capitals Match.

GeoPlunge Classroom Total Match—14 to 50 Players

For this game, GeoPlunge Classroom Border Match, GeoPlunge Classroom SSP Match and GeoPlunge Classroom Capitals Match are combined into one game, as follows:

The team leading on a trick will win the trick only if no other team throws a card on that trick that is a border state of the card led, that is one lower or one higher in rank for Size, Statehood or Population than the card led, or in which the state capital of the card played begins with the same first letter as the state capital of the card led.

If the team leading on a trick does not win the trick, then the last team to "Match" (as defined below) on that trick wins the trick.

To Match on a trick, a team must play a card (i) that is a border state of the card that is then (i.e., at the time the team is playing its card) the "Action Card" for that trick; (ii) that is one lower or one higher in rank for Size, Statehood or Population than the card that is then the "Action Card" for that trick; or (iii) in which the state capital of the card played begins with the same first letter as the state capital of the card that is then the "Action Card" for that trick.

For each trick, the "Action Card" is initially the card led on that trick. Once a team Matches on a trick, the card it played on that trick becomes the new Action Card for that trick. If another team, playing later on that trick, also Matches on the trick, then its card becomes the new Action Card for the trick, and so on. (If a team does not Match on a trick, the card it played cannot be the Action Card for that trick).

GeoPlunge Classroom Power Pick-Em Games

General Rules that Apply to All GeoPlunge Classroom Power Pick-Em Games

Six exemplary embodiments of 6 GeoPlunge Classroom Power Pick-em games are as follows: GeoPlunge Classroom Power Pick-em Multi-Card, GeoPlunge Classroom Power Pick-em Multi-Card Reverse, GeoPlunge Classroom Power Pick-em Multi-Card Mixed, GeoPlunge Classroom Power Pick-em Single Card, GeoPlunge Classroom Power Pick-em Single Card Reverse, and GeoPlunge Classroom Power Pick-em Single Card Mixed. Both the GeoPlunge cards and the GeoPower cards are used in these games. The GeoPlunge cards are shuffled at the beginning of the game and after each hand. The GeoPower cards are shuffled at the beginning of the game only. Each of these games may be played with anywhere from 8 to 100 players.

GeoPlunge Classroom Power Pick-em
Multi-Card—8 to 100 Players

Playing the Game:

The players are divided into groups of 4 players each. No group should have less than 4 players. If the total number of players is not a number divisible by 4, then one or more groups, to the extent necessary, can have 5 players (and if there are exactly 11 players, then one group can have 6 players). Players in the same group should be in close proximity to each other (i.e., sitting or standing right near each other) while the game is played.

If necessary, more than one GeoPlunge deck should be used, depending on how many players are in the game. If there are 16 or fewer players, 1 GeoPlunge deck is used. If there are between 17 and 33 players, 2 GeoPlunge decks are used. If there are between 34 and 50 players, 3 GeoPlunge decks are used. If there are between 51 and 66 players, 4 GeoPlunge decks are used. If there are between 67 and 83 players, 5 GeoPlunge decks are used. If there are between 84 and 100 players, 6 GeoPlunge decks are used.

A game consists of a certain number of rounds, played one round at a time. In some embodiments, there are five rounds played. There are two hands during each round, which hands are played one at a time. The first hand in each round is called the "Starting Hand." The second hand in each round is called the "Finals Hand."

Every player who wins his or her group in the Starting Hand for a round, advances to (i.e., participates in) the Finals Hand for that round (the "Group Winners").

In addition, for each round, the two players who have the best scores in the Starting Hand of all of those players who are not Group Winners for that Starting Hand also advance to the Finals Round (the "Additional Qualifiers").

For each hand, each player who is participating in that hand is dealt 3 GeoPlunge cards. Therefore, for each Starting Hand, each player is dealt 3 GeoPlunge cards, and for each Finals Hand, each player who advances to that Finals Hand is dealt 3 GeoPlunge cards. The players may look at their own cards but they may not look at each other's cards.

For each hand (i.e., for each Starting Hand and for each Finals Hand), each player participating in that hand simultaneously discards one of his or her cards (at the player's sole discretion as to which card) so that each player has two GeoPlunge cards remaining for that hand (the "Selected Cards"). (In other embodiments, players may be dealt more than 3 GeoPlunge cards and may be able to select more than 2 Selected Cards. Also, in some other embodiments, players may use country cards, such as the GeoPlunge country cards, instead of the GeoPlunge state cards, in which case the rankings of the cards will be based on the types of rankings used in the games that use GeoPlunge country cards (e.g., size, independence, population, time zone, and life expectancy).

For each hand, once the participating players have chosen their Selected Cards, the teacher then turns face-up the next GeoPower card in the deck. The GeoPower card turned face-up is called the Control GeoPower Card for that hand. (Once a GeoPower card is used on a hand, it is placed at the bottom of the GeoPower Card deck. Therefore, each hand, a different GeoPower card in the GeoPower card deck will be the Control GeoPower Card).

For each hand in which the Control GeoPower Card says:
1. Size, the Selected Cards for that hand are ranked based on the size of the state, with Alaska as the highest ranking card;
2. Statehood, the Selected Cards for that hand are ranked based on their date of entry into the union, with Delaware as the highest ranking card; or
3. Population, the Selected Cards for that hand are ranked based on the population of the state, with California as the highest ranking card.

In this game, as between any two players, a player (the "first player") wins the hand against another player (the 'second player") only if the first player's two Selected Cards have the better combined (i.e., lower numerical) total ranking (and the relevant rankings for a hand are based on the Control GeoPower Card for that hand). For example, if the Control GeoPower Card for a hand says Population, and the first player's Selected Cards are the $7^{th}$ and $20^{th}$ ranked states in population, and the second player's Selected Cards are the 4$^{th}$ and 30$^{th}$ ranked states in population, the first player would win the hand since the combined population rankings of the first player's Selected Cards on that hand (27) are better (i.e., lower numerically) than the combined population rankings of the second player's Selected Cards on that hand (34). Therefore, for that hand the first player has a better (i.e., lower) score than the second player.

If, on any hand, two players' Selected Cards have the exact same combined ranking, the tiebreaker is based upon which one of those Selected Cards has the best relevant ranking. For example, if the Control GeoPower Card for a hand says Size, and the Selected Cards for the first player are the 12$^{th}$ and 25$^{th}$ ranked states in size, and the Selected Cards for the second player are the 14$^{th}$ and 23$^{rd}$ ranked states in size, as between those two players the first player would win the hand since the tiebreaker is based upon who has the best ranked card among the four Selected Cards, and in this example the first player's Selected Card that is ranked 12$^{th}$ in size has a better size ranking than each of the second player's Selected Cards (which are ranked 14$^{th}$ and 23$^{rd}$, respectively).

For each Starting Hand, after the teacher turns face-up the Control GeoPower Card for that hand, each player shows his or her Selected Cards and announces his or her score for that hand (based on the combined total relevant rankings of that player's Selected Cards for that hand) in order to determine the Group Winners and Additional Qualifiers for that Starting Hand.

For each Finals Hand, after the teacher turns face-up the Control GeoPower Card for that hand, each player playing in that hand shows his or her Selected Cards and announces his or her score for that hand (based on the combined total relevant rankings of that player's Selected Cards for that hand) in order to determine the champion, second place finisher, and third place finisher for that Finals Hand.

Scoring:

For each of the first two rounds, the Group Winners of the Starting Hand receive 4 points each, and the Additional Qualifiers for the Starting Hand receive 2 points each. In addition, for each of the first two rounds, the champion of the Finals Hand receives 10 points, the second place finisher in the Finals Hand receives 6 points, and the third place finisher in the Finals Hand receives 4 points. Also, for each of the first two rounds, each person (other than the champion, second place finisher, and third place finisher of the Finals Hand) who is in the same group as the champion of the Finals Hand receives 2 points.

For the third and fourth rounds, the Group Winners of the Starting Hand receive 6 points each, and the Additional Qualifiers for the Starting Hand receive 3 points each. In addition, for the third and fourth rounds, the champion of the Finals Hand receives 15 points, the second place finisher in the Finals Hand receives 9 points, and the third place finisher in the Finals Hand receives 6 points. Also, for the third and fourth rounds, each person (other than the champion, second place finisher, and third place finisher of the Finals Hand) who is in the same group as the champion of the Finals Hand receives 3 points.

For the fifth and final round, the Group Winners of the Starting Hand receive 8 points each, and the Additional Qualifiers for the Starting Hand receive 4 points each. In addition, for the fifth and final round, the champion of the Finals Hand receives 20 points, the second place finisher in the Finals Hand receives 12 points, and the third place finisher in the Finals Hand receives 8 points. Also, in the fifth and final round, each person (other than the champion, second place finisher, and third place finisher of the Finals Hand) who is in the same group as the champion of the Finals Hand receives 4 points.

Where multiple decks are used, if there is a tie between two players on a hand, both players receive the points that each would have received if there were no tie. (There can only be a tie if both players have the exact same Selected Cards).

In any hand in which a player has a "GeoPlunge Perfecto" that player receives 10 additional points. A player has a GeoPlunge Perfecto where the sum of the relevant rankings of the player's two Selected Cards is 3 or less (the sum can only be equal to 2 where multiple decks are used).

In any hand in which a player has a "Near GeoPlunge Perfecto" that player receives 5 additional points. A player has a Near GeoPlunge Perfecto where the sum of the relevant rankings of the player's two Selected Cards equals 4 or 5.

The person who has the most points at the end of the game is the winner of the game and is called the "champion," and the persons who have the 2$^{nd}$ through 5$^{th}$ most points are the "near champions." If there are more than 50 players, the persons who have the 6$^{th}$ through 10$^{th}$ most points are also "near champions." If two or more players are tied for the most points, they are each considered to be champions.

The group that has the highest combined total points (adding up the points of each player in the group) of all of the groups at the end of the game is the winning group and is called the "champion group." Where there are 3 or more groups playing, the group that has the second highest combined total points is the "near champion group," and where there are 6 or more groups, the group that has the third highest combined total points is also a "near champion group." If two or more groups are tied for the most points, they are each considered to be champion groups.

GeoPlunge Classroom Power Pick-Em Multi-Card Reverse—8 to 100 Players

Playing the Game:

All of the rules of playing of the game of GeoPlunge Classroom Power Pick-em Multi-Card apply, except as follows:

In this game, as between any two players, a player (the "first player") wins the hand against another player (the 'second player") only if the first player's two Selected Cards have the weaker combined (i.e., higher numerical) total ranking (and the relevant rankings for a hand are based on the Control GeoPower Card for that hand). For example, if the Control GeoPower Card for a hand says Population, and the first player's Selected Cards are the 4$^{th}$ and 30$^{th}$ ranked states in population, and the second player's Selected Cards are the 7$^{th}$ and 20$^{th}$ ranked states in population, the first player would win the hand since the combined population rankings of the first player's Selected Cards on that hand (34) are weaker (i.e., higher numerically) than the combined population rankings of the second player's Selected Cards on that hand (27).

If, on any hand, two players' Selected Cards have the exact same combined ranking, the tiebreaker is based upon which one of those Selected Cards has the worst ranking. For example, if the Control GeoPower Card for a hand says Size, and the Selected Cards for the first player are the 12$^{th}$ and 25$^{th}$ ranked states in size, and the Selected Cards for the second player are the 14$^{th}$ and 23$^{rd}$ ranked states in size, as between those two players the first player would win the hand since the tiebreaker is based upon who has the worst ranked card among the four Selected Cards, and in this example the first player's Selected Card that is ranked 25$^{th}$ in size has a weaker size ranking than each of the second player's Selected Cards (which are ranked 14$^{th}$ and 23$^{rd}$, respectively).

Every player who wins his or her group in the Starting Hand for a round (by having, among the players in the group, the Selected Cards with the weakest combined relevant rankings), advances to (i.e., participates in) the Finals Hand for that round (the "Group Winners").

In addition, for each round, the two players who have the weakest combined rankings in the Starting Hand of all of those players who are not Group Winners for that Starting Hand also advance to the Finals Round (the "Additional Qualifiers").

Scoring:

All of the scoring rules of GeoPlunge Classroom Power Pick-em Multi-Card apply, except as follows:

In any hand in which a player has a "GeoPlunge Reverse Perfecto" that player receives 10 additional points. A player has a GeoPlunge Reverse Perfecto where the sum of the relevant rankings of the player's two Selected Cards is 99 or 100 (the sum can only be equal to 100 where multiple decks are used).

In any hand in which a player has a "Near GeoPlunge Reverse Perfecto" that player receives 5 additional points. A player has a Near GeoPlunge Reverse Perfecto where the sum of the relevant rankings of the player's two Selected Cards equals 97 or 98.

A player does not receive any points for having a Geo-Plunge Perfecto or Near GeoPlunge Perfecto.

GeoPlunge Classroom Power Pick-Em Multi-Card Mixed—8 to 100 Players

Playing the Game and Scoring:

A game consists of 5 rounds, played one round at a time. There are two hands during each round, which hands are played one at a time. The first hand in each round is called the "Starting Hand." The second hand in each round is called the "Finals Hand."

For the 1$^{st}$, 3$^{rd}$ and 5$^{th}$ rounds, all of the rules for playing the game and scoring of GeoPlunge Classroom Power Pick-em Multi-Card apply.

For the 2$^{nd}$ and 4$^{th}$ rounds, all of the rules for playing the game and scoring of GeoPlunge Classroom Power Pick-em Multi-Card Reverse apply.

GeoPlunge Classroom Power Pick-Em Single Card—8 to 100 Players

Playing the Game:

The players are divided into groups of 4 players each. No group should have less than 4 players. If the total number of players is not a number divisible by 4, then one or more groups, to the extent necessary, can have 5 players (and if there are exactly 11 players, then one group can have 6 players). Players in the same group should be in close proximity to each other (i.e., sitting or standing right near each other) while the game is played.

If necessary, more than one GeoPlunge deck should be used, depending on how many players are in the game. If there are 25 or fewer players, 1 GeoPlunge deck is used. If there are between 26 and 50 players, 2 GeoPlunge decks are used. If there are between 51 and 75 players, 3 GeoPlunge decks are used. If there are between 76 and 100 players, 4 GeoPlunge decks are used.

A game consists of 5 rounds, played one at a time. There are two hands during each round, which are played one at a time. The first hand in each round is called the "Starting Hand." The second hand in each round is called the "Finals Hand."

Every player who wins his or her group in the Starting Hand for a round, advances to (i.e., participates in) the Finals Hand for that round (the "Group Winners").

In addition, for each round, the two players who have the best scores in the Starting Hand of all of those players who are not Group Winners for that Starting Hand also advance to the Finals Round (the "Additional Qualifiers").

For each hand, each player who is participating in that hand is dealt 2 GeoPlunge cards. Therefore, for each Starting Hand, each player is dealt 2 GeoPlunge cards, and for each Finals Hand, each player who advances to that Finals Hand is dealt 2 GeoPlunge cards. The players may look at their own cards but they may not look at each other's cards.

For each hand (i.e., for each Starting Hand and for each Finals Hand), each player participating in that hand simultaneously discards one of his or her cards (at the player's sole discretion as to which card) so that each player has one card remaining for that hand (the "Selected Card").

For each hand, once each participating player has chosen his or her Selected Card, the teacher then turns face-up the next GeoPower card in the deck. The GeoPower card turned face-up is called the Control GeoPower Card for that hand. (Once a GeoPower card is used on a hand, it is placed at the bottom of the GeoPower Card deck. Therefore, each hand, a different GeoPower card in the GeoPower card deck will be the Control GeoPower Card).

For each hand in which the Control GeoPower Card says:
1. Size, the Selected Cards for that hand are ranked based on the size of the state, with Alaska as the highest ranking card;
2. Statehood, the Selected Cards for that hand are ranked based on their date of entry into the union, with Delaware as the highest ranking card; or
3. Population, the Selected Cards for that hand are ranked based on the population of the state, with California as the highest ranking card.

In this game, as between any two players, a player (the "first player") wins the hand against another player (the "second player") only if the first player's Selected Card has a better ranking (i.e., is lower numerically) than the second player's Selected Card (and the relevant rankings for a hand are based on the Control GeoPower Card for that hand). For example, if the Control GeoPower Card for a hand says Population, and the first player's Selected Card is the 7$^{th}$ ranked state in population, and the second player's Selected Card is the 12$^{th}$ ranked state in population, as between those two players the first player would win the hand since the first player's Selected Card's relevant ranking on that hand (7) is better (i.e., lower numerically) than the second player's Selected Card's relevant ranking on that hand (12). Therefore, for that hand the first player has a better (i.e., lower) score for that hand than the second player.

If, where multiple decks are used, on any hand two players Selected Cards have the exact same relevant ranking, the players are considered to have tied for that hand.

Scoring:

For each of the first two rounds, the Group Winners of the Starting Hand receive 4 points each, and the Additional Qualifiers for the Starting Hand receive 2 points each. In addition, for each of the first two rounds, the champion of the Finals Hand receives 10 points, the second place finisher in the Finals Hand receives 6 points, and the third place finisher in the Finals Hand receives 4 points. Also, for each of the first two rounds, each person (other than the champion, second place finisher, and third place finisher of the Finals Hand) who is in the same group as the champion of the Finals Hand receives 2 points.

For the third and fourth rounds, the Group Winners of the Starting Hand receive 6 points each, and the Additional Qualifiers for the Starting Hand receive 3 points each. In addition, for the third and fourth rounds, the champion of the Finals Hand receives 15 points, the second place finisher in the Finals Hand receives 9 points, and the third place finisher in the Finals Hand receives 6 points. Also, for the third and fourth rounds, each person (other than the champion, second place finisher, and third place finisher of the Finals Hand) who is in the same group as the champion of the Finals Hand receives 3 points.

For the fifth and final round, the Group Winners of the Starting Hand receive 8 points each, and the Additional Qualifiers for the Starting Hand receive 4 points each. In addition, for the fifth and final round, the champion of the Finals Hand receives 20 points, the second place finisher in the Finals Hand receives 12 points, and the third place finisher in the Finals Hand receives 8 points. Also, in the fifth and final round, each person (other than the champion, second place finisher, and third place finisher of the Finals Hand) who is in the same group as the champion of the Finals Hand receives 4 points.

Where multiple decks are used, if there is a tie between two players on a hand, both players receive the points that each would have received if there were no tie. (There can only be a tie if both players have the exact same Selected Card).

In any hand in which a player has a "GeoPlunge Perfecto" that player receives 10 additional points. A player has a GeoPlunge Perfecto where the relevant ranking of the player's Selected Card is 1.

In any hand in which a player has a "Near GeoPlunge Perfecto" that player receives 5 additional points. A player has a Near GeoPlunge Perfecto where the relevant ranking of the player's Selected Card is 2.

The person who has the most points at the end of the game is the winner of the game and is called the "champion," and the persons who have the $2^{nd}$ through $5^{th}$ most points are the "near champions." If there are more than 50 players, the persons who have the $6^{th}$ through $10^{th}$ most points are also "near champions." If two or more players are tied for the most points, they are each considered to be champions.

The group whose who has the highest combined total points (adding up the points of each player in the group) of all of the groups at the end of the game is the winning group and is called the "champion group." Where there are 3 or more groups playing, the group that has the second highest combined total points is the "near champion group," and where there are 6 or more groups, the group that has the third highest combined total points is also a "near champion group." If two or more groups are tied for the most points, they are each considered to be champion groups.

GeoPlunge Classroom Power Pick-Em Single Card Reverse—8 to 100 Players

Playing the Game:

All of the rules of playing of the game of GeoPlunge Classroom Power Pick-em Single Card apply, except as follows:

In this game, as between any two players, a player (the "first player") wins the hand against another player (the 'second player") only if the first player's Selected Card has the weaker (i.e., higher numerical) ranking (and the relevant rankings for a hand are based on the Control GeoPower Card for that hand). For example, if the Control GeoPower Card for a hand says Population, and the first player's Selected Card is the $30^{th}$ ranked state in population, and the second player's Selected Card is the $20^{th}$ ranked state in population, as between those two players the first player would win the hand since the population ranking of the first player's Selected Card on that hand (30) is weaker (i.e., higher numerically) than the population ranking of the second player's Selected Card on that hand (20).

If, on any hand, two players' Selected Cards have the exact same ranking, the player's are considered to have tied on that hand.

Every player who wins his or her group in the Starting Hand for a round (by having, among the players in the group, the Selected Card with the weakest relevant ranking), advances to (i.e., participates in) the Finals Hand for that round (the "Group Winners").

In addition, for each round, the two players who have the weakest Selected Cards in the relevant ranking during the Starting Hand of all of those players who are not Group Winners for that Starting Hand also advance to the Finals Round (the "Additional Qualifiers").

Scoring:

All of the scoring rules of GeoPlunge Classroom Power Pick-em Single Card apply, except as follows:

In any hand in which a player has a "GeoPlunge Reverse Perfecto" that player receives 10 additional points. A player has a GeoPlunge Reverse Perfecto where the relevant ranking of the player's Selected Card is 50.

In any hand in which a player has a "Near GeoPlunge Reverse Perfecto" that player receives 5 additional points. A player has a Near GeoPlunge Reverse Perfecto where the relevant ranking of the player's Selected Card is 49.

A player does not receive any points for having a GeoPlunge Perfecto or Near GeoPlunge Perfecto.

GeoPlunge Classroom Power Pick-Em Single Card Mixed—8 to 100 Players

Playing the Game and Scoring:

A game consists of 5 rounds, played one at a time. There are two hands during each round, which are played one at a time. The first hand in each round is called the "Starting Hand." The second hand in each round is called the "Finals Hand."

For the $1^{st}$, $3^{rd}$ and $5^{th}$ rounds, all of the rules for playing the game and scoring of GeoPlunge Classroom Power Pick-em Single Card apply.

For the $2^{nd}$ and $4^{th}$ rounds, all of the rules for playing the game and scoring of GeoPlunge Classroom Power Pick-em Single-Card Reverse apply.

GeoPlunge Solo Group Games

General Rules to GeoPlunge Solo Group Games

Four exemplary embodiments of GeoPlunge Solo Group Games are as follows: GeoPlunge Solo SSP (i.e., Size, Statehood and Population) Groups, GeoPlunge Quick Solo SSP Groups, GeoPlunge Solo Border Groups, and GeoPlunge Quick Solo Border Groups. Each GeoPlunge Solo Group game is played with 1 player. Only the GeoPlunge cards are used. (Other embodiments of these games will permit the group sizes to be larger or smaller than described in the exemplary games below, the number of groups to be larger or smaller than described in the exemplary games below, or the categories of the groups to be different than described in the exemplary games below, including in some other embodiments groups using the GeoPlunge country cards where the grouping may be based on rankings for those cards (such as size, independence, population, time zone or life expectancy) or border countries of those cards).

In each game, the play of the game is divided into a certain number of rounds, which number varies per game. The rounds are played one at a time. There are two hands in each round, played one hand at a time.

The GeoPlunge cards are shuffled before the game begins and between each round. They are not shuffled between each hand during a round.

For each round, in the first hand the top 25 GeoPlunge cards in the deck are used, and in the second hand the remaining 25 GeoPlunge cards in the deck are used. (In other embodiments there may be more hands each round, and fewer cards used in each hand).

During the play of the game, the player turns face-up (i.e., looks at) one GeoPlunge card at a time, which card turned face-up is always the then top card in the deck.

The player does not turn the next GeoPlunge card face-up until the player plays (i.e., places into a group, as described below) the GeoPlunge card he or she has just turned face-up. Once the player places a GeoPlunge card in a group (which the player must do before turning the next GeoPlunge card face-up), the player cannot change which group the player has placed the card. (In other embodiments, a player may be given a specified number of opportunities (e.g., to move a card into another group after the player has already played that card).

GeoPlunge Solo SSP Groups: 1 Player

Playing the Game:

The game consists of three rounds, with two hands in each round. During each hand, the player tries to use the 25 GeoPlunge cards dealt in that hand to form five groups, consisting of one Top Ranking Group, one High Ranking Group, one Middle Ranking Group, one Low Ranking Group and one Bottom Ranking Group.

Most GeoPlunge cards will have rankings that give the player an option as to which group to place the card. However, once the player places a card in a group (which the player must do before turning the next GeoPlunge card face-up), the player cannot move the card to a different group.

The player must try to place exactly five GeoPlunge cards in each group, and no card can be used in more than one group. In addition, and as described below (after the bullet points), no group is permitted to have two or more cards with "Identical Numbered Rankings" (see the definition after the bullet points).

1. A Top Rankings Group is a group of 5 GeoPlunge cards, each of which has at one least one ranking (i.e., size, statehood or population) that is in the top ten (i.e., between 1 and 10).
2. A High Rankings Group is a group of 5 GeoPlunge cards, each of which has at one least one ranking that is in the second ten (i.e., between 11 and 20).
3. A Middle Rankings Group is a group of 5 GeoPlunge cards, each of which has at one least one ranking that is in the middle ten (i.e., between 21 and 30).
4. A Low Rankings Group is a group of 5 GeoPlunge cards, each of which has at one least one ranking that is in the next to bottom ten (i.e., between 31 and 40).
5. A Bottom Rankings Group is a group of 5 GeoPlunge cards, each of which has at one least one ranking that is in the bottom ten (i.e., between 41 and 50).

There can be no "Identical Numbered Rankings" in a group. A group has Identical Numbered Rankings if the rankings being used by the player for two or more cards in a group are the same number.

For example, Alaska and Delaware could not both be used in a Top Rankings Group because the only ranking they each have in the top 10 is the same number, i.e., they both have a no. 1 ranking in a category (Delaware is no. 1 in statehood and Alaska is no. 1 in size). On the other hand, California and Alaska could both be used in a Top Rankings Group, as long as the no. 3 ranking of California for size is used by the player, rather than the no. 1 ranking for population (which can't be used in conjunction with the use of Alaska since Alaska's only ranking in the top 10 of a category is a no. 1 ranking in size).

Where a card has two or more rankings that would enable it to be placed into the same group (e.g., both California's no. 1 ranking in population and its no. 3 ranking in size would enable it to be placed in the Top Rankings Group), a player who places a card in such a group can choose which ranking to use, and he or she does not need to make that determination until the end of the hand (but, remember, a player cannot move a card to a different group once the card is placed in a group).

A hand ends when a player turns face-up a card that cannot be placed in any group other than a group that is already full (i.e., already has 5 cards in it). If that does not occur before the $25^{th}$ GeoPlunge card is played, a hand ends after the $25^{th}$ GeoPlunge card is played.

Scoring:

A player is awarded 20 points for a hand if he or she completes all 5 groups during that hand.

If the player completes 4 groups, the player is awarded 5 points for the hand.

A player wins if the player has at least 50 points by the end of the game. If a player has at least 90 points by the end of the game, a player obtains a "Super Win." If a player has 120 points by the end of the game, that player obtains the "Ultimate Win."

GeoPlunge Quick Solo SSP Groups: 1 Player

Playing the Game and Scoring:

All of the rules of GeoPlunge Solo SSP Groups apply, except that in GeoPlunge Quick Solo SSP Groups there is only one round (rather than three rounds) and to win a player must complete all 5 groups in one of the two hands. If a player completes all 5 groups in both hands, the player obtains the "Ultimate Win."

If a player completes 4 groups in at least one hand, that player is considered to have tied (rather than lost).

GeoPlunge Solo Border Groups: 1 Player

Playing the Game:

The game consists of three rounds, with two hands in each round. During each hand, the player tries to form five "Border Groups." A Border Group is a group of 4 cards in which one of the cards in the group (the "first card") is a border state of another card in the group (the "second card"), and the second card is also a border state of a different card in the group (the "third card"), and the third card is also a border state of the final card in the group (the "fourth card"). (Another way to look at it is that to be a Border Group, at least two of the cards in the group (the "Double Border Cards") must be border states of each other, and one of the Double Border Cards must also be a border state of one of the remaining two cards in the group, and the other Double Border Card must also be a border state of the other remaining card in the group.) The sixth group of cards in a hand is called the Discard Group, which is the group the player places any cards that he or she does not want to place into a pile that the player hopes will form (i.e., become) a Border Group. Each hand a player must place exactly 5 cards in the Discard Group.

The player will be creating six piles on the playing surface, with the pile furthest to the player's right being the Discard Group.

During the play of the game, the player turns face-up (i.e., looks at) one GeoPlunge card at a time, which card turned face-up is always the then top card in the deck.

The player does not turn the next GeoPlunge card face-up until the player plays (i.e., places into a pile) the GeoPlunge card he or she has just turned face-up. A player may not place more than 4 cards in any one pile during a hand, except that a player may place 5 cards in the Discard Group. Once the player places a GeoPlunge card in a pile (which the player must do before turning the next GeoPlunge card face-up), the player cannot change which pile the player has placed the card.

Therefore, once the player places a card into one of the five piles that the player hopes will each become Border Groups by the end of the hand, the player cannot move that card to a different one of those five piles nor can the player move that card into the Discard Group. Similarly, once a player places a card into the Discard Group, the player cannot move that card into one of the other piles. No card can be used in more than one group.

A Border Group in which two or more of the states in the group borders all of the other states in the group is called a Super Border Group.

The hand ends when all 25 cards in the hand have been played.

Scoring:

A player is awarded 20 points for a hand if he or she completes all five Border Groups during that hand.

A player is awarded 5 points if he or she completes 4 Border Groups during the hand.

If during a hand a player completes all five Border Groups, and at least two of those Border Groups are Super Border Groups, the player is awarded 10 bonus points for that hand.

A player wins if he or she has at least 50 points by the end of the game. If a player has at least 90 points by the end of the game, a player obtains a "Super Win." If a player has at least 120 points by the end of the game, that player obtains the "Ultimate Win."

GeoPlunge Quick Solo Border Groups: 1 Player

Playing the Game and Scoring:

All of the rules of GeoPlunge Solo Border Groups apply, except that in GeoPlunge Quick Solo Border Groups there is only one round (rather than three rounds) and to win a player must complete all 5 Border Groups in one of the two hands. If a player completes all 5 Border Groups in both hands, the player obtains the "Ultimate Win."

If a player completes 4 Border Groups in at least one hand, that player is considered to have tied (rather than lost).

Figure 13:
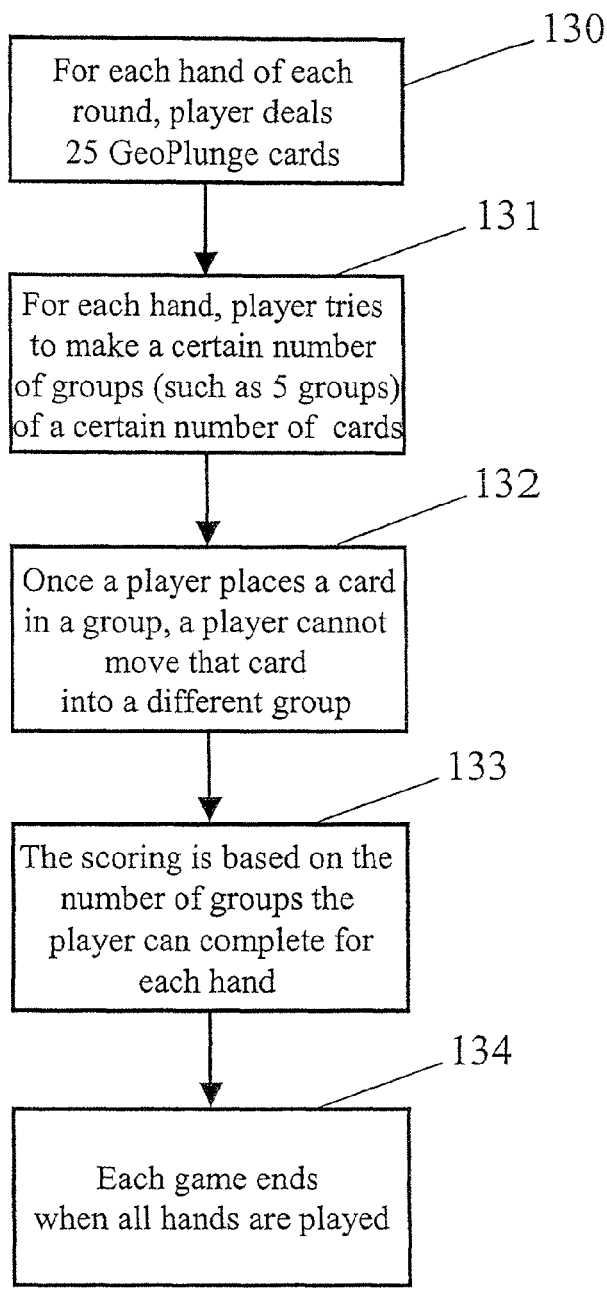

FIG. 13 presents a flow diagram of play of an exemplary GeoPlunge Solo Group Game, in accordance with an embodiment of the present invention. As shown in FIG. 13, for the initial hand of each round (and there may be more than one round), the player deals 25 GeoPlunge cards, and then for next hand the player deals the remaining 25 GeoPlunge cards (for an exemplary game with 50 cards, such as 50 state cards) 130. In a first variation, for each hand, player tries to make a certain number of groups (such as 5 groups) of a certain number of cards each (such as 5 cards) 131 in which, for one group, each card has at least 1 ranking in top 10 (and each card must have a different top 10 ranking than each other card in the group); for another group, each card has at least 1 ranking in second 10 (and each card must have a different second 10 ranking than each other card in the group); for another group, each card has at least 1 ranking in the middle 10 (and each card must have a different middle 10 ranking than each other card in the group); for another group, each card has at least 1 ranking in the next to bottom 10 (and each card must have a different next to bottom 10 ranking than each other card in the group); and for another group, each card has at least 1 ranking in bottom 10 (and each card must have a different bottom 10 ranking than each other card in the group).

In a second variation, for each hand, player tries to make a certain number of groups (such as 5 groups) of a certain number of cards each (such as 4 cards) in which the groups must be such that in each group one could travel from one state in the group to another state in the group while crossing each other state in the group, but no other states (and with regard to some games and some groups a player may also discard some cards and not place such cards in a group).

Once a player places a card in a group, a player cannot move that card into a different group 132. The scoring is based on the number of groups the player can complete for each hand 133. Each game ends when all hands are played 134.

GeoPlunge Pick-Em Games

General Rules that Apply to Both GeoPlunge Pick-Em Games

There are two GeoPlunge Pick-em games: GeoPlunge Indy Pick-em and GeoPlunge Team Pick-em. Both the GeoPlunge cards and the GeoPower cards are used in these games. The players agree who will be the dealer for the first hand. Thereafter, the dealer for each subsequent hand is the person to the left of the dealer for the prior hand. (Other embodiments of these games will permit different numbers of cards to be dealt to, and played by, players, than described in the exemplary games below, and in some other embodiments country cards, such as the GeoPlunge country cards, will be used and in those embodiments the grouping may be based on rankings or information regarding size, independence, population, time zone or life expectancy).

GeoPlunge Indy Pick-em may be played with anywhere from 2 to 6 players, each playing individually. GeoPlunge Team Pick-em may be played with 4 or 6 players, playing in two (or three) teams of 2 players each (in GeoPlunge Team Pick-em, teammates should sit across from each other, not next to each other).

These games are played one hand at a time.

Each hand is played in three stages, and there are three tricks in each stage.

Each player is dealt a certain amount of GeoPlunge cards during each stage, which amount varies by game (and by stage). The number of GeoPlunge cards played during each trick also varies by game. Once a player plays a GeoPlunge card, that card cannot be played again during the hand (unless the cards are reshuffled between stages and a player is then dealt that card again).

The GeoPlunge cards are reshuffled after a hand is completed. Where there are 3 or more players playing GeoPlunge Indy Pick-em, or 6 players playing GeoPlunge Team Pick-em, the GeoPlunge cards are also reshuffled after each stage of the hand (except for the GeoPlunge cards that are dealt but not played during a prior stage of that hand).

Three GeoPower cards are used during each stage, one on each trick. For each trick, the GeoPower card used (which is simply the then top GeoPower card in the deck) is called the Control GeoPower Card for that trick.

For each trick in which the Control GeoPower Card says:
1. Size, the GeoPlunge cards played on that trick are ranked based on the size of the state, with Alaska as the highest ranking card;
2. Statehood, the GeoPlunge cards played on that trick are ranked based on their date of entry into the union, with Delaware as the highest ranking card; or
3. Population, the GeoPlunge cards played on that trick are ranked based on the population of the state, with California as the highest ranking card.

After a GeoPower card is the Control GeoPower Card, it is placed at the bottom of the GeoPower card deck. The GeoPower cards are reshuffled after a hand is completed. They are not reshuffled between stages of a hand.

GeoPlunge Indy Pick-Em—2 to 6 Players

Playing the Game:

In the first two stages of each hand, the players are dealt 7 GeoPlunge cards each, and in the third stage they are dealt 4 GeoPlunge cards each.

In each stage, each player plays 6 of his or her GeoPlunge cards (two per trick). Therefore, at the end of the first stage each player will still have one GeoPlunge card, and at the end of the second stage each player will still have two GeoPlunge cards. Accordingly, after the GeoPlunge cards are dealt for the third stage, each player will have 6 GeoPlunge cards to play during that stage (four cards dealt to the player during that stage, plus the two cards not played in the earlier stages by that player).

A trick (remember, there are three tricks during each stage) consists of (i) each player choosing two of his or her GeoPlunge cards to play on that trick (i.e., to lay face down on the table); (ii) followed by the dealer turning face up the next GeoPower card in the deck (which will be the Control GeoPower Card for that trick), (iii) followed by the players each turning face up the two GeoPlunge cards they played during that trick. Therefore, at the time a player plays his or her two GeoPlunge cards for a trick (i.e., lays them face down on the table), the player does not know what the Control GeoPower card will be for that trick nor does the player know what GeoPlunge cards the other players are playing on the trick.

For each trick, the player who wins the trick is the player whose two GeoPlunge cards played on that trick have the best combined (i.e., lowest numerical) total ranking (and the relevant rankings for a trick are based on the Control GeoPower Card for that trick). For example, if the Control GeoPower Card for a trick says Population, and the dealer played the $7^{th}$ and $20^{th}$ ranked states in population, and the other player played the $4^{th}$ and $30^{th}$ ranked states in population, the dealer would win the trick since the combined population rankings of the cards the dealer played on that trick (27) are better (i.e., lower numerically) than the combined population rankings of the other player's cards played on that trick (34). If it is a tie for who has the best cards on any trick, whoever threw the card with the best (i.e., lowest numerical) relevant ranking among the tied players wins that trick.

Scoring:

For each stage, the winner of the stage is the player that won the most tricks during the stage. If two or more players tied for most tricks during a stage, the winner of that stage is the player that took the last trick among those players.

If there are 2 or 3 players, for the first stage of each hand, the winner of the stage receives 3 points; for the second stage, the winner receives 4 points; and for the third stage, the winner receives 6 points.

If there are 4 or more players, for the first stage of each hand, the winner of the stage receives 6 points; for the second stage, the winner receives 8 points; and for the third stage, the winner receives 10 points.

If a player wins all three tricks in one stage, that player receives double the amount of points he or she would have otherwise won (e.g., where there are 2 players, a player receives 6 total points for winning all three tricks during the first stage).

The first player to reach 50 points wins the game.

GeoPlunge Team Pick-Em—4 or 6 Players

Playing the Game:

In the first two stages of each hand, the players are dealt 4 GeoPlunge cards each, and in the third stage they are dealt 1 GeoPlunge card each. Team members cannot talk to each other or show each other their cards.

In each stage, each player plays 3 of his or her GeoPlunge cards (one per trick). Therefore, at the end of the first stage each player will still have one GeoPlunge card, and at the end of the second stage each player will still have two GeoPlunge cards. Accordingly, after the GeoPlunge cards are dealt for the third stage, each player will have 3 GeoPlunge cards to play during that stage (one card dealt to the player during that stage, plus the two cards not played in the earlier stages by that player).

A trick (remember, there are three tricks during each stage) consists of (i) each player choosing one of his or her GeoPlunge cards to play on that trick (i.e., to lay face down on the table); (ii) followed by the dealer turning face up the next GeoPower card in the deck (which will be the Control GeoPower Card for that trick), (iii) followed by the players each turning face up the GeoPlunge card they played during that trick. Therefore, at the time a player plays his or her GeoPlunge card for a trick (i.e., lays it face down on the table), the player does not know what the Control GeoPower card will be for that trick nor does the player know what GeoPlunge card each other player is playing on the trick.

For each trick, the team who wins the trick is the team whose two GeoPlunge cards played have the best combined (i.e., lowest numerical) total ranking (and the relevant rankings for a trick are based on the Control GeoPower Card for that trick). For example, if the Control GeoPower Card for a trick says Population, and the dealer played the $7^{th}$ ranked state in population, and the dealer's teammate played the $20^{th}$ ranked state in population, and their opponents played the $4^{th}$ and $30^{th}$ ranked states in population, the dealer's team would win the trick since the combined population rankings of the cards the dealer's team played on that trick (27) are better (i.e., lower numerically) than the combined population rankings of the other team's cards played on that trick (34). If it is a tie for which team has the best cards on any trick, whichever team among the tied teams threw the card with the best (i.e., lowest numerical) relevant ranking wins that trick.

Scoring:

For each stage, the team that wins the most tricks during that stage wins the stage. If two or more teams tied for most tricks during a stage, the winner of the stage is the team that took the last trick among the tied teams in the stage.

For the first stage of each hand, the winning team for that stage receives 3 points. For the second stage, the winning team receives 4 points. For the third stage, the winning team receives 6 points.

If a team wins all three tricks in one stage, that team receives double the amount of points it would have otherwise won (e.g., 6 total points for winning all three tricks during the first stage).

The first team to reach 50 points wins the game.

Figure 14:
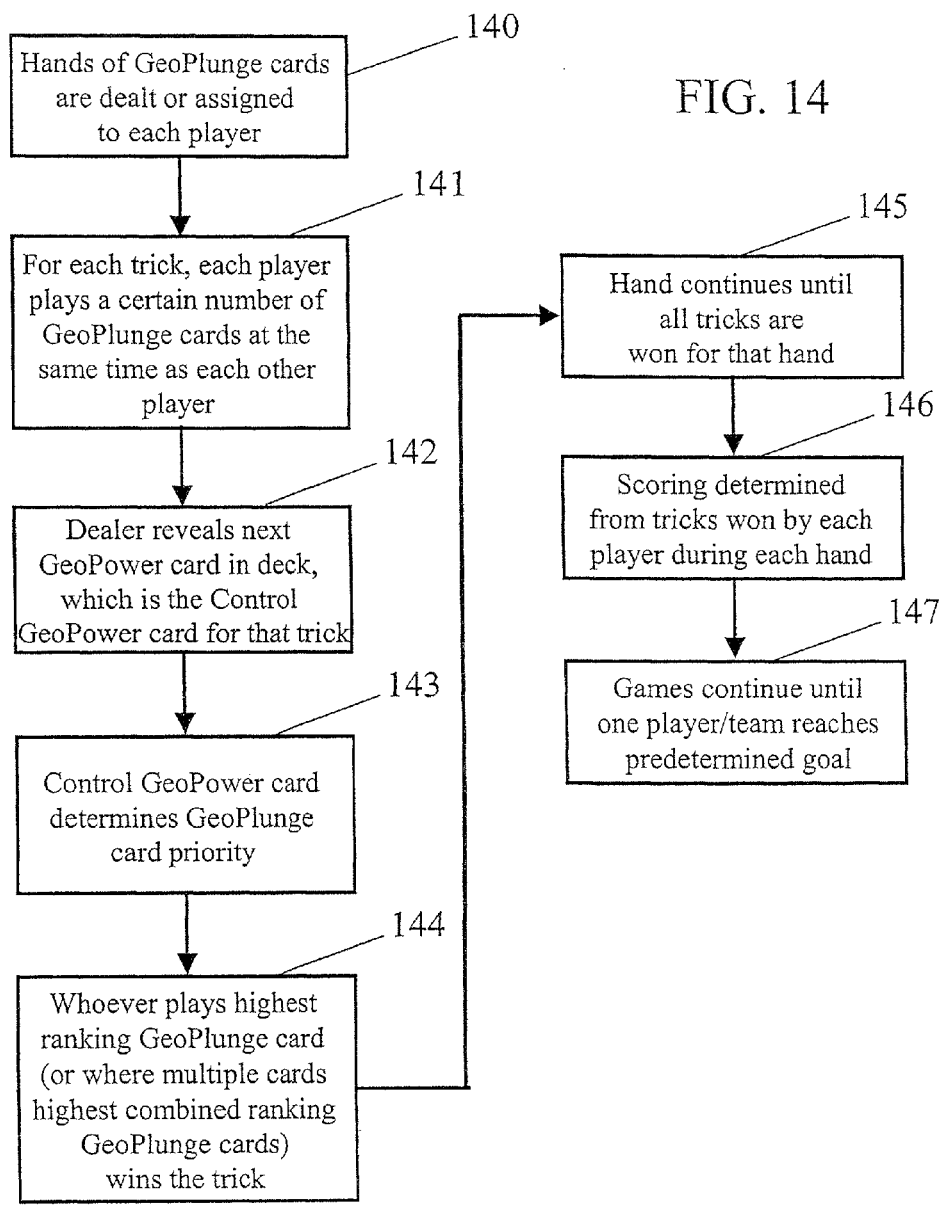

FIG. 14 presents a flow diagram of play of an exemplary GeoPlunge Pick-Em Game, in accordance with an embodiment of the present invention. As shown in FIG. 14, hands of GeoPlunge cards are dealt or assigned to each player 140. For each trick, each player plays a certain number of GeoPlunge cards at the same time as each other player 141. The Dealer reveals the next GeoPower card in deck, which is the Control GeoPower card for that trick 142. The Control GeoPower card determines the GeoPlunge card priority 143.

Whoever plays the highest ranking GeoPlunge card (or where multiple cards highest combined ranking GeoPlunge cards) wins the trick 144. The hand continues until all of the tricks are won for that hand 145. Scoring is determined from tricks won by each player during each hand 146. The Games continue until one player/team reaches a predetermined goal, such as a point total 147.

GeoPoker (Also Called by Other Names, Including Geography Poker or GeoPlunge Poker) General Rules Applicable to all GeoPoker Games There are many GeoPoker games, including the exemplary embodiments described below. The players may play one GeoPoker game, or if they wish, play dealer's choice so that whenever it is a player's turn to deal, that player will decide which GeoPoker game to play during that player's turn to deal.

Each game uses the GeoPlunge card deck (and the GeoPower card deck but for tiebreakers only, as explained herein) (In the alternative, players may use different methods of determining tiebreakers they agree upon and may even agree not to use the GeoPower card deck at all).

Each game is played one round at a time. For each round, whoever has the best hand in that round wins the round (in some embodiments not described below, whoever has the worst hand wins the round). The players decide who deals for the first round. For each round thereafter, the player who is the dealer is the player to the left of the dealer for the prior round. The GeoPlunge cards are reshuffled after each round, and in some games (as explained herein) they are also reshuffled during a round. The GeoPower cards are also used (but only for tiebreaker purposes) and they are only reshuffled after all of the GeoPower cards have been used.

In games in which players use their best six GeoPlunge cards to determine who has the best hand each round, set forth below is one embodiment of a listing from best to worst of the hands that a player can have in those games.

(1) Perfect Series
(2) Small Zone
(3) All Caps
(4) Double Trip Ranks
(5) Same Borders
(6) Border Connect
(7) Group Series
(8) Double Trip Caps
(9) Trip and Pair Ranks
(10) Trip Ranks
(11) Trip Caps
(12) Large Zone
(13) Double Pair Ranks
(14) Pair Ranks
(15) Nothing Below is a description of each of the above where players are using their best six GeoPlunge cards.

A player has a Perfect Series where the six cards all have successive ranks of Size, all have successive ranks of Statehood, or all have successive ranks of Population (e.g., cards ranking as the $5^{th}$ through $10^{th}$ most populated states).

A player has a Small Zone where either (i) all six cards have a purple color coded border at the top of the card; or (ii) all six cards have a blue color coded border at the top of the card. (The color coded border at the top of the GeoPlunge cards is red for eastern time zone states, green for central time zone states, blue for mountain time zone states and purple for Alaska, Hawaii and pacific time zone states (referred to as the pacific/other time zone for purposes of these games). For purposes of playing these games, if a state is located in two time zones, the state is considered to be in, and the color coded border reflects, the time zone most of the state is located in. (The portion of the state not in that time zone is shaded a different color in the state's picture near the bottom of the card so that the player is aware that the state is in two time zones, although that will not impact the playing of these game))

A player has All Caps where the state capitals for all six of the cards begin with the same first letter.

A player has Double Trip Ranks where the player has two sets of three cards in which each set of three cards is a Trip Ranks (see below for description of Triple Ranks). No card can be used in both sets (although, if the players wish, they can agree to ignore this rule).

A player has Same Borders where (i) the six cards all have the same border state (e.g., they all border Tennessee); or (ii) five of the cards are all border states of the sixth card.

A player has a Border Connect where the player has a group of six cards in which one of the cards (the "first card") is a border state of another card in the group (the "second card"), and the second card is also a border state of a different card in the group (the "third card"), and the third card is also a border state of a different card in the group (the "fourth card"), and the fourth card is also a border state of a different card in the group (the "fifth card"), and the fifth card is a border state of the final card in the group.

A player has a Group Series where the six cards are (i) all in the "Same Ranking Group" for Size, (ii) all in the "Same Ranking Group" for Statehood, or (iii) all in the Same Ranking Group for Population. Six cards are in the Same Ranking Group for a category (i.e., for Size, Statehood or Population) if (i) they each are ranked in the top ten in that category (e.g., six cards that are all ranked in the top 10 in size); (ii) they each are ranked in the second ten in that category (i.e., ranked between $11^{th}$ and $20^{th}$ in that category); (iii) they each are ranked in the middle ten in that category (i.e., ranked between $21^{st}$ and $30^{th}$ in that category); (iv) they each are ranked in the next to bottom ten in that category (i.e., ranked between $31^{st}$ and $40^{th}$ in that category); or (v) they each are ranked in the bottom ten in that category (ranked between $41^{st}$ and $50^{th}$ in that category).

A player has Double Trip Caps where the player has two sets of three cards in which each set of three cards is a Trip Caps (see below for description of Trip Caps).

A player has Trip and Pair Ranks where a player has three cards that are Trip Ranks (see below for description of Trip Ranks) and another two cards that are Pair Ranks (see below for description of Pair Ranks). No card can be used in both sets (although, if the players wish, they can agree to ignore this rule).

A player has Trip Ranks where a player has three cards in which the size ranking for one card is the same as the statehood ranking for a second card, and which are both the same as the population ranking of a third card (e.g. where one card is the $9^{th}$ ranked state in size, a second card is the $9^{th}$ ranked state in statehood and a third card is the $9^{th}$ ranked state in population).

A player has Trip Caps where the state capitals for three cards begin with the same first letter.

A player has a Large Zone where either (i) all six cards have a red color coded border at the top of the card; or (ii) all six cards have a green color coded border at the top of the card.

A player has Double Pair Ranks where two of the player's cards each share a common ranking (e.g., they are both $12^{th}$ in a category, such as one card is $12^{th}$ in size, another card is $12^{th}$ in statehood), and two of the player's other cards also share a common ranking (e.g., they are both $26^{th}$ in a category). No card can be used in both sets (although, if the players wish, they can agree to ignore this rule).

A player has Pair Ranks where two of the player's cards each share a common ranking (e.g., they are both $12^{th}$ in a category, such as one card is $12^{th}$ in size, and another card is $12^{th}$ in statehood).

A player has nothing where a player does not have any of the above.

In games in which players use their 5 best cards (instead of their 6 best cards) to determine who has the best hand each round, the exemplary ranking of hands set forth above (which is one embodiment of the rankings and types of hands for games in which players are using their 6 best cards) apply in the embodiments described below, except that (I) a player cannot have Double Trip Ranks or Double Trip Caps where players are using only their 5 best cards (instead of their 6 best cards); and (ii) all other types of groups in which a player needs to use all 6 cards to obtain the hand (i.e., Perfect Series, Small Zone, All Caps, Same Borders, Border Connect, Group Series and Large Zone) where the players are using their 6 best cards, apply in a similar fashion to 5 cards in games where the players are using their 5 best cards. For example, in games where players are using their 5 best cards, a Perfect Series is where the five cards all have successive ranks of Size, all have successive ranks of Statehood, or all have successive ranks of Population (e.g., ranking as the $5^{th}$ through $9^{th}$ most populated states).

In games in which players use their 4 best cards (instead of their 6 best cards) to determine who has the best hand each round, the ranking of hands above (which is one embodiment of the rankings and types of hands for games in which players are using their 6 best cards) apply in the embodiments described below, except that (i) a player cannot have Double Trip Ranks, Double Trip Caps or Trip and Pair Ranks where players are using only their 4 best cards (instead of their 6 best cards); and (ii) all other types of groups in which a player needs to use all 6 cards to obtain the hand (i.e., Perfect Series, Small Zone, All Caps, Same Borders, Border Connect, Group Series and Large Zone) where the players are using their 6 best cards, apply in a similar fashion to 4 cards in games where the players are using their 4 best cards. For example, where players are using their 4 best cards, All Caps is where the state capitals for all four of the cards begin with the same first letter.

Tiebreakers. In any round in which the players with the best hand each have the same type of hand (e.g., they each have "All Caps"), after all the players have shown their cards, under the embodiment of the games described below, the dealer turns face up (i.e., shows everyone including himself or herself) the then top card in the GeoPower card deck, which card is called the Control GeoPower card for that round. (After a Control GeoPower card is used on a round, it should not be used again until all of the GeoPower cards have been used in rounds, at which time the GeoPower Card deck will be reshuffled). Considering only the cards each player is using to form his or her hand (the "Selected Cards"), which will be either 4, 5 or 6 cards (depending on whether in the game players are using their best 4 cards, their best 5 cards, or their best 6 cards), whichever player has the Selected Card with the highest relevant ranking wins the hand. For each round in which the Control GeoPower Card says:

1. Size, whichever player, among the players that have tied for the best hand, has the Selected Card with the highest size ranking wins the round, and Alaska has the highest size ranking;
2. Statehood, whichever player, among the players that have tied for the best hand, has the Selected Card with the highest statehood ranking wins the round, and Delaware has the highest statehood ranking;
3. Population, whichever player, among the players that have tied for the best hand, has the Selected Card with the highest population ranking wins the round, and California has the highest statehood ranking.

Specific Rules for exemplary GeoPoker Games will now be provided in greater detail. (In other embodiments, the types of hands that a player may obtain can vary, and the rankings of those hands (whether the same types of hands described above or different ones) may also vary, but in all of these games the hands will be comprised of geography-related information such that a person can be learning geography while playing these games (which are poker-type games). In fact, in some other embodiments described below, country cards, such as the GeoPlunge country cards, are used to form the hands, and the rankings for these hands (e.g., a Border Connect will refer in those games to border countries rather than border states). Also, in other embodiments a different number of cards than that described in the exemplary GeoPoker games described below are dealt onto the table, face-down to the player, or face-up to the player, or those cards may be dealt in a different order, but in all such games hands will be comprised of geography-related information such that a person can be learning geography while playing these games (which are poker-type games)).

GeoPoker 4 Flip: 2 to 8 Players

Playing the Game:

A game is played one round at a time, and there are four phases in each round.

During the first phase, each player is dealt two GeoPlunge cards face down (but a player may look at his or her cards), and the next two cards in the GeoPlunge card deck are laid face up on the table (or other playing surface).

During the second phase, the next two cards at that time in the GeoPlunge card deck are laid face up on the table (or other playing surface) so that there are then four cards laid face up on the table (or other playing surface).

During the third phase, each player still in the round at that time is dealt one more GeoPlunge card face down (but a player may look at his or her cards) so that each player now has 3 GeoPlunge cards.

During the fourth and final phase, the next two cards at that time in the GeoPlunge deck are laid face up on the table (or other playing surface) so that there are then six cards laid face up on the table (or other playing surface).

Each player is trying to form the best four card hand for that player, and to do so a player may use any of the cards laid face up on the table (or other playing surface) and any of the cards dealt to that player.

After each phase, each player then still in for the hand announces one at a time, in clockwise order, whether that player will continue to be "in" for the next phase (or if it is the final phase whether that player will be in at the end of the round). After the first phase, the player to the left of the dealer announces first. After the second phase, the player second to the left of the dealer announces first, and so on. If a player announces he or she is "out" at any time during a round, such player cannot win that round.

The player who wins the round is the player who has the best hand among the players who are still in at the end of the round.

In this game, as well as all of the other GeoPoker Flip games described below, other variations of the game may be played so that the number of cards dealt to the player and the number of cards dealt onto the table, as well as the order in which those cards are dealt to the player and onto the table (and even the number of phases per round) may vary from that described in the exemplary GeoPlunge Flip games described above and below (for example in a different embodiment there will be 4 phases in which in the first phase the player is dealt two cards face down, in the next phase three cards are dealt face up on the table and in each of the last two phases one card is dealt face up onto the table), but what will be the same in each of these GeoPoker Flip games is that the players are each trying to form the best hands, which are formed based on geography-related information, and the players may each use some or all of their own cards (i.e. dealt to that player), and (depending on the variation) some or all of the cards dealt onto the table.

Scoring:

Where there are 2 or 3 players playing the game, the player who wins the round receives 10 points. Where there are 4 or 5 players playing the game, the player who wins the round receives 12 points. Where there are 6 or more players playing the game, the player who wins the round receives 15 points.

Each player who goes out after the first phase of a round receives 4 points.

Each player who goes out after the second phase of a round receives 3 points.

Each player who goes out after the third phase of a round receives 2 points.

Each player who goes out after the fourth phase of a round receives 1 point.

A player who stays in through the end of the round, but does not win the round, receives no points.

The first player to reach 50 points wins the game, except that a player may not win the game on a round in which the player does not win the round. (For GeoPoker Flip games where the scoring is kept as described above (as opposed to by using chips or other methods described below), where there is an embodiment that has a different number of rounds, the players will agree in advance how many points each player receives who goes out before the end of the round).

GeoPoker 5 Flip: 2 to 8 Players

All of the scoring rules of GeoPoker 4 Flip Apply. All of the rules of playing the game for GeoPoker 4 Flip apply, except that in GeoPoker 5 Flip, each player is trying to form the best five card hand for that player.

GeoPoker 6 Flip: 2 to 8 Players

All of the scoring rules of GeoPoker 4 Flip Apply. All of the rules of playing the game for GeoPoker 4 Flip apply, except that in GeoPoker 6 Flip, each player is trying to form the best six card hand for that player.

GeoPoker 4/6 Flip: 2 to 8 Players

Playing the Game:

With respect to playing the game, GeoPoker 4/6 Flip is equivalent to playing GeoPoker 4 Flip and GeoPoker 6 Flip at the same time. That is, players are trying to form the best four card hand, and the best six card hand, during each round.

The player who wins the round for the four card hand (the "Four Card Winner") is the player who has the best four card hand among the players who are still in at the end of the round.

The player who wins the round for the six card hand (the "Six Card Winner") is the player who has the best six card hand among the players who are still in at the end of the round.

Scoring:

Where there are 2 or 3 players playing the game, the player who is the Four Card Winner for the round receives 10 points, and the player who is the Six Card Winner for the round receives 10 points (if one player wins both that player receives 20 points). Where there are 4 or 5 players playing the game, the player who is the Four Card Winner for the round receives 12 points, and the player who is the Six Card Winner for the round receives 12 points (if one player wins both that player receives 24 points). Where there are 6 or more players playing the game, the player who is the Four Card Winner for the round receives 15 points, and the player who is the Six Card Winner for the round receives 15 points (if one player wins both that player receives 30 points).

Each player who goes out after the first phase of a round receives 4 points.

Each player who goes out after the second phase of a round receives 3 points.

Each player who goes out after the third phase of a round receives 2 points.

Each player who goes out after the fourth phase of a round receives 1 point.

A player who stays in through the end of the round, but is neither the Four Card Winner nor the Six Card Winner for that round receives no points.

The first player to reach 50 points wins the game, except that a player may not win the game on a round in which the player is neither the Four Card Winner or the Six Card Winner for that round.

GeoPoker 4/5 Flip: 2 to 8 Players

Playing the Game:

With respect to playing the game, GeoPoker 4/5 Flip is equivalent to playing GeoPoker 4 Flip and GeoPoker 5 Flip at the same time. That is, players are trying to form the best four card hand, and the best five card hand, during each round.

The player who wins the round for the four card hand (the "Four Card Winner") is the player who has the best four card hand among the players who are still in at the end of the round.

The player who wins the round for the five card hand (the "Five Card Winner") is the player who has the best five card hand among the players who are still in at the end of the round.

Scoring:

Where there are 2 or 3 players playing the game, the player who is the Four Card Winner for the round receives 10 points, and the player who is the Five Card Winner for the round receives 10 points (if one player wins both that player receives 20 points). Where there are 4 or 5 players playing the game, the player who is the Four Card Winner for the round receives 12 points, and the player who is the Five Card Winner for the round receives 12 points (if one player wins both that player receives 24 points). Where there are 6 or more players playing the game, the player who is the Four Card Winner for the round receives 15 points, and the player who is the Five Card winner for the round receives 15 points (if one player wins both that player receives 30 points).

Each player who goes out after the first phase of a round receives 4 points.

Each player who goes out after the second phase of a round receives 3 points.

Each player who goes out after the third phase of a round receives 2 points.

Each player who goes out after the fourth phase of a round receives 1 point.

A player who stays in through the end of the round, but is neither the Four Card Winner nor the Five Card Winner for that round receives no points.

The first player to reach 50 points wins the game, except that a player may not win the game on a round in which the player is neither the Four Card Winner or the Five Card Winner for that round.

GeoPoker 5/6 Flip: 2 to 8 Players

Playing the Game:

With respect to playing the game, GeoPoker 5/6 Flip is equivalent to playing GeoPoker 5 Flip and GeoPoker 6 Flip at the same time. That is, players are trying to form the best five card hand, and the best six card hand, during each round.

The player who wins the round for the five card hand (the "Five Card Winner") is the player who has the best five card hand among the players who are still in at the end of the round.

The player who wins the round for the six card hand (the "Six Card Winner") is the player who has the best six card hand among the players who are still in at the end of the round.

Scoring:

Where there are 2 or 3 players playing the game, the player who is the Five Card Winner for the round receives 10 points, and the player who is the Six Card Winner for the round receives 10 points (if one player wins both that player receives 20 points). Where there are 4 or 5 players playing the game, the player who is the Five Card Winner for the round receives 12 points, and the player who is the Six Card Winner for the round receives 12 points (if one player wins both that player receives 24 points). Where there are 6 or more players playing the game, the player who is the Five Card Winner for the round receives 15 points, and the player who is the Six Card Winner for the round receives 15 points (if one player wins both that player receives 30 points).

Each player who goes out after the first phase of a round receives 4 points.

Each player who goes out after the second phase of a round receives 3 points.

Each player who goes out after the third phase of a round receives 2 points.

Each player who goes out after the fourth phase of a round receives 1 point.

A player who stays in through the end of the round, but is neither the Five Card Winner nor the Six Card Winner for that round receives no points.

The first player to reach 50 points wins the game, except that a player may not win the game on a round in which the player is neither the Five Card Winner or the Six Card Winner for that round.

GeoPoker 4 Swap: 2 to 8 Players

Playing the Game:

A game is played one round at a time, and there are two phases in each round.

During the first phase, the players are dealt six GeoPlunge cards each face down (but a player may look at his or her cards).

During the second phase, each player who is still in the round may swap up to 4 of his or her cards for an equal number of replacement cards dealt from the remaining cards in the deck. However, if there are more than 5 players playing in the game, the cards discarded by each player are mixed in with the remaining cards in the deck and reshuffled along with those remaining cards before the dealer deals each player his or her replacement cards. The dealer deals the replacement cards to the players in clockwise order, starting with the player to the immediate left of the dealer, each player receives all of his or her replacement cards before the next player to receive such cards receives any of his or her replacement cards.

Each player is trying to form the best four card hand for that player using four of the six cards in that player's hand, after receiving any replacement cards.

After each phase, beginning with the player to the left of the dealer, the players announce one at a time whether they will continue to be "in" for the next round (or if it is the final phase whether that player will be in at the end of the round). If a player announces he or she is "out" at any time during a round, such player cannot win that round.

The player who wins the round is the player who has the best hand among the players who are still in at the end of the round.

In this game, as well as all of the other GeoPoker Swap games described below, other variations of the game may be played so that the number of cards dealt to the player and the number of cards that the player is permitted to discard (in order to receive replacement cards) may vary from that described in the exemplary GeoPoker Swap games described above and below (for example in a different embodiment there will be 5 cards initially dealt to each player and each player may discard any or all of those cards in order to receive a like number of replacement cards), but what will be the same in each of these GeoPoker Swap games is that the players are each trying to form the best hands, which are formed based on geography-related information, after being dealt a certain number of GeoPlunge cards and having an opportunity to discard a certain number of those cards and replace them with a like number.

Scoring:

Where there are 2 or 3 players playing the game, the player who wins the round receives 10 points. Where there are 4 or 5 players playing the game, the player who wins the round receives 12 points. Where there are 6 or more players playing the game, the player who wins the round receives 15 points.

Each player who goes out after the first phase of a round receives 4 points.

Each player who goes out after the second phase of a round receives 2 points.

A player who stays in through the end of the round, but does not win the round, receives no points.

The first player to reach 50 points wins the game, except that a player may not win the game on a round in which the player does not win the round.

GeoPoker 5 Swap: 2 to 8 Players

All of the scoring rules of GeoPoker 4 Swap Apply. All of the rules of playing the game for GeoPoker 4 Swap apply, except that in GeoPoker 5 Swap, each player is trying to form the best five card hand for that player.

GeoPoker 6 Swap: 2 to 8 Players

All of the scoring rules of GeoPoker 4 Swap Apply. All of the rules of playing the game for GeoPoker 4 Swap apply, except that in GeoPoker 6 Swap, each player is trying to form the best six card hand for that player.

GeoPoker 4/6 Swap: 2 to 8 Players

Playing the Game:

With respect to playing the game, GeoPoker 4/6 Swap is equivalent to playing GeoPoker 4 Swap and GeoPoker 6 Swap at the same time. That is, players are trying to form the best four card hand, and the best six card hand, during each round.

The player who wins the round for the four card hand (the "Four Card Winner") is the player who has the best four card hand among the players who are still in at the end of the round.

The player who wins the round for the six card hand (the "Six Card Winner") is the player who has the best six card hand among the players who are still in at the end of the round.

Scoring:

Where there are 2 or 3 players playing the game, the player who is the Four Card Winner for the round receives 10 points, and the player who is the Six Card Winner for the round receives 10 points (if one player wins both that player receives 20 points). Where there are 4 or 5 players playing the game, the player who is the Four Card Winner for the round receives 12 points, and the player who is the Six Card winner for the round receives 12 points (if one player wins both that player receives 24 points). Where there are 6 or more players playing the game, the player who is the Four Card Winner for the round receives 15 points, and the player who is the Six Card Winner for the round receives 15 points (if one player wins both that player receives 30 points).

Each player who goes out after the first phase receives 4 points.

Each player who goes out after the second phase receives 2 points.

A player who stays in through the end of the round, but is neither the Four Card Winner nor the Six Card Winner for that round receives no points.

The first player to reach 50 points wins the game, except that a player may not win the game on a round in which the player is neither the Four Card Winner or the Six Card Winner for that round.

GeoPoker 4/5 Swap: 2 to 8 Players

Playing the Game:

With respect to playing the game, GeoPoker 4/5 Swap is equivalent to playing GeoPoker 4 Swap and GeoPoker 5 Swap at the same time. That is, players are trying to form the best four card hand, and the best five card hand, during each round.

The player who wins the round for the four card hand (the "Four Card Winner") is the player who has the best four card hand among the players who are still in at the end of the round.

The player who wins the round for the five card hand (the "Five Card Winner") is the player who has the best five card hand among the players who are still in at the end of the round.

Scoring:

Where there are 2 or 3 players playing the game, the player who is the Four Card Winner for the round receives 10 points, and the player who is the Five Card Winner for the round receives 10 points (if one player wins both that player receives 20 points). Where there are 4 or 5 players playing the game, the player who is the Four Card Winner for the round receives 12 points, and the player who is the Five Card Winner for the round receives 12 points (if one player wins both that player receives 24 points). Where there are 6 or more players playing the game, the player who is the Four Card Winner for the round receives 15 points, and the player who is the Five Card Winner for the round receives 15 points (if one player wins both that player receives 30 points).

Each player who goes out after the first phase receives 4 points.

Each player who goes out after the second phase receives 2 points.

A player who stays in through the end of the round, but is neither the Four Card Winner nor the Five Card Winner for that round receives no points.

The first player to reach 50 points wins the game, except that a player may not win the game on a round in which the player is neither the Four Card Winner or the Five Card Winner for that round.

GeoPoker 5/6 Swap: 2 to 8 Players

Playing the Game:

With respect to playing the game, GeoPoker 5/6 Swap is equivalent to playing GeoPoker 5 Swap and GeoPoker 6 Swap at the same time. That is, players are trying to form the best five card hand, and the best six card hand, during each round.

The player who wins the round for the five card hand (the "Five Card Winner") is the player who has the best five card hand among the players who are still in at the end of the round.

The player who wins the round for the six card hand (the "Six Card Winner") is the player who has the best six card hand among the players who are still in at the end of the round.

Scoring:

Where there are 2 or 3 players playing the game, the player who is the Five Card Winner for the round receives 10 points, and the player who is the Six Card Winner for the round receives 10 points (if one player wins both that player receives 20 points). Where there are 4 or 5 players playing the game, the player who is the Five Card Winner for the round receives 12 points, and the player who is the Six Card winner for the round receives 12 points (if one player wins both that player receives 24 points). Where there are 6 or more players playing the game, the player who is the Five Card Winner for the round receives 15 points, and the player who is the Six Card Winner for the round receives 15 points (if one player wins both that player receives 30 points).

Each player who goes out after the first phase receives 4 points.

Each player who goes out after the second phase receives 2 points.

A player who stays in through the end of the round, but is neither the Five Card Winner nor the Six Card Winner for that round receives no points.

The first player to reach 50 points wins the game, except that a player may not win the game on a round in which the player is neither the Five Card Winner or the Six Card Winner for that round.

All of the GeoPoker Swap games can also be played with only one player (and any of the scoring principles of GeoPoker Swap games may apply) and in such games whether a player wins (and how many points that player receives or loses) in each round depends on what hand that player obtains (for example, in one embodiment the player may need to obtain Trip Ranks to win the round, and if the player obtains better than Trip Ranks, the player receives even more points).

GeoPoker 4 Up Down: 2 to 6 Players

Playing the Game:

A game is played one round at a time, and there are four phases in each round.

During the first phase, the players are dealt two GeoPlunge cards each face down (but a player may look at his or her cards), and the players are then each dealt two cards face-up.

During the second phase, each player still in the round is dealt two more GeoPlunge cards each face up so that each player then remaining in the round now has six GeoPlunge cards (two face down and four face up).

During the third phase, each player still in the round at that time is dealt one more GeoPlunge card face up so that each player then remaining in the round now has 7 GeoPlunge cards.

During the fourth and final phase, each player still in the round at that time is dealt one more GeoPlunge card face down (but a player may look at his or her cards) so that each player then remaining in the round now has 8 GeoPlunge cards (three face down and five face up).

Each player is trying to form the best four card hand for that player, using no more than 4 of the eight cards dealt to the player.

After each phase, each player then still in for the hand announces one at a time, in clockwise order, whether that player will continue to be "in" for the next phase (or if it is the final phase whether that player will be in at the end of the round). After the first phase, the player to the left of the dealer announces first. After the second phase, the player second to the left of the dealer announces first, and so on. If a player announces he or she is "out" at any time during a round, such player cannot win that round.

The player who wins the round is the player who has the best hand among the players who are still in at the end of the round.

In this game, as well as all of the other GeoPoker Up Down games described below, other variations of the game may be played so that the number of cards dealt face up to the player and the number of cards dealt face down to the player, as well as the order in which those cards are dealt to the player face up and face down (and even the number of phases per round) may vary from that described in the exemplary GeoPower Up and Down games described above and below (for example in a different embodiment there will be 5 phases in which in the first phase each player is dealt two cards face down and one card face up, in the next three phases each player will be dealt one card face up each time, and in the last phase each player is dealt one card face down), but what will be the same in each of these GeoPoker Up Down games is that the players are each trying to form the best hands, which are formed based on geography-related information, and the players may each use some or all of their own cards dealt face up and face down.

Scoring:

Where there are 2 or 3 players playing the game, the player who wins the round receives 10 points. Where there are 4 or 5 players playing the game, the player who wins the round receives 12 points. Where there are 6 players playing the game, the player who wins the round receives 15 points.

Each player who goes out after the first phase of a round receives 4 points.

Each player who goes out after the second phase of a round receives 3 points.

Each player who goes out after the third phase of a round receives 2 points.

Each player who goes out after the fourth phase of a round receives 1 point.

A player who stays in through the end of the round, but does not win the round, receives no points.

The first player to reach 50 points wins the game, except that a player may not win the game on a round in which the player does not win the round.

(For GeoPoker Flip games where the scoring is kept as described above (as opposed to by using chips or other methods described below), where there is an embodiment that has a different number of rounds, the players will agree in advance how many points each player receives who goes out before the end of the round).

GeoPoker 5 Up Down: 2 to 6 Players

All of the scoring rules of GeoPoker 4 Up Down Apply. All of the rules of playing the game for GeoPoker 4 Up Down apply, except that in GeoPoker 5 Up Down, each player is trying to form the best five card hand for that player.

GeoPoker 6 Up Down: 2 to 6 Players

All of the scoring rules of GeoPoker 4 Up Down Apply. All of the rules of playing the game for GeoPoker 4 Up Down apply, except that in GeoPoker 6 Up Down, each player is trying to form the best six card hand for that player.

GeoPoker 4/6 Up Down: 2 to 6 Players

Playing the Game:

With respect to playing the game, GeoPoker 4/6 Up Down is equivalent to playing GeoPoker 4 Up Down and GeoPoker 6 Up Down at the same time. That is, players are trying to form the best four card hand, and the best six card hand, during each round.

The player who wins the round for the four card hand (the "Four Card Winner") is the player who has the best four card hand among the players who are still in at the end of the round.

The player who wins the round for the six card hand (the "Six Card Winner") is the player who has the best six card hand among the players who are still in at the end of the round.

Scoring:

Where there are 2 or 3 players playing the game, the player who is the Four Card Winner for the round receives 10 points, and the player who is the Six Card Winner for the round receives 10 points (if one player wins both that player receives 20 points). Where there are 4 or 5 players playing the game, the player who is the Four Card Winner for the round receives 12 points, and the player who is the Six Card Winner for the round receives 12 points (if one player wins both that player receives 24 points). Where there are 6 players playing the game, the player who is the Four Card Winner for the round receives 15 points, and the player who is the Six Card Winner for the round receives 15 points (if one player wins both that player receives 30 points).

Each player who goes out after the first phase of a round receives 4 points.

Each player who goes out after the second phase of a round receives 3 points.

Each player who goes out after the third phase of a round receives 2 points.

Each player who goes out after the fourth phase of a round receives 1 point.

A player who stays in through the end of the round, but is neither the Four Card Winner nor the Six Card Winner for that round receives no points.

The first player to reach 50 points wins the game, except that a player may not win the game on a round in which the player is neither the Four Card Winner or the Six Card Winner for that round.

GeoPoker 4/5 Up Down: 2 to 6 Players

Playing the Game:

With respect to playing the game, GeoPoker 4/5 Up Down is equivalent to playing GeoPoker 4 Up Down and GeoPoker 5 Up Down at the same time. That is, players are trying to form the best four card hand, and the best five card hand, during each round.

The player who wins the round for the four card hand (the "Four Card Winner") is the player who has the best four card hand among the players who are still in at the end of the round.

The player who wins the round for the five card hand (the "Five Card Winner") is the player who has the best five card hand among the players who are still in at the end of the round.

Scoring:

Where there are 2 or 3 players playing the game, the player who is the Four Card Winner for the round receives 10 points, and the player who is the Five Card Winner for the round receives 10 points (if one player wins both that player receives 20 points). Where there are 4 or 5 players playing the game, the player who is the Four Card Winner for the round receives 12 points, and the player who is the Five Card winner for the round receives 12 points (if one player wins both that player receives 24 points). Where there are 6 players playing the game, the player who is the Four Card Winner for the round receives 15 points, and the player who is the Five Card Winner for the round receives 15 points (if one player wins both that player receives 30 points).

Each player who goes out after the first phase of a round receives 4 points.

Each player who goes out after the second phase of a round receives 3 points.

Each player who goes out after the third phase of a round receives 2 points.

Each player who goes out after the fourth phase of a round receives 1 point.

A player who stays in through the end of the round, but is neither the Four Card Winner nor the Five Card Winner for that round receives no points.

The first player to reach 50 points wins the game, except that a player may not win the game on a round in which the player is neither the Four Card Winner or the Five Card Winner for that round.

GeoPoker 5/6 Up Down: 2 to 6 Players

Playing the Game:

With respect to playing the game, GeoPoker 5/6 Up Down is equivalent to playing GeoPoker 5 Up Down and GeoPoker 6 Up Down at the same time. That is, players are trying to form the best four card hand, and the best six card hand, during each round.

The player who wins the round for the five card hand (the "Five Card Winner") is the player who has the best five card hand among the players who are still in at the end of the round.

The player who wins the round for the six card hand (the "Six Card Winner") is the player who has the best six card hand among the players who are still in at the end of the round.

Scoring:

Where there are 2 or 3 players playing the game, the player who is the Five Card Winner for the round receives 10 points, and the player who is the Six Card Winner for the round receives 10 points (if one player wins both that player receives 20 points). Where there are 4 or 5 players playing the game, the player who is the Five Card Winner for the round receives 12 points, and the player who is the Six Card Winner for the round receives 12 points (if one player wins both that player receives 24 points). Where there are 6 or more players playing the game, the player who is the Five Card Winner for the round receives 15 points, and the player who is the Six Card Winner for the round receives 15 points (if one player wins both that player receives 30 points).

Each player who goes out after the first phase of a round receives 4 points.

Each player who goes out after the second phase of a round receives 3 points.

Each player who goes out after the third phase of a round receives 2 points.

Each player who goes out after the fourth phase of a round receives 1 point.

A player who stays in through the end of the round, but is neither the Five Card Winner nor the Six Card Winner for that round receives no points.

The first player to reach 50 points wins the game, except that a player may not win the game on a round in which the player is neither the Five Card Winner or the Six Card Winner for that round.

Note: For each GeoPoker game, including the exemplary games described above, the games may also be played with each player starting with the same number (which number is determined by the players) of points (or chips or other tangible items). In that event, the winner of the round receives all of the points (or chips or tangible items) risked on that round (and to stay in on a round, a person must risk as many points (or chips or other tangible items) as any other person places in during any phase of that round) if the person has a sufficient number of points or chips or other tangible items (otherwise that person may stay in by placing all they have left in, and if they lose they are eliminated). If there are co-winners for a round, each co-winner receives an equal share of the points (or chips or other tangible items) risked in that round. Under these scenarios, the games may end at a predetermined time (with the winner being the person at that time with the most points, chips or other tangible items) the games may end when one player has all of the points (or chips or other tangible items). Alternatively, the players may also keep score during GeoPoker games by simply awarding the winner of each round a certain number of points (e.g., 10 points, and where there are co-winners they each receive a certain number of points, e.g., 10 points, and if one player wins both ways in a game that has two winning hands, such player receives a certain number of points, e.g., 20 points) and all other players receive no points for that round. Under that scenario, the first player to reach a predetermined number of points (e.g., 50) wins the game.

Figure 15:
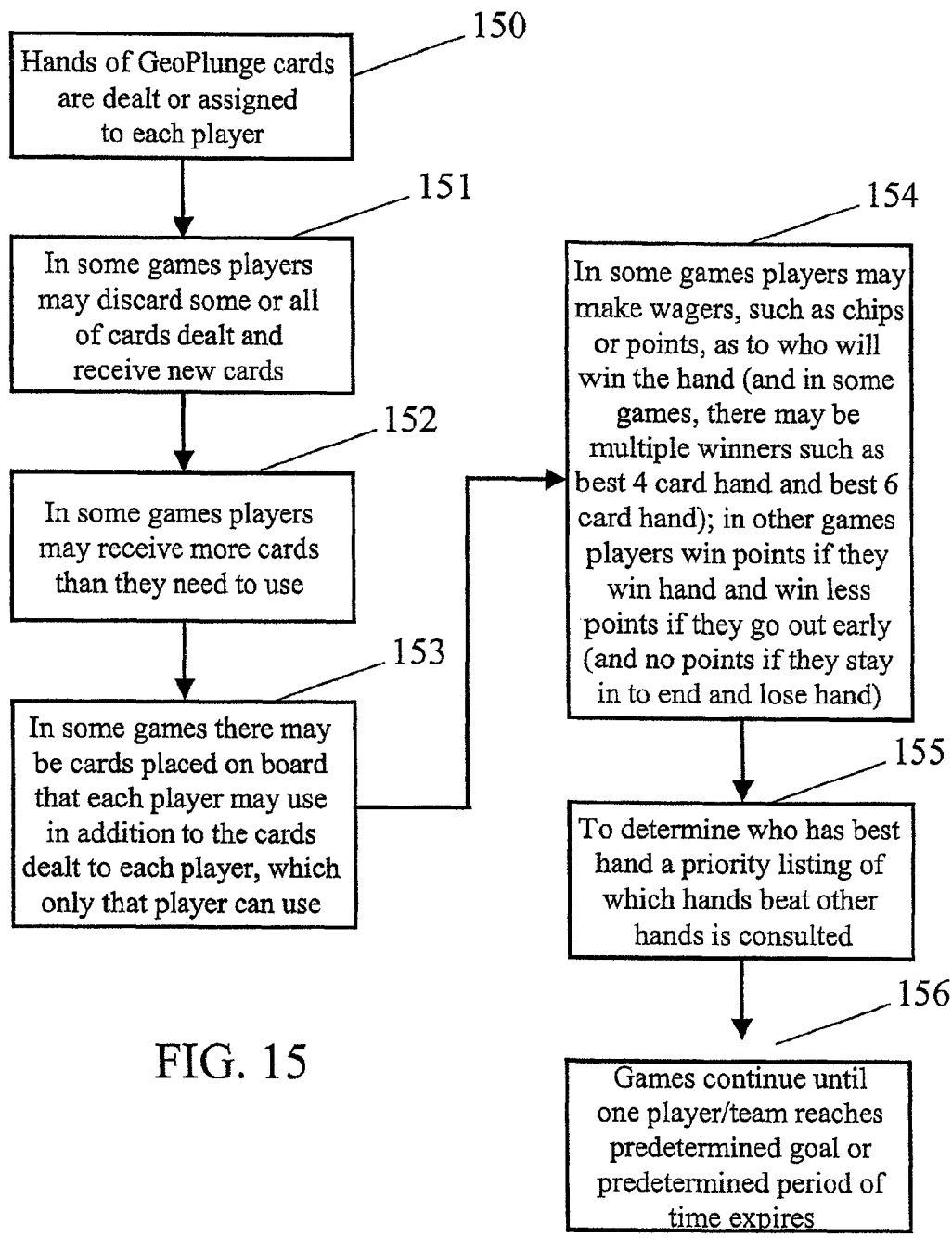

FIG. 15 presents a flow diagram of play of an exemplary GeoPlunge Poker Game, in accordance with an embodiment of the present invention. As shown in FIG. 15, hands of GeoPlunge cards are dealt or assigned to each player 150. In some games, players may discard some or all of their cards dealt and receive new cards 151. In some games, players may receive more cards than they need to use 152. In some games, cards may be placed on that board that each player may use in addition to the cards dealt to each player 153.

In some games, players may make wagers, such as chips or points, as to who will win the hand (and in some games, there may be multiple winners such as best 4 card hand and best 6 card hand). In other games players win points if they win the hand and win less points if they go out early (and no points if they stay in to end and lose hand) 154. To determine who has the best hand, a priority listing is consulted 155. The priority listing indicates which hands beat other hands. Types of hands that can be obtained in a game include, for example, where 4 cards are used, in one embodiment such hands as Perfect Series, Small Zone, All Caps, Same Borders, Border Connect, Trip Ranks, Trip Caps, Group Series, Large Zone, Double Pair Ranks and Pair Ranks. (Similar types of hands, as well as other hands, can be obtained where more cards are used, and regardless of how many cards are used, different types of hands can also be obtained in other embodiments so long as the hands are all based on geography-related information). The game continues until one player reaches a predetermined goal, such as a point or chip goal 156.

GeoPlunge Flux Games

General Rules that Apply to All GeoPlunge Flux Games

There are many variations of GeoPlunge Flux games, including the following four exemplary variations: GeoPlunge Basic Flux, GeoPlunge Zone Flux, GeoPlunge Super Flux, and GeoPlunge Super Zone Flux. Both the GeoPlunge cards and the GeoPower cards are used in these games. Both decks are reshuffled after every hand.

Each GeoPlunge Flux game may be played with anywhere from 2 to 6 players. If there are 4 or 6 players, they may each play individually or in two (or three) teams of 2 players each (if the game is played with teams, teammates should sit across from each other, not next to each other).

If there are 2, 3, or 4 players, each hand each player is dealt 9 GeoPlunge cards and 3 GeoPower cards. If there are 5 or 6 players, each hand each player is dealt 8 GeoPlunge cards and 2 GeoPower cards.

Where there are 2, 3, or 4 players, there are 9 tricks played during the hand. If there are 5 or 6 players, 8 tricks are played during each hand. A trick consists of each player, in clockwise order, one at a time, playing (i.e., placing onto the table or other playing surface) one of his or her GeoPlunge cards. (During a hand, a player cannot play any GeoPlunge card he or she has already played on a prior trick in that hand).

To determine who is the dealer for the first hand, each player, without looking, draws a card from the GeoPlunge card deck and whoever draws the highest ranking statehood card among the cards drawn (Delaware has the highest statehood ranking) is the dealer. Thereafter, whoever wins the prior hand (i.e., gets the most points in a hand) is the dealer for the next hand, and if it is a tie for most points, then the dealer for the prior hand deals again.

For each hand, on the first trick the dealer is the first person to play a GeoPlunge card (this is called leading). Thereafter, whoever wins a trick leads on the next trick.

Other embodiments of these games will permit different numbers of GeoPlunge and GeoPower cards to be dealt to, and played by, players, than described in the exemplary games below, and in some other embodiments country cards, such as the GeoPlunge country cards, will be used and in those embodiments the rankings will be based on information regarding size, independence, population, time zone or life expectancy).

GeoPlunge Basic Flux—2 to 6 Players

Playing the Game:

On the first trick of each hand, the dealer must play one of his or her GeoPower cards at the same time the dealer leads one of his or her GeoPlunge cards.

Thereafter, during any trick of the hand (including the first trick), any player may, if the player so wishes, at the same time he or she plays a GeoPlunge card, throw one of the GeoPower cards in his or her hand. A player can only play a GeoPower card at the same time he or she throws a GeoPlunge card, and once a player plays a GeoPower card that card is taken out of the player's hand and cannot be played again by the player during that hand. (Therefore, as to each player, on most of the tricks during the hand the player will not play a GeoPower card since a player is dealt far fewer GeoPower cards than there are tricks in a hand).

For each trick, one of the GeoPower cards will be considered the "Control GeoPower Card" for that trick. For each trick in which one or more players play a GeoPower card, the Control GeoPower Card for that trick is the last GeoPower Card played on the trick. For each trick in which no GeoPower cards are played, the Control GeoPower Card is whatever the Control GeoPower Card was for the immediately preceding trick.

For each trick, whoever plays the higher (or highest, if there are three or more players) ranking GeoPlunge card played on that trick wins the trick. For each trick, the Control GeoPower Card for that trick determines how to rank the GeoPlunge cards played on that trick.

For each trick in which the Control GeoPower Card for that trick says:
1. Size, the GeoPlunge cards for that trick are ranked based on the size of the state, with Alaska as the highest ranking card;
2. Statehood, the GeoPlunge cards for that trick are ranked based on their date of entry into the union, with Delaware as the highest ranking card; or
3. Population, the GeoPlunge cards for that trick are ranked based on the population of the state, with California as the highest ranking card.

Scoring:

The player who wins the most tricks each hand gets 8 points. If it is a tie, the player who took the last trick among the tied players gets the 8 points.

For each hand, the player who wins the fifth trick in the hand gets 4 points.

For each hand, the player who wins the next to last trick in the hand gets 4 points.

For each hand, the player who wins the trick that includes the highest ranking GeoPlunge card played during the entire hand, with rankings based on whatever the Control GeoPlunge Card is for the last trick of the hand, wins 4 points.

If the game is played with two or three teams of 2 players each, the scoring is the same as above, except that it applies to the team rather than the individual. For example, whichever team wins the most tricks wins the hand and gets 8 points. The tricks won by a team equals the sum of the tricks won by each player on the team.

The first player/team to reach 50 points wins the game.

GeoPlunge Zone Flux—2 to 6 Players

All of the scoring rules for GeoPlunge Basic Flux apply, and all of the other rules in GeoPlunge Basic Flux apply, except as follows.
Playing the Game:

In GeoPlunge Zone Flux, for each trick, the person who plays the highest ranking GeoPlunge card in the Zone (i.e., time zone) of the card that is led wins the trick. (The Zone of each GeoPlunge card is determined by the color of the border at the top of the card).

Just like in GeoPlunge Basic Flux, for each trick, the player who leads on that trick can play any GeoPlunge card then remaining in his or her hand. However, in GeoPlunge Zone Flux, for each trick, each player who does not lead on that trick must, if possible, play a GeoPlunge card from his or her hand that is in the same Zone as the card led. If a player does not have a GeoPlunge card remaining in his or her hand that is in the same Zone as the card led, the player may play any GeoPlunge card then remaining in his or her hand.

GeoPlunge Super Flux—2 to 6 Players

All of the scoring rules for GeoPlunge Basic Flux apply, and all of the other rules in GeoPlunge Basic Flux apply, except as follows.
Playing the Game:

In GeoPlunge Basic Flux, a single player cannot play two GeoPower cards on the same trick. In GeoPlunge Super Flux, a player can play two GeoPower cards on the same trick (which would both be played at the same time as the player plays his or her GeoPlunge card for that trick), but only if both GeoPower cards say the same ranking (i.e., both say Size, both say Statehood, or both say Population). These are called Duplicate GeoPower Cards.

If a player, during a trick, plays a GeoPlunge card that has a top ten ranking at the time the card is played, as determined by the then current Control GeoPower Card, on that same trick a subsequent player cannot play a GeoPower Card unless that subsequent player plays Duplicate GeoPower Cards. (For example, if a player plays Montana, which is ranked 4$^{th}$ in size, at a time that the then current Control GeoPower Card says Size, another player during that same trick cannot play a GeoPower card that says Statehood or Population unless the other player plays Duplicate GeoPower Cards).

If a player, during a trick, plays Duplicate GeoPower Cards, no other player may play a GeoPower card thereafter during that trick.

If two players play GeoPower cards during a trick, no other player may play a GeoPower card during that trick.

GeoPlunge Super Zone Flux—2 to 6 Players

All of the scoring rules for GeoPlunge Super Flux apply, and all of the other rules in GeoPlunge Super Flux apply, except as follows.
Playing the Game:

In GeoPlunge Super Zone Flux, for each trick, the person who plays the highest ranking GeoPlunge card in the Zone (i.e., time zone) of the card that is led wins the trick. (The Zone of each GeoPlunge card is determined by the color of the border at the top of the card).

Just like in GeoPlunge Super Flux, for each trick, the player who leads on that trick can play any GeoPlunge card then remaining in his or her hand. However, in GeoPlunge Super Zone Flux, for each trick, each player who does not lead on that trick must, if possible, play a GeoPlunge card from his or her hand that is in the same Zone as the card led. If a player does not have a GeoPlunge card remaining in his or her hand that is in the same Zone as the GeoPlunge card led, the player may play any card then remaining in his or her hand.

Figure 16:
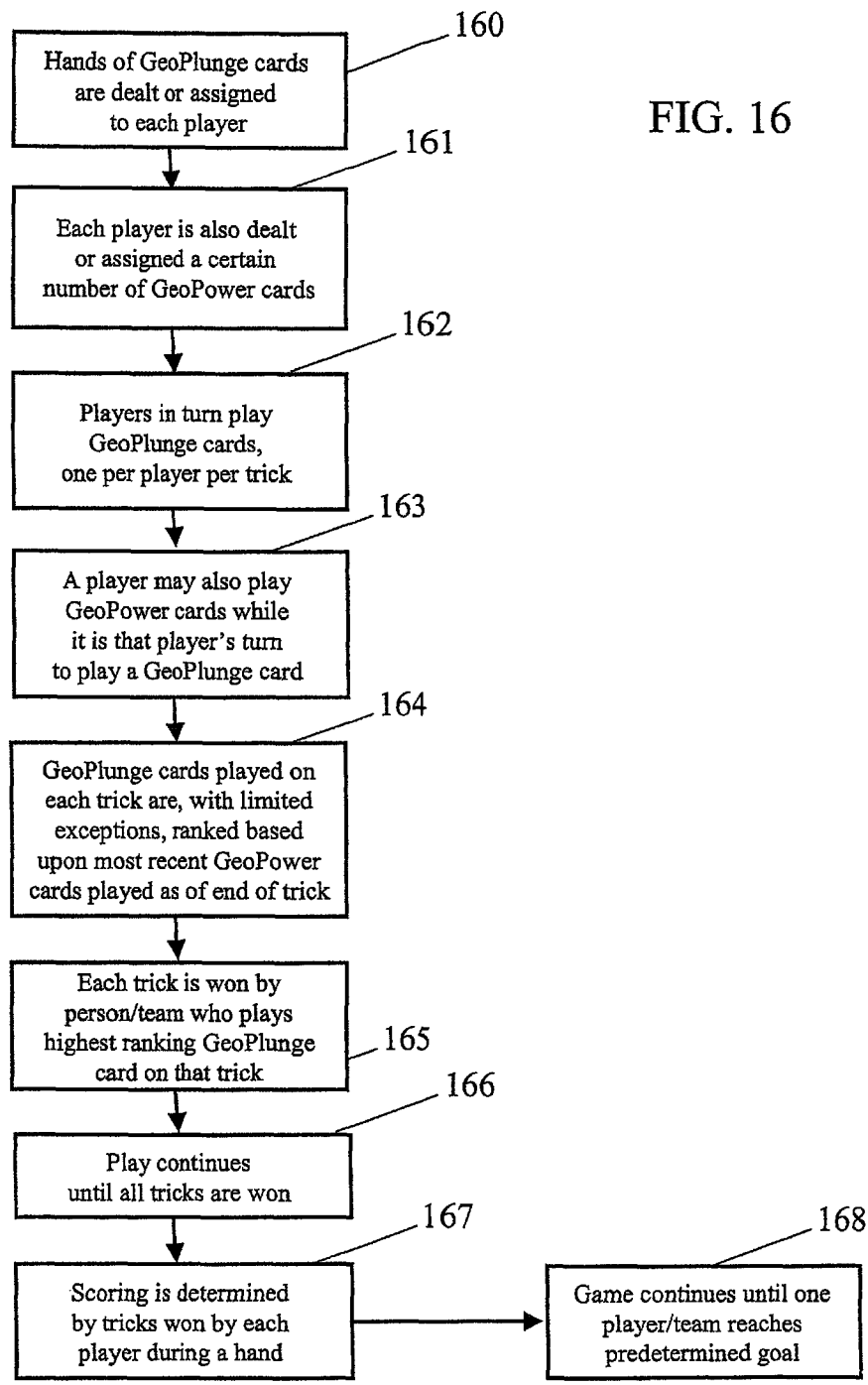

FIG. 16 presents a flow diagram of play of an exemplary GeoPlunge Flux Game, in accordance with an embodiment of the present invention. As shown in FIG. 16, hands of GeoPlunge cards are dealt or assigned to each player 160. Each player is also dealt a certain number of GeoPower cards 161. The Players in turn play GeoPlunge cards, one per player per trick 162. A player may also play GeoPower cards while it is that player's turn to play a GeoPlunge card 163. With limited exceptions, the most recent GeoPower card played determines the GeoPlunge card priority for a trick. The highest ranking GeoPlunge card played on a trick wins that trick (although in some games, it is the highest ranking card played on a trick that is in the same time zone as the first card played on a trick that wins the trick).

Play continues until all of the tricks are won 164. Scoring is determined by tricks won by each player during a hand 165. The game continues until one player/team reaches a predetermined goal, such as a point total 166.

GeoPlunge Junior Solo Games

There are three GeoPlunge Solo games: GeoPlunge Junior Solo Time Zone groups, GeoPlunge Junior Single Solo Power, and GeoPlunge Junior Time Zone Match. These games are played with 1 player.

GeoPlunge Junior Solo Time Zone Groups—1 Player

Playing the Game:

Only the GeoPlunge cards are used in this game. The GeoPlunge cards are shuffled before the game begins.

The game consists of two hands, played one hand at a time. In the first hand, the top 25 GeoPlunge cards in the deck are used, and in the second hand the remaining 25 GeoPlunge cards in the deck are used. The GeoPlunge cards are not reshuffled between each hand.

During each hand, the player tries to form five "Time Zone Groups."

Each Time Zone Group must consist of 4 cards where each state in the group has the same color coded border at the top of the card (i.e., for each group, each state in that group must have color coded borders at the top of the card that all are red, or that all are green, or that are all are blue, or that all are purple).

The color coded border at the top of the GeoPlunge cards is red for eastern time zone states, green for central time zone states, blue for mountain time zone states and purple for Alaska, Hawaii and pacific time zone states (referred to as the pacific/other time zone for purposes of this game). For purposes of playing this game, if a state is located in two time zones, the state is considered to be in, and the color coded border reflects, the time zone most of the state is located in. (The portion of the state not in that time zone is shaded a different color in the state's picture near the bottom of the card so that the player is aware that the state is in two time zones, although that will not impact the playing of the game).

Each hand the player must place exactly 5 cards into the Discard Group, which are the cards that he or she does not want to try to place into a Time Zone Group.

During each hand, the player will be creating six piles on the playing surface, with the pile furthest to the player's right being the Discard Group (and the player is hoping that each of the other five piles will become complete Time Zone Groups).

During the play of the game, the player turns face-up (i.e., looks at) one GeoPlunge card at a time, which card turned face-up is always the then top card in the deck.

The player does not turn the next GeoPlunge card face-up until the player plays (i.e., places into a pile) the GeoPlunge card he or she has just turned face-up. A player may not place more than 4 cards in any one pile during a hand, except that a player may place 5 cards in the pile that is the Discard Group. Once the player places a GeoPlunge card in a pile (which the player must do before turning the next GeoPlunge card face-up), the player cannot change which pile the player has placed the card.

Therefore, once the player places a card into one of the five piles that the player hopes will each become Time Zone Groups by the end of the hand, the player cannot move that card to a different one of those five piles nor can the player move that card into the Discard Group. Similarly, once a player places a card into the Discard Group, the player cannot move that card into one of the other piles that the player hopes will become one of the Time Zone Groups.

The hand ends when all 25 cards in the hand have been played.

Scoring:

A player wins a hand if the player has created 5 Time Zone Groups of four cards each during the hand, and at least one of the Time Zone Groups is a group of four cards that all have blue color coded borders at the top of the card, or a group of four cards that all have purple color coded borders at the top of the card.

A player wins the game if the player wins either hand during the game. A player obtains the "Ultimate Win" if the player wins both hands during the game.

(Note: In other embodiments of this game, a different number of groups are created, a different number of cards are place in each group, or the cards used are country cards (such as GeoPlunge country cards) in which instance the groups will be based on continents and not time zones).

GeoPlunge Junior Single Solo Power—1 Player

Playing the Game:

Both the GeoPlunge cards and the GeoPower cards are used in this game.

To play the game, a player plays 5 hands, one hand at a time. The GeoPlunge cards are not reshuffled between hands. The GeoPower cards are reshuffled after the second and fourth hands only.

For each hand, the player deals five GeoPlunge cards onto the table or other playing surface and five GeoPlunge cards to himself or herself, but the player initially does not look at any of the GeoPlunge cards dealt, except the top card dealt to the player and the top card dealt onto the table or other playing surface.

There are five tricks in each hand. As explained further below, each trick involves the playing of two GeoPlunge cards. One of the GeoPlunge cards played during a trick is the then top card of the cards not yet played that were dealt to the player for that hand (the "Next Player Card"). The other GeoPlunge card played during a trick is the then top card of the cards not yet played that were dealt onto the table or other playing surface for that hand (the "Next Table Card"). After GeoPlunge cards are played on a trick, they are not used for the remainder of the game.

For each trick, the player turns face up (i.e., looks at) the Next Player Card (the player cannot, at this time, look at any of the player's other cards that have not yet been played). The player then turns face up (i.e., looks at) the Next Table Card (the player cannot, at this time, look at any of the other cards that have been dealt onto the table or other playing surface that have not yet been played).

After looking at the Next Player Card and the Next Table Card, the player decides whether to exchange the Next Player Card for the Next Table Card.

If the player decides not to do an exchange (i.e., decides to keep the Next Player Card), that card becomes the "Selected Card" for that trick, and the Next Table Card becomes the "Unselected Card" for that trick.

If the player decides to do an exchange for the trick (i.e., decides to exchange the Next Player Card for the Next Table Card), the Next Table Card becomes the Selected Card for that trick, and the Next Player Card becomes the "Unselected Card" for that trick.

For each trick, once the player decides whether to do the exchange, the player should turn face up the then top card in the GeoPower card deck, which card is called the Control GeoPower card for that trick. (After a Control GeoPower card is used on a trick, it is placed at the bottom of the GeoPower card deck).

For each trick in which the Control GeoPower Card says:
1. Size, the two GeoPlunge cards played on that trick (i.e., the Selected Card and the Unselected Card for that trick) are ranked based on the size of the state, with Alaska as the highest ranking card;
2. Statehood, the two GeoPlunge cards played on that trick are ranked based on their date of entry into the union, with Delaware as the highest ranking card; or
3. Population, the two GeoPlunge cards played on that trick are ranked based on the population of the state, with California as the highest ranking card.

For each trick in which the Selected Card has a higher ranking than the Unselected Card, the player wins the trick.

For each trick in which the Unselected Card has a higher ranking than the Selected Card, the player loses the trick.

Scoring:

For each hand in which the player wins all 5 of the tricks, the player receives 15 points.

For each hand in which the player wins 4 of the tricks, the player receives 10 points.

The player must have at least 50 points at the end of the game to win.

If a player has at least 60 points at the end of the game, a player obtains a "Super Win."

If a player has 75 points at the end of the game, that player obtains the "Ultimate Win."

(Note: In other embodiments of this game, a different number of cards may be played or dealt, or the cards used are country cards (such as GeoPlunge country cards), in which instance the rankings may be based on size, independence, population, time zone and life expectancy).

GeoPlunge Junior Time Zone Match—1 Player

Playing the Game:

Only the GeoPlunge cards are used in this game. They are shuffled before the game begins.

To play the game, a player plays 4 hands, one hand at a time. The GeoPlunge cards are not reshuffled between hands.

The cards dealt to the player each hand will be referred to as the "Player Cards" and the cards dealt onto the table (or other playing surface) each hand will be referred to as the "Table Cards."

For each of the first three hands, the player deals 5 Table Cards and 7 Player Cards. For the fourth and final hand the player once again deals 5 Table Cards. This time, however, the player deals the remaining GeoPlunge cards in the deck (i.e., 9 GeoPlunge cards) to the player. Therefore, for the last hand there are 5 Table Cards and 9 Player Cards.

After the player deals out the cards for a hand, the player may look at all of the Player Cards for that hand. The player may not look at the Table Cards for a hand at that time.

For each hand, 5 tricks are played during the hand.

On each trick, the player turns face up (i.e., looks at) the then top card on the table (or other playing surface) out of the remaining (i.e., yet to be played) Table Cards dealt on that hand (the "Then Top Table Card"). A player may not turn face up a Table Card during a hand until it is time to play that Table Card (i.e., until it becomes the then top card dealt to the table or other playing surface that has yet to be played on that hand). Once a Table Card is played during a hand, it is not used again during the game.

For each trick, after the player turns face up the Then Top Table Card, the player determines whether he or she can discard any of his or her "Active Player Cards." Active Player Cards are all Player Cards that have already been dealt to the player that have not been discarded on an earlier trick either in that hand or an earlier hand.

If none of the Active Player Cards have the same color coded border at the top of the card as the color coded border at the top of the Then Top Table Card state played during a trick, the player cannot discard any Active Player Cards on that trick. (The color coded border at the top of the GeoPlunge cards is red for eastern time zone states, green for central time zone states, blue for mountain time zone states and purple for Alaska, Hawaii and pacific time zone states (referred to as the pacific/other time zone for purposes of this game). For purposes of playing this game, if a state is located in two time zones, the state is considered to be in, and the color coded border reflects, the time zone most of the state is located in. (The portion of the state not in that time zone is shaded a different color in the state's picture near the bottom of the card so that the player is aware that the state is in two time zones, although that will not impact the playing of the game)).

If during a trick exactly one of the Active Player Cards has the same color coded border at the top of the card as the color coded border at the top of the Then Top Table Card state played during a trick (a "Time Zone Matching Card"), the player can discard only the Time Zone Matching Card on that trick.

If exactly two of the Active Player Cards are Time Zone Matching Cards for a trick, on that trick the player can discard both of the Time Zone Matching Cards as well as one other Active Player Card then in the player's hand (if the player has any other Active Player Cards remaining in the player's hand at that time), which other Active Player Card discarded is determined by the player at his or her sole discretion.

If three or more of the Active Player Cards are Time Zone Matching Cards for a trick, on that trick the player can discard two of the Time Zone Matching Cards (and the player can determine which two to discard at his or her sole discretion) as well as one other Active Player Card then in the player's hand (if the player has any other Active Player Cards remaining in the player's hand at that time), which other Active Player Card discarded is determined by the player at his or her sole discretion.

If during the first, second or third hand, a player is able to discard all of his or her Active Player Cards while there is at least one Table Card dealt on that hand which has not yet been played, the player is permitted to deal himself or herself the Player Cards for the next hand at that time (i.e., ahead of schedule). For example, if during the first hand the player has no Active Player Cards remaining, and yet there are still two Table Cards dealt in the first hand that have not yet been played, the player may at that time deal himself or herself the 7 Player Cards that the player will attempt to discard during the second hand (and can now also be discarded during the remainder of the first hand, if the player has an opportunity to do so).

If during the first, second or third hand, a player is not able to discard all of his or her Active Player Cards by the time that all of the Table Cards are played for that hand, the Active Player Cards that have not yet been discarded remain Active Player Cards, and the player can still attempt to discard them during remaining hands of the game.

Except where a player has already been dealt his or her Player Cards for a hand ahead of schedule (see above), under all other circumstances (including those discussed in the previous paragraph), the player is dealt his or her new Player Cards for a hand at the beginning of the hand (i.e., when the new Table Cards are dealt for a hand).

Scoring:

To win the game, the player must have 2 or fewer Active Player Cards at the end of the game. If the player has 3 Active Player Cards at the end of the game, the player is considered to have tied (rather than lost).

If a player has 1 Active Player Card at the end of the game, the player obtains a "Super Win."

If a player has no Active Player Cards at the end of the game, the player obtains the "Ultimate Win."

(Note: In other embodiments of this game, a different number of cards may be discarded, or the cards used are country cards (such as GeoPlunge country cards) in which instance the right to discard will be based on matching continents and not matching time zones).

GeoPlunge Junior Match and Series Games

GeoPlunge Junior Match Game—2 to 6 Players

This game may be played with 2, 3, 4, 5 or 6 players. In addition, this game may also be played with two teams of 2 or 3 players each (in which case teammates sit across from each other, not next to each other). Only the GeoPlunge cards are used in this game, and the GeoPlunge cards are reshuffled after every hand.

Playing the Game:

This game is played one hand at a time. The youngest player is the dealer for the first hand. Thereafter, whichever player wins the hand is the dealer for the next hand.

Each hand, each player is dealt a certain number of cards, and a certain number of tricks are played during the hand. In one embodiment 5 cards are dealt and five tricks are played each hand.

A trick consists of each player, in clockwise order, one at a time, playing (i.e., placing onto the table or other playing surface) one of his or her GeoPlunge cards.

For each hand, on the first trick the dealer is the first person to play a card (this is called leading). Thereafter, whoever wins a trick leads on the next trick. For each trick, each player can play any card then remaining in his or her hand (a player cannot play any card he or she has already played on a prior trick).

The player that leads on a trick will win the trick only if none of the other players play a card on that trick in which the color coded border at the top of the card played is the same color as the color coded border at the top of the card led on that trick. (The color coded border at the top of the GeoPlunge cards is red for eastern time zone states, green for central time zone states, blue for mountain time zone states and purple for Alaska, Hawaii and pacific time zone states (referred to as the pacific/other time zone for purposes of this game). For purposes of playing this game, if a state is located in two time zones, the state is considered to be in, and the color coded border reflects, the time zone most of the state is located in. (The portion of the state not in that time zone is shaded a different color in the state's picture near the bottom of the card so that the player is aware that the state is in two time zones, although that will not impact the playing of the game)).

If only one player, who did not lead on the trick, plays a card on the trick in which the color coded border at the top of the card played is the same color as the color coded border at the top of the card led, that player wins the trick. If two or more players play such a card on the trick, the last player to play such a card on the trick wins the trick.

The player that wins the most tricks during the hand wins the hand. If two or more players tie for the most tricks won during a hand, the player that took the last trick among the players that tied, wins the hand.

Scoring:

The player that wins the hand receives 10 points.

Where there are only two players, if one player wins 4 of the tricks during a hand, that player is considered to have a "super win" for that hand. Where there are three or more players (except where the game is played with teams), if one player wins at least 3 tricks during the hand, that player is considered to have a "super win" for that hand. If a player has a "super win" for a hand, that player receives 10 bonus points (i.e., 20 points total).

If one player wins all of the tricks during the hand, that player is considered to have the "ultimate win" for that hand. If a player has the "ultimate win" for a hand, that player receives 30 bonus points (i.e., 40 points total).

The first player to reach 50 points wins the game.

If the game is played with two teams, the scoring is the same as above, except that it applies to the team rather than the individual. For example, whichever team wins the most tricks wins the hand and gets 10 points, and if one team has a super win (i.e., wins 4 tricks) or the ultimate win for a hand (i.e., wins all of the tricks) that team receives bonus points in the same amounts indicated above. The tricks won by a team equals the sum of the tricks won by each player on the team. The first team to reach 50 points wins the game.

(Note: In other embodiments, country cards are used (such as the GeoPlunge country cards) and in such games matching is based on continents instead of time zones) but otherwise the principles of the game remain the same).

GeoPlunge Junior Series Game—2 to 4 Players

This game may be played with 2, 3, or 4 players. Only the GeoPlunge cards are used in this game, and the GeoPlunge cards are reshuffled after every hand.

Playing the Game:

For each hand, the player to the dealer's immediate left is dealt a certain number of cards (e.g., 6 cards) and each of the other players, including the dealer, receives one less card (e.g., 5 cards).

Where there are 2 players, the play of the hand begins with the non-dealer discarding a card from his or her hand face up. The dealer then either selects the card discarded or the next card in the deck. After taking the discarded card or the next card in the deck, the dealer discards a card from his or her hand face up. Except as described below, until one of the players wins the hand, each player in turn will continue to either take the card discarded by the other player or pick the next card in the deck, and then discard a card from his or her hand (the card the player then discards from his or her hand can be, if the player wishes, the card the player just picked from the deck). (Also, a player may not look at the next card in the deck until and unless the player selects that card).

Where there are 3 or 4 players, play begins with the player to the immediate left of the dealer discarding a card face up, and play proceeds in clockwise order with each player in turn then either selecting the card discarded by the player to his or her right (except as described below) or selecting the next card in the deck, and then discarding a card from his or her hand.

During each hand, each player is permitted to twice discard cards face down, but a player cannot do so the first time he or she discards a card during a hand (the cards a player decides to discard face down are called "Untouchable" cards for that hand). When an Untouchable card is discarded, the player whose turn it is to select is not allowed to choose or look at that card and must take the next card from the deck. If no player has won the hand after all of the cards have been taken, the discarded cards other than the Untouchable cards are reshuffled and play is then continued. (The players may, if they agree, vary the games so that there are no Untouchable cards, 1 Untouchable Card, or more than 2 Untouchable Cards, and if they wish the players may also vary the games so that an Untouchable Card could be played the first time a player plays a card).

To win a hand, a player must be the first player to have a "3 Time Zone Group" and a 2 Time Zone Group" (as each are defined below).

A "3 Time Zone Group" is a group of three cards that all have the same color coded border at the top of the card. The color coded border at the top of the GeoPlunge cards is red for eastern time zone states, green for central time zone states, blue for mountain time zone states and purple for Alaska, Hawaii and pacific time zone states (referred to as the pacific/other time zone for purposes of this game). For purposes of playing this game, if a state is located in two time zones, the state is considered to be in, and the color coded border reflects, the time zone most of the state is located in. (The portion of the state not in that time zone is shaded a different color in the state's picture near the bottom of the card so that the player is aware that the state is in two time zones, although that will not impact the playing of the game)).

A "2 Time Zone Group" is a group of two cards that both have the same color coded border at the top of the card.

To win a hand, a player must not only have a 3 Time Zone Group and a 2 Time Zone Group but in addition (1) the color coded border at the top of each of the cards in the 3 Time Zone Group must be different than the color coded border of each of the cards in the 2 Time Zone Group; and (2) at least one of the two groups must have color coded borders that are all blue or that are all purple.

Scoring:

The player that wins the hand receives 10 points.

If the 3 Time Zone Group for the player that wins the hand all have purple color borders, the player receives 10 bonus points (i.e., 20 points total for the hand).

If the 3 Time Zone Group for the player that wins the hand all have blue color borders, the player receives 5 bonus points (i.e., 15 points total for the hand).

The first player to reach 50 points wins the game.

(Note: In other embodiments, country cards are used (such as the GeoPlunge country cards) and in such games the groups are based on continents (instead of time zones) but otherwise the principles of the game remain the same. In other embodiments, the number of groups and group sizes vary, but in each embodiment the groups are all geography-related groups of cards that have certain geographical facts in common).

GeoPlunge Challenge Match Games

General Rules to GeoPlunge Challenge Match Games

There are many GeoPlunge Challenge Match games, including the following three variations: GeoChallenge Match Borders, GeoChallenge Match SSP, and GeoChallenge Match Capitals. The GeoPlunge cards and the GeoChallenge cards are used.

The games are played one round at a time. To determine who is the dealer for the first round of the game, each player, without looking, draws a card from the GeoPlunge card deck and whoever draws the highest ranking statehood card among the cards drawn (Delaware has the highest statehood ranking) is the dealer. Thereafter, whoever wins the prior round is the dealer for the next round.

Each round, each player is dealt a certain number of GeoPlunge cards (in one embodiment, each player is dealt 10 GeoPlunge cards). There are two phases to each round.

The first phase of a round begins with each player, after looking at his or cards, placing two cards dealt to that player to the side face down and designating those cards as Card 1 and Card 2 for that player. During the first phase of the round, each player tries to guess the states of the other player's Card 1 and Card 2, as follows.

The non-dealer first tries to guess the state of the dealer's Card 1, and then the dealer tries to guess the state of the non-dealer's Card 1. Next, the non-dealer tries to guess the state of the dealer's Card 2, and then the dealer tries to guess the state of the non-dealer's Card 2.

The players each receive one clue about the card that they are trying to guess the state of, and that clue is determined by the then top card in the GeoChallenge card deck. After a GeoChallenge card is used to help make a guess, it is placed at the bottom of the GeoChallenge card deck.

The player whose turn it is to guess selects the then top card in the GeoChallenge deck. That player then reads the GeoChallenge card. Some GeoChallenge cards indicate exactly what clue is to be given, other cards give the guesser some option as to what clue to receive, and others give the clue-giver (referred to as the "Opponent" in the GeoChallenge cards) some option as to what clue to give.

The first time a player gives a clue about one of his or her cards, the player must give the clue about that player's Card 1, and the clue will be based on the GeoChallenge card selected by the guesser at that time. The second time a player gives a clue about one of his or her cards, the player must give the clue about that player's Card 2, and the clue will be based on the GeoChallenge card selected by the guesser at that time.

Each player may make only one guess as to the other player's Card 1, and later each player may make only one guess as to the other player's Card 2.

If a player does not correctly guess the other player's Card 1, the other player gives the guesser that other player's Card 1. In that event, that other player's Card 1 is now part of the guessing player's hand.

If a player does not correctly guess the other player's Card 2, the other player gives the guesser that other player's Card 2. In that event, that other player's Card 2 is now part of the guessing player's hand.

Therefore, after all of the guessing occurs, some cards will have changed hands (going from one player to the other) if there were any incorrect guesses, and each player might not have the same amount of cards. Once all of the guessing and exchanging of cards (if any exchanging is necessary) described above occurs, phase 1 is completed for that round. (Note: In some embodiments, the players may guess at less than 2 or more than 2 cards, and in some embodiments, the players will not have a choice as to which cards of theirs will be guessed at by their opponents).

Phase 2 of each round begins with the player who has more cards to begin that round leading (i.e., playing a GeoPlunge card first). If both players have the same number of GeoPlunge cards, the non-dealer leads to begin phase 2 of the round. A player plays a card by placing it face up on the table or other playing surface.

Phase 2 consists of a certain amount of tricks, and ends when one player does not have any cards remaining (i.e., has played all of his or her cards). Each trick consists of one player leading a card and the other player playing cards that he or she is permitted to play on that trick, if the player is even permitted to play any cards on that trick.

Once a GeoPlunge card is played by a player, that card is no longer part of the player's hand for that round.

GeoPlunge Challenge Match Borders: 2 Players

Playing the Game:

After the player whose turn it is to lead on a trick leads a card, if the other player does not have any cards that are border states of the card led, the other player is not permitted to play a card (and is considered to have lost that trick).

After the player whose turn it is to lead on a trick leads a card, if the other player has one or more cards that are border states of the card led, the other player may play all of those cards that are border states of the card led at that time plus one additional card from his or her hand of his or her choosing (and is considered to have won that trick).

Whoever loses a trick, must lead (throw the first card) on the next trick. The first player to have played all of his or her cards on a round, wins the round.

Scoring:

The winner of each round receives 10 points, except that if the other player still has at least 5 cards in his or her hand when the winner of the round has no cards remaining, the winner of the round receives 10 bonus points (i.e., 20 points total).

The first player to reach 50 points wins the game.

GeoPlunge Challenge Match SSP: 2 Players

Playing the Game:

After the player whose turn it is to lead on a trick leads a card, if the other player does not have any cards that are one higher or one lower in size, statehood or population than the card led, the other player is not permitted to play a card (and is considered to have lost that trick).

After the player whose turn it is to lead on a trick leads a card, if the other player has one or more cards that are one higher or one lower in size, statehood or population than the card led, the other player may play all of those cards that are one higher or one lower in size, statehood or population than the card led at that time plus one additional card from his or her hand of his or her choosing (and is considered to have won that trick).

Whoever loses a trick, must lead (throw the first card) on the next trick. The first player to have played all of his or her cards on a round, wins the round.

Scoring:

The winner of each round receives 10 points, except that if the other player still has at least 5 cards in his or her hand when the winner of the round has no cards remaining, the winner of the round receives 10 bonus points (i.e., 20 points total).

The first player to reach 50 points wins the game.

GeoPlunge Challenge Match Capitals: 2 Players

Playing the Game:

After the player whose turn it is to lead on a trick leads a card, if the other player does not have any cards that have state capitals that begin with the same first letter as the state capital of the card led, the other player is not permitted to play a card (and is considered to have lost that trick).

After the player whose turn it is to lead on a trick leads a card, if the other player has one or more cards that have state capitals that begin with the same first letter as the state capital of the card led, the other player may play all of those cards that have state capitals that begin with the same first letter as the state capital of the card led at that time plus one additional card from his or her hand of his or her choosing (and is considered to have won that trick).

Whoever loses a trick, must lead (throw the first card) on the next trick. The first player to have played all of his or her cards on a round, wins the round.

Scoring:

The winner of each round receives 10 points, except that if the other player still has at least 5 cards in his or her hand when the winner of the round has no cards remaining, the winner of the round receives 10 bonus points (i.e., 20 points total).

The first player to reach 50 points wins the game.

(Note: There are also embodiments of the GeoPlunge Challenge Match games in which country cards (such as GeoPlunge country cards) are used and in those games, instead of border states, there are border countries, and the rankings relate to size, independence, population, time zones and life expectancy). GeoPlunge EST Games There are many GeoPlunge EST Games, including the following: GeoPlunge EST Borders; GeoPlunge EST SSP, GeoPlunge EST Total, and GeoPlunge EST 51. These games are played with 2, 3 or 4 players. GeoPlunge EST games differ from other GeoPlunge games in that all of the players are on the same team in the GeoPlunge EST games. In each of these games, players are not permitted to talk to each other during the game or otherwise communicate to other players what cards they have. (Note: In other embodiments of these games, players may receive different numbers of cards, and in some embodiments they may use country cards (such as GeoPlunge country cards) in which the borders will relate to border countries, and the rankings will relate to those rankings on the country cards.

GeoPlunge EST Borders—2 to 4 Players

Playing the Game:

A game consists of 3 rounds, played one round at a time. Each round, each player is dealt 14 cards (if there are two players playing), 12 cards (if there are 3 players playing) and 10 cards (if there are 4 players playing). The GeoPlunge cards are reshuffled after each round.

The players decide which player will lead (i.e., play the first card) on the round (and can communicate for this limited purpose only). Thereafter, each player, in clockwise order, plays (i.e., places face up onto the table or other playing surface) one of his or her GeoPlunge cards, and this continues until each player has played each of his or her GeoPlunge cards dealt to that player on that round. Under no circumstances may a player skip his or her turn to play a card, nor may a player play two or more cards at a time (i.e., after one player plays a card each other player must play a card in clockwise order before that first player plays another card).

The players seek to obtain significant "Border Streaks" during the round.

A "Border Streak" is measured by the number of consecutive cards thrown in which the card thrown is a border state of the immediately preceding card thrown. Therefore, for example, if there are three players, and the second player throws a card that borders the state led by the first player, and the third player throws a card that borders the state of the card played by the second player, and the first player then throws a card that borders the state of the card thrown by the third player, the players have obtained a "4 Border Streak."

Scoring:

A Border Streak of 8 cards or more is worth 3 points for every card in the streak (e.g., an 11 Border Streak is worth 33 points).

A Border Streak of 5, 6 or 7 cards is worth 2 points for every card in the streak.

A 3 Border Streak or 4 Border Streak is worth 1 point for every card in the streak.

The players must have at least 50 points by the end of the game to win.

If the players have at least 70 points by the end of the game, they obtain a "Super Win."

If the players have at least 100 points by the end of the game, they obtain the "Ultimate Win."

GeoPlunge EST SSP—2 to 4 Players

Playing the Game:

A game consists of 3 rounds, played one round at a time. Each round, each player is dealt 14 cards (if there are two players playing), 12 cards (if there are 3 players playing) and 10 cards (if there are 4 players playing). The GeoPlunge cards are reshuffled after each round.

The players decide which player will lead (i.e., play the first card) on the round (and can communicate for this limited purpose only). Thereafter, each player, in clockwise order, plays (i.e., places face up onto the table or other playing surface) one of his or her GeoPlunge cards, and this continues until each player has played each of his or her GeoPlunge cards dealt to that player on that round. Under no circumstances may a player skip his or her turn to play a card, nor may a player play two or more cards at a time (i.e., after one player plays a card each other player must play a card in clockwise order before that first player plays another card).

The players seek to obtain significant "SSP Streaks" during the round.

An "SSP Streak" is measured by the number of consecutive cards thrown in which the card thrown is one lower or one higher in Size, Statehood or Population than the immediately preceding card thrown. Therefore, for example, if there are three players, and the second player throws a card that is one lower or one higher in Size, Statehood or Population than the state led by the first player, and the third player throws a card that is one lower or one higher in Size, Statehood or Population than the state of the card played by the second player, and the first player then throws a card that is one lower or one higher in Size, Statehood or Population than the state of the card thrown by the third player, the players have obtained a "4 SSP Streak."

Scoring:

An SSP Streak of 8 cards or more is worth 3 points for every card in the streak (e.g., an 11 SSP Streak is worth 33 points).

An SSP Streak of 5, 6 or 7 cards is worth 2 points for every card in the streak.

A 3 SSP Streak or 4 SSP Streak is worth 1 point for every card in the streak.

The players must have at least 50 points by the end of the game to win.

If the players have at least 70 points by the end of the game, they obtain a "Super Win."

If the players have at least 100 points by the end of the game, they obtain the "Ultimate Win."

GeoPlunge EST Total—2 to 4 Players

Playing the Game:

A game consists of 2 rounds, played one round at a time. Each round, each player is dealt 14 cards (if there are two players playing), 12 cards (if there are 3 players playing) and 10 cards (if there are 4 players playing). The GeoPlunge cards are reshuffled after each round.

The players decide which player will lead (i.e., play the first card) on the round (and can communicate for this limited purpose only). Thereafter, each player, in clockwise order, plays (i.e., places face up onto the table or other playing surface) one of his or her GeoPlunge cards, and this continues until each player has played each of his or her GeoPlunge cards dealt to that player on that round. Under no circumstances may a player skip his or her turn to play a card, nor may a player play two or more cards at a time (i.e., after one player plays a card each other player must play a card in clockwise order before that first player plays another card).

The players seek to obtain significant "Total Streaks" during the round.

A "Total Streak" is measured by the number of consecutive cards thrown in which the card thrown is a "Matching Card" of the immediately preceding card thrown. Two cards are Matching Cards of each other for purposes of this game if any of the following are true: (1) the cards are border states of each other; (2) one of the card's Size, Statehood, or Population rankings is one lower or one higher than the other card's ranking in the same category; or (3) for both of the states, the state capital begins with the same first letter (e.g., Texas and New York, because the state capitals each begin with the letter "A"). Therefore, for example, if there are three players, and the second player throws a card that is a Matching Card of the card led by the first player, and the third player throws a card that is a Matching Card of the card played by the second player, and the first player then throws a card that is a Matching Card of the card thrown by the third player, the players have obtained a "4 Total Streak."

Scoring:

A Total Streak of 12 cards or more is worth 3 points for every card in the streak (e.g., a 14 Total Streak is worth 42 points).

A Total Streak of 8, 9, 10, or 11 cards is worth 2 points for every card in the streak (e.g., an 11 Total Streak is worth 22 points).

A Total Streak of 5, 6, or 7 cards is worth 1 point for every card in the streak.

The players must have at least 50 points by the end of the game to win.

If the players have at least 70 points by the end of the game, they obtain a "Super Win."

If the players have at least 100 points by the end of the game, they obtain the "Ultimate Win."

GeoPlunge EST 51 —2 to 4 Players

Playing the Game:

A game consists of one round. Each player is dealt 14 cards (if there are two players playing), 12 cards (if there are 3 players playing) and 10 cards (if there are 4 players playing).

The players decide which player will lead (i.e., play the first card) (and can communicate for this limited purpose only). Thereafter, each player, in clockwise order, plays (i.e., places face up onto the table or other playing surface) one of his or her GeoPlunge cards, and this continues until each player has played each of his or her GeoPlunge cards dealt to that player. Under no circumstances may a player skip his or her turn to play a card, nor may a player play two or more cards at a time (i.e., after one player plays a card each other player must play a card in clockwise order before that first player plays another card).

The player leading plays one of his or her cards onto the table (or other playing surface) to create the beginning of the first pile. Thereafter, for the remainder of the game, the player whose turn it is to play a card may either (1) place his or her card into the pile in which the prior player's card was just thrown, or (2) create a new pile and place his or her card into that new pile. (Therefore, once a new pile is created, thereafter a player may not play his or her card into a pile that was created prior to the creation of that new pile).

The players seek to obtain "Fifty One's" during the round. A Fifty One is obtained where (1) the sum of the Size rankings of all of the cards in a pile equals exactly 51; or (2) the sum of the Statehood rankings of all of the cards in a pile equals exactly 51; or (3) the sum of the Population rankings of all of the cards in a pile equals exactly 51.

Where there are two Fifty One's in a single pile during a round that is called a "Double Fifty One".

Where there are three Fifty One's in a single pile during a round that is called a "Triple Fifty One".

After a pile has a Fifty One, the next player playing can, but is not required to, still play his or her card into that pile to seek to create a Double Fifty One or a Triple Fifty One.

Scoring:

A Fifty One is worth 5 points.

A Double Fifty One is worth 10 bonus points (this is in addition to the 5 points previously received for the Fifty One for the same pile).

A Triple Fifty One is worth 15 bonus points (this is in addition to the 5 points previously received for the Fifty One for the same pile, and the 10 points previously received for the Double Fifty One for the same pile).

The players must have at least 50 points by the end of the game to win.

If the players have at least 70 points by the end of the game, they obtain a "Super Win."

If the players have at least 100 points by the end of the game, they obtain the "Ultimate Win."

GeoPlunge Solo Crunch Games

General Rules to GeoPlunge Solo Crunch Games

There are many GeoPlunge Solo Crunch games, including the following:

GeoPlunge Solo Border Capital Crunch SV, GeoPlunge Solo Border Capital Crunch LV, GeoPlunge Solo SSP Capital Crunch SV, and GeoPlunge Solo SSP Capital Crunch LV. Only the GeoPlunge cards are used in these games. (Note:

Other embodiments of these games permit the player to reduce the number of piles in other or different ways, including where the Matching Cards that are three piles apart. Other embodiments of these games include versions in which country cards (such as GeoPlunge country cards) are used).

GeoPlunge Solo Border Capital Crunch SV—1 Player

Playing the Game:

During this game, the player turns face up (i.e., looks at) one GeoPlunge card at a time, which card turned face up is always the then top card in the deck. The game ends when the player has turned face up, and played (as described below), every card in the GeoPlunge deck.

During this game, the player does not turn the next GeoPlunge card face up until the player plays (as described below) the GeoPlunge card he or she has just turned face up.

The player plays a card by placing it into a pile. (Once a player places a card in a pile the player cannot change his or her decision as to which pile to place that card). In addition, if the player can then as a result of placing that card in a pile, reduce the number of piles according to the rules of this game (i.e., combine piles), the player may do so before playing the next card.

The player plays the first card in the deck by placing it onto the table or other playing surface, creating the beginning of the first pile.

For each card thereafter, if the card then played (the "Currently Played Card") is not a Matching Card (as described below) of the top card in any pile (i.e., the card that is at the top of that pile), the player creates a new pile to the right of each of the already existing piles and puts the Currently Played Card in that new pile.

If the Currently Played Card is a Matching Card (as described below) of the top card in exactly one of the existing piles (a "Matching Pile"), the player should place the Currently Played Card at the top of the Matching Pile.

If a Currently Played Card is a Matching Card (as described below) of the top cards in two or more of the existing piles (each such pile a "Matching Pile"), the player may place the Currently Played Card at the top of one of the Matching Piles, and the player may decide at his or her discretion which Matching Pile to place the Currently Played Card.

There are two ways a player may be able to reduce the number of piles after the player plays a Currently Played Card into a Matching Pile and before the player plays the next card. First, if as a result of a player placing a Currently Played Card into a Matching Pile (or if as a result of a player taking the actions permitted in the next paragraph below), the top card in two "Immediately Adjacent Piles" (defined below) are Matching Cards, with regard to those two Immediately Adjacent Piles, the player can combine those two piles into one pile by placing the pile on the right on top of the pile on the left. If by doing so, this creates other Immediately Adjacent Piles in which the top cards in each of those two piles are Matching Cards, the player can combine the new Immediately Adjacent Piles in the same manner as that described above, and so on. Before the player plays each card, there must not be any Immediately Adjacent Piles in which the top cards in those two piles are Matching Cards. Immediately Adjacent Piles are piles that are next to each other, with no piles in between them.

Second, if as a result of a player placing a Currently Played Card into a Matching Pile (or reducing the number of piles through combining Immediately Adjacent Piles as permitted in the prior paragraph), the top cards in two piles are Matching Cards, and each of those two top cards have the same color coded border at the top of the card, the player may combine those two piles by placing the pile on the right on top of the pile on the left. If by doing so, this creates two other piles in which the top cards in each of the two piles are Matching Cards and those same two top cards have the same color coded border at the top of the card, the player can combine those two piles in the same manner as that described above, and so on. Before the player plays each card, there must not be any two piles in which the top cards in those two piles are Matching Cards and those same top two cards have the same color coded border at the top of the card.

Therefore, to summarize, a player can combine two piles (by placing the pile on the right on top of the pile on the left), if the top cards in each of the two piles are Matching Cards and at least one the following is also true: (i) the two piles are Immediately Adjacent Piles, or (ii) the Matching Cards at the top of each pile have the same color coded border at the top of the cards.

The color coded border at the top of the GeoPlunge cards is red for eastern time zone states, green for central time zone states, blue for mountain time zone states purple for Alaska, Hawaii and pacific time zone states (referred to as the pacific/other time zone for purposes of this game). For purposes of playing this game, if a state is located in two time zones, the state is considered to be in, and the color coded border reflects, the time zone most of the state is located in. (The portion of the state not in that time zone is shaded a different color in the state's picture near the bottom of the card so that the player is aware that the state is in two time zones, although that will not impact the playing of the game).

Two cards are Matching Cards of each other for purposes of this game only if any of the following are true: (1) the cards are border states of each other (e.g., Maryland and Virginia); (2) each card has at least one border state in common (e.g., Florida and South Carolina, because they both border Georgia); or (3) for both of the states, the state capital begins with the same first letter (e.g., Texas and New York, because the state capitals each begin with the letter "A").

Scoring:

If the player has three piles or fewer at the end of one of the game, the player wins the game.

If the player has two piles at the end of the game, the player obtains a "Super Win."

If the player has one pile at the end of the game, the player obtains the "Ultimate Win."

GeoPlunge Solo Border Capital Crunch LV—1 Player

All of the rules for playing the game of GeoPlunge Solo Border Capital Crunch SV apply, except that in GeoPlunge Solo Border Capital Crunch LV there are three rounds played, with each round being the equivalent of a full game of GeoPlunge Solo Border Capital SV. The GeoPlunge cards are shuffled in between rounds.

Scoring:

For any round in which the player has 3 piles remaining at the end of the round, the player receives 15 points.

For any round in which the player has 2 piles remaining at the end of the round, the player receives 25 points.

For any round in which the player has 1 pile remaining at the end of the round, the player receives 40 points.

The player wins the game if the player has at least 50 points at the end of the game.

The player obtains a "Super Win" if the player has at least 75 points at the end of the game.

The player obtains the "Ultimate Win" if the player has 120 points at the end of the game.

GeoPlunge Solo SSP Capital Crunch SV—1 Player

All of the rules for scoring for GeoPlunge Solo Border Capital Crunch SV apply. All of the rules for playing the game of GeoPlunge Solo Border Capital Crunch SV apply, except as follows:

In GeoPlunge Solo SSP Capital Crunch SV, two cards are Matching Cards of each other for purposes of this game only if either of the following are true: (1) the cards have at least one "Close Ranking" (as defined below); or (2) for both of the states, the state capital begins with the same first letter (e.g., Texas and New York, because the state capitals each begin with the letter "A").

Two cards have a Close Ranking if at least one of the following is true: (i) the cards' rankings in Size differ by no more than two (e.g., Alaska and California, which are ranked $1^{st}$ and $3^{rd}$ in size); (ii) the cards' rankings in Statehood differ by no more than two (e.g., Arizona and Hawaii, which are ranked $48^{th}$ and $50^{th}$ in statehood); or (iii) the cards' rankings in Population differ by no more than two (e.g., California and Texas, which are ranked $1^{st}$ and $2^{nd}$ in population).

GeoPlunge Solo SSP Capital Crunch LV—1 Player

All of the rules for playing the game of GeoPlunge Solo SSP Capital Crunch SV apply, except that in GeoPlunge Solo SSP Capital Crunch LV there are three rounds played, with each round being the equivalent of a full game of GeoPlunge Solo SSP Capital Crunch SV. The GeoPlunge cards are shuffled in between rounds.

Scoring:

For any round in which the player has 3 piles remaining at the end of the round, the player receives 15 points.

For any round in which the player has 2 piles remaining at the end of the round, the player receives 25 points.

For any round in which the player has 1 pile remaining at the end of the round, the player receives 40 points.

The player wins the game if the player has at least 50 points at the end of the game.

The player obtains a "Super Win" if the player has at least 75 points at the end of the game.

The player obtains the "Ultimate Win" if the player has 120 points at the end of the game.

GeoPlunge Solo Match Games

General Rules to GeoPlunge Solo Match Games

There are many GeoPlunge Solo Match games, including the following: GeoPlunge Solo Border Match SV; GeoPlunge Solo Border Match LV; GeoPlunge Solo Border Capital Match SV; GeoPlunge Solo Border Capital Match LV; GeoPlunge Solo SSP Capital Match SV; and GeoPlunge Solo SSP Capital Match LV. These games are played with one player. Only the GeoPlunge cards are used in these games. (Note: In other embodiments of these games, the number of cards dealt to the player and the table are different, and the number of cards a player is permitted to discard is different, from the exemplary versions described below. Also, in some embodiments, country cards (such as GeoPlunge country cards) are used, and in those games border countries, and rankings used with those types of cards are used.

GeoPlunge Solo Border Match SV—1 Player

Playing the Game:

To play the game, a player plays 3 hands, one hand at a time. The GeoPlunge cards are not reshuffled between hands.

The cards dealt to the player each hand will be referred to as the "Player Cards" and the cards dealt onto the table (or other playing surface) each hand will be referred to as the "Table Cards."

For each of the first two hands, the player deals 10 Player Cards and 10 Table Cards, and for the third hand the player deals 5 Player Cards and 5 Table Cards.

After the player deals the cards for a hand, the player may look at all of the Player Cards for that hand. The player may not look at the Table Cards for a hand at that time.

For each of the first two hands, 10 tricks are played during the hand. For the third hand, 5 tricks are played during the hand.

On each trick, the player turns face up (i.e., looks at) the then top card on the table (or other playing surface) out of the remaining (i.e., yet to be played) Table Cards dealt on that hand (the "Then Top Table Card"). A player may not turn face up a Table Card during a hand until it is time to play that Table Card (i.e., until it becomes the then top card dealt to the table or other playing surface that has yet to be played on that hand). Once a Table Card is played during a hand, it is not used again during the game.

For each trick, after the player turns face up the Then Top Table Card, the player determines whether he or she can discard any of his or her Active Player Cards. Active Player Cards are all Player Cards that have already been dealt to the player that have not been discarded on an earlier trick either in that hand or an earlier hand. Where the rules permit a player to discard one or more Active Player Cards, a player is permitted, but not required, to do so.

If none of the Active Player Cards are border states of the Then Top Table Card state played during a trick, the player cannot discard any Active Player Cards on that trick.

If exactly one of the Active Player Cards is a border state of the Then Top Table Card state played during a trick (a "Border Matching Card"), the player can discard only the Border Matching Card.

If exactly two of the Active Player Cards are Border Matching Cards for a trick, the player can discard both of the Border Matching Cards as well as one other Active Player Card, which other Active Player Card discarded is determined by the player at his or her sole discretion.

If three or more of the Active Player Cards are Border Matching Cards for a trick (except as provided in no. 12 below), the player can discard two of the Border Matching Cards (and the player can determine which two to discard at his or her sole discretion) as well as one other Active Player Card then in the player's hand, which other Active Player Card discarded is determined by the player at his or her sole discretion.

If three or more of the Active Player Cards are Border Matching Cards for a trick, and those Border Matching Cards constitute all of the border states of the Then Top Table Card state played during a trick, the player can discard all of the Border Matching Cards as well as three other Active Player Cards, which three other Active Player Cards discarded are determined by the player at his or her sole discretion. For example, if a state with four border states is the Then Top Table Card played during a trick, and all four of that state's border states are Active Player Cards, a player can discard all four of those Border Matching Cards plus three additional Active Player Cards.

If during the first or second hand, a player is able to discard all of his or her Active Player Cards while there is at least one Table Card dealt on that hand which has not been played, the player is permitted to deal himself or herself the Player Cards for the next hand at that time (i.e., ahead of schedule). For example, if during the first hand the player has no Active Player Cards remaining, and yet there are still two Table Cards dealt in the first hand that have not yet been played, the player may at that time deal himself or herself the 10 Player Cards that the player will attempt to discard during the second hand (and can now also be discarded during the remainder of the first hand, if the player has an opportunity to do so).

If during the first or second hand, a player has the right on a trick to discard Active Player Cards other than just the Border Matching Cards, and yet the player has fewer Active Player Cards remaining than the number of Active Player Cards that he or she is permitted to discard, a player can discard the permitted number of additional cards from the Player Cards dealt for the next hand. For example, if the last two Active Player Cards the player has during a hand are both Border Matching Cards of the Then Table Top Card played during a trick, a player can discard one of his or her Player Cards dealt for the next hand (and all of the Player Cards for the next hand will be dealt immediately to the player since the player has no remaining Active Player Cards).

If during the first or second hand, a player is not able to discard all of his or her Active Player Cards by the time that all of the Table Cards are played for that hand, the Active Player Cards that have not yet been discarded remain Active Player Cards, and the player can still attempt to discard them during remaining hands of the game.

Except where a player has already been dealt his or her Player Cards for a hand ahead of schedule (see above), under all other circumstances (including those discussed in the previous paragraph), the player is dealt his or her new Player Cards for a hand at the beginning of the hand (i.e., when the new Table Cards are dealt for a hand).

Scoring:

To win the game, the player must have 3 or fewer Active Player Cards at the end of the game. If the player has four or five Active Player Cards at the end of the game, the player is considered to have tied (rather than lost).

If a player has 1 Active Player Card at the end of the game, the player obtains a "Super Win."

If the player has no Active Player Cards at the end of the game, the player obtains the "Ultimate Win."

GeoPlunge Solo Border Match LV—1 Player

Playing the Game:

With regard to playing the game, all of the rules of Geo-Plunge Solo Border Match SV apply to GeoPlunge Solo Border Match LV, except as follows:

In GeoPlunge Solo Border Match LV, there are three rounds played, with each round being the equivalent of a full game of GeoPlunge Solo Border Match SV.

The GeoPlunge cards are reshuffled between rounds.

Once a card that is a Table Card during one round is played, it may no longer be used again in that round (but it will be used in subsequent rounds where it may be a Player Card or a Table Card, depending on whether it is dealt to the player or onto the table or other playing surface during the subsequent rounds).

In GeoPlunge Solo Border Match LV, an Active Player Card is a Player Card that has already been dealt to the player during that round that has not been discarded on an earlier trick either in that hand or an earlier hand in the round.

Scoring:

For each round in which the player has 4 or 5 Active Player Cards remaining at the end of the round, the player receives 10 points for that round.

For each round in which the player has 2 or 3 Active Player Cards remaining at the end of the round, the player receives 20 points.

For each round in which the player has 1 Active Player Card remaining at the end of the round, the player receives 30 points.

For each round in which the player has no Active Player Cards remaining at the end of the round, the player receives 40 points.

A player wins the game if the player has at least 50 points by the end of the game.

A player obtains a "Super Win" if the player has at least 80 points by the end of the game.

A player obtains the "Ultimate Win" if the player has 120 points by the end of the game.

GeoPlunge Solo Border Capital Match SV

To play the game, a player plays 3 hands, one hand at a time. The GeoPlunge cards are not reshuffled between hands.

The cards dealt to the player each hand will be referred to as the "Player Cards" and the cards dealt onto the table (or other playing surface) each hand will be referred to as the "Table Cards."

For each of the first two hands, the player deals 10 Player Cards and 10 Table Cards, and for the third hand the player deals 5 Player Cards and 5 Table Cards.

After the player deals the cards for a hand, the player may look at all of the Player Cards for that hand. The player may not look at the Table Cards for a hand at that time.

For each of the first two hands, 10 tricks are played during the hand. For the third hand, 5 tricks are played during the hand.

On each trick, the player turns face up (i.e., looks at) the then top card on the table (or other playing surface) out of the remaining (i.e., yet to be played) Table Cards dealt on that hand (the "Then Top Table Card"). A player may not turn face up a Table Card during a hand until it is time to play that Table Card (i.e., until it becomes the then top card dealt to the table or other playing surface that has yet to be played on that hand). Once a Table Card is played during a hand, it is not used again during the game.

For each trick, after the player turns face up the Then Top Table Card, the player determines whether he or she can discard any of his or her Active Player Cards. Active Player Cards are all Player Cards that have already been dealt to the player that have not been discarded on an earlier trick either in that hand or an earlier hand.

If none of the Active Player Cards are border states of the Then Top Table Card state played during a trick, and none of the Active Player Cards have as their state capital a state capital that begins with the same first letter as the state capital of the Then Top Table Card state played during a trick, the player cannot discard any Active Player Cards on that trick.

If exactly one of the Active Player Cards is a border state of the Then Top Table Card state played during a trick (a "Border Matching Card"), and none of the Active Player Cards have as their state capital a state capital that begins with the same first letter as the state capital of the Then Top Table Card state played during a trick, the player can discard only the Border Matching Card.

If none of the Active Player Cards is a Border Matching Card for a trick, and exactly one of the Active Player Cards has a state capital that begins with the same first letter as the state capital of the Then Top Table Card state played during a trick (a "First Letter Capital Matching Card"), the player can discard only the First Letter Capital Matching Card.

If exactly one of the Active Player Cards is a Border Matching Card on a trick, and exactly one of the Active Player Cards is a First Letter Capital Matching Card on that trick, the player can discard only the Border Matching Card and the First Letter Capital Matching Card on that trick (if the same card is the Border Matching Card and the First Letter Capital Matching Card, the player can discard only that card).

If exactly two of the Active Player Cards are Border Matching Cards for a trick, the player can discard both of the Border Matching Cards as well as one other Active Player Card, which other Active Player Card discarded is determined by the player at his or her sole discretion (this is in addition to any First Letter Capital Matching Cards the player can discard on that trick).

If exactly two of the Active Player Cards are First Letter Capital Matching Cards for a trick, the player can discard both of the First Letter Capital Matching Cards as well as one other Active Player Card, which other Active Player Card discarded is determined by the player at his or her sole discretion (this is in addition to any Border Matching Cards the player can discard on that trick).

If three or more of the Active Player Cards are Border Matching Cards for a trick, the player can discard two of the Border Matching Cards (and the player can determine which two to discard at his or her sole discretion) as well as one other Active Player Card then in the player's hand, which other Active Player Card discarded is determined by the player at his or her sole discretion (this is in addition to any First Letter Capital Matching Cards the player can discard on that trick).

If three or more of the Active Player Cards are First Letter Capital Matching Cards for a trick, the player can discard two of the First Letter Capital Matching Cards (and the player can determine which two to discard at his or her sole discretion) as well as one other Active Player Card then in the player's hand, which other Active Player Card discarded is determined by the player at his or her sole discretion (this is in addition to any Border Matching Cards the player can discard on that trick).

If during the first or second hand, a player is able to discard all of his or her Active Player Cards while there is at least one Table Card dealt on that hand which has not been played, the player is permitted to deal himself or herself the Player Cards for the next hand at that time (i.e., ahead of schedule). For example, if during the first hand the player has no Active Player Cards remaining, and yet there are still two Table Cards dealt in the first hand that have not yet been played, the player may at that time deal himself or herself the 10 Player Cards that the player will attempt to discard during the second hand (and can now also be discarded during the remainder of the first hand, if the player has an opportunity to do so).

If during the first or second hand, a player has the right on a trick to discard Active Player Cards other than just the Border Matching Cards or First Letter Capital Matching Cards, and yet the player has fewer Active Player Cards remaining than the number of Active Player Cards that he or she is permitted to discard, a player can discard the permitted number of additional cards from the Player Cards dealt for the next hand. For example, if the last two Active Player Cards the player has during a hand are both First Letter Capital Matching Cards of the Then Table Top Card played during a trick, a player can discard one of his or her Player Cards dealt for the next hand (and all of the Player Cards for the next hand will be dealt immediately to the player since the player has no remaining Active Player Cards).

If during the first or second hand, a player is not able to discard all of his or her Active Player Cards by the time that all of the Table Cards are played for that hand, the Active Player Cards that have not yet been discarded remain Active Player Cards, and the player can still attempt to discard them during remaining hands of the game.

Except where a player has already been dealt his or her Player Cards for a hand ahead of schedule (see above), under all other circumstances (including those discussed in the previous paragraph), the player is dealt his or her new Player Cards for a hand at the beginning of the hand (i.e., when the new Table Cards are dealt for a hand).

Scoring:

To win the game, the player must have 2 or fewer Active Player Cards at the end of the game. If the player has three Active Player Cards at the end of the game, the player is considered to have tied (rather than lost).

If a player has 1 Active Player Card at the end of the game, the player obtains a "Super Win."

If the player has no Active Player Cards at the end of the game, the player obtains the "Ultimate Win."

GeoPlunge Solo Border Capital Match LV—1 Player

Playing the Game:

With regard to playing the game, all of the rules of GeoPlunge Solo Border Capital Match SV apply to GeoPlunge Solo Border Capital Match LV, except as follows:

In GeoPlunge Solo Border Capital Match LV, there are three rounds played, with each round being the equivalent of a full game of GeoPlunge Solo Border Capital Match SV.

The GeoPlunge cards are reshuffled between rounds.

Once a card that is a Table Card during one round is played, it may no longer be used again in that round (but it will be used in subsequent rounds where it may be a Player Card or a Table Card, depending on whether it is dealt to the player or onto the table or other playing surface during the subsequent rounds).

In GeoPlunge Solo Border Capital Match LV, an Active Player Card is a Player Card that has already been dealt to the player during that round that has not been discarded on an earlier trick either in that hand or an earlier hand in the round.

Scoring:

For each round in which the player has 3 Active Player Cards remaining at the end of the round, the player receives 10 points for that round.

For each round in which the player has 2 Active Player Cards remaining at the end of the round, the player receives 20 points.

For each round in which the player has 1 Active Player Card remaining at the end of the round, the player receives 25 points.

For each round in which the player has no Active Player Cards remaining at the end of the round, the player receives 30 points.

A player wins the game if the player has at least 50 points by the end of the game.

A player obtains a "Super Win" if the player has at least 70 points by the end of the game.

A player obtains the "Ultimate Win" if the player has 90 points by the end of the game.

GeoPlunge Solo SSP Capital Match SV

To play the game, a player plays 3 hands, one hand at a time. The GeoPlunge cards are not reshuffled between hands.

The cards dealt to the player each hand will be referred to as the "Player Cards" and the cards dealt onto the table (or other playing surface) each hand will be referred to as the "Table Cards."

For each of the first two hands, the player deals 10 Player Cards and 10 Table Cards, and for the third hand the player deals 5 Player Cards and 5 Table Cards.

After the player deals the cards for a hand, the player may look at all of the Player Cards for that hand. The player may not look at the Table Cards for a hand at that time.

For each of the first two hands, 10 tricks are played during the hand. For the third hand, 5 tricks are played during the hand.

On each trick, the player turns face up (i.e., looks at) the then top card on the table (or other playing surface) out of the remaining (i.e., yet to be played) Table Cards dealt on that hand (the "Then Top Table Card"). A player may not turn face up a Table Card during a hand until it is time to play that Table Card (i.e., until it becomes the then top card dealt to the table or other playing surface that has yet to be played on that hand). Once a Table Card is played during a hand, it is not used again during the game.

For each trick, after the player turns face up the Then Top Table Card, the player determines whether he or she can discard any of his or her Active Player Cards. Active Player Cards are all Player Cards that have already been dealt to the player that have not been discarded on an earlier trick either in that hand or an earlier hand.

If none of the Active Player Cards are one higher or one lower in rank for Size, Statehood or Population than the Then Top Table Card state played during a trick, and none of the Active Player Cards have as their state capital a state capital that begins with the same first letter as the state capital of the Then Top Table Card state played during a trick, the player cannot discard any Active Player Cards on that trick.

If exactly one of the Active Player Cards is one higher or one lower in rank for Size, Statehood or Population than the Then Top Table Card state played during a trick (an "SSP Matching Card"), and none of the Active Player Cards have as their state capital a state capital that begins with the same first letter as the state capital of the Then Top Table Card state played during a trick, the player can discard only the SSP Matching Card.

If none of the Active Player Cards is an SSP Matching Card for a trick, and exactly one of the Active Player Cards has a state capital that begins with the same first letter as the state capital of the Then Top Table Card state played during a trick (a "First Letter Capital Matching Card"), the player can discard only the First Letter Capital Matching Card.

If exactly one of the Active Player Cards is an SSP Matching Card on a trick, and exactly one of the Active Player Cards is a First Letter Capital Matching Card on that trick, the player can discard only the SSP Matching Card and the First Letter Capital Matching Card on that trick (if the same card is the SSP Matching Card and the First Letter Capital Matching Card, the player can discard only that card).

If exactly two of the Active Player Cards are SSP Matching Cards for a trick, the player can discard both of the SSP Matching Cards as well as one other Active Player Card, which other Active Player Card discarded is determined by the player at his or her sole discretion (this is in addition to any First Letter Capital Matching Cards the player can discard on that trick).

If exactly two of the Active Player Cards are First Letter Capital Matching Cards for a trick, the player can discard both of the First Letter Capital Matching Cards as well as one other Active Player Card, which other Active Player Card discarded is determined by the player at his or her sole discretion (this is in addition to any SSP Matching Cards the player can discard on that trick).

If three or more of the Active Player Cards are SSP Matching Cards for a trick, the player can discard two of the SSP Matching Cards (and the player can determine which two to discard at his or her sole discretion) as well as one other Active Player Card then in the player's hand, which other Active Player Card discarded is determined by the player at his or her sole discretion (this is in addition to any First Letter Capital Matching Cards the player can discard on that trick).

If three or more of the Active Player Cards are First Letter Capital Matching Cards for a trick, the player can discard two of the First Letter Capital Matching Cards (and the player can determine which two to discard in his or her sole discretion) as well as one other Active Player Card then in the player's hand, which other Active Player Card discarded is determined by the player at his or her sole discretion (this is in addition to any SSP Matching Cards the player can discard on that trick).

If during the first or second hand, a player is able to discard all of his or her Active Player Cards while there is at least one Table Card dealt on that hand which has not been played, the player is permitted to deal himself or herself the Player Cards for the next hand at that time (i.e., ahead of schedule). For example, if during the first hand the player has no Active Player Cards remaining, and yet there are still two Table Cards dealt in the first hand that have not yet been played, the player may at that time deal himself or herself the 10 Player Cards that the player will attempt to discard during the second hand (and can now also be discarded during the remainder of the first hand, if the player has an opportunity to do so).

If during the first or second hand, a player has the right on a trick to discard Active Player Cards other than just the SSP Matching Cards or First Letter Capital Matching Cards, and yet the player has fewer Active Player Cards remaining than the number of Active Player Cards that he or she is permitted to discard, a player can discard the permitted number of additional cards from the Player Cards dealt for the next hand. For example, if the last two Active Player Cards the player has during a hand are both First Letter Capital Matching Cards of the Then Table Top Card played during a trick, a player can discard one of his or her Player Cards dealt for the next hand (and all of the Player Cards for the next hand will be dealt immediately to the player since the player has no remaining Active Player Cards).

If during the first or second hand, a player is not able to discard all of his or her Active Player Cards by the time that all of the Table Cards are played for that hand, the Active Player Cards that have not yet been discarded remain Active Player Cards, and the player can still attempt to discard them during remaining hands of the game.

Except where a player has already been dealt his or her Player Cards for a hand ahead of schedule (see above), under all other circumstances (including those discussed in the previous paragraph), the player is dealt his or her new Player Cards for a hand at the beginning of the hand (i.e., when the new Table Cards are dealt for a hand).

Scoring:

To win the game, the player must have 2 or fewer Active Player Cards at the end of the game. If the player has three Active Player Cards at the end of the game, the player is considered to have tied (rather than lost).

If a player has 1 Active Player Card by the end of the game, the player obtains a "Super Win."

If the player has no Active Player Cards by the end of the game, the player obtains the "Ultimate Win."

GeoPlunge Solo SSP Capital Match LV—1 Player

Playing the Game:

With regard to playing the game, all of the rules of GeoPlunge Solo SSP Capital Match SV apply to GeoPlunge Solo SSP Capital Match LV, except as follows:

In GeoPlunge Solo SSP Capital Match LV, there are three rounds played, with each round being the equivalent of a full game of GeoPlunge Solo SSP Capital Match SV.

The GeoPlunge cards are reshuffled between rounds.

Once a card that is a Table Card during one round is played, it may no longer be used again in that round (but it will be used in subsequent rounds where it may be a Player Card or a Table Card, depending on whether it is dealt to the player or onto the table or other playing surface during the subsequent rounds).

In GeoPlunge Solo SSP Capital Match LV, an Active Player Card is a Player Card that has already been dealt to the player during that round that has not been discarded on an earlier trick either in that hand or an earlier hand in the round.

Scoring:

For each round in which the player has 3 Active Player Cards remaining at the end of the round, the player receives 10 points for that round.

For each round in which the player has 2 Active Player Cards remaining at the end of the round, the player receives 20 points.

For each round in which the player has 1 Active Player Card remaining at the end of the round, the player receives 25 points.

For each round in which the player has no Active Player Cards remaining at the end of the round, the player receives 30 points.

A player wins the game if the player has at least 50 points by the end of the game.

A player obtains a "Super Win" if the player has at least 70 points by the end of the game.

A player obtains the "Ultimate Win" if the player has 90 points by the end of the game.

GeoPlunge Classroom Challenge Games

General Rules that Apply to All GeoPlunge Challenge Games

There are many GeoPlunge Classroom Challenge games, including the following variations: GeoPlunge Classroom Championship Challenge, GeoPlunge Classroom Win and Advance Challenge, GeoPlunge Classroom Two Team Challenge, and GeoPlunge Classroom Multi-Team Challenge. Both the GeoPlunge cards and the GeoChallenge cards are used in these games. The GeoPlunge cards and the GeoChallenge cards are shuffled at the beginning of the game. In certain games, they are also shuffled during the game as explained in the description of the individual games. Each game may be played with anywhere from 4 to 100 players. (Note: In other embodiments not described below, the number of cards each player receives may differ from those embodiments described below, the number of opportunities a player has to guess another player's card may also vary, as may the number of players who have opportunities to guess at a player's card. In addition, in some embodiments, country cards (such as GeoPlunge country cards) are used and in those instances players will try to guess the name of the country card held by other players).

GeoPlunge Classroom Championship Challenge—4 to 100 Players

Playing the Game and Determining the Winner:

If necessary, more than one GeoPlunge deck should be used in this game, depending on how many players are in the game. If there are 25 or fewer players, 1 GeoPlunge deck is used. If there are between 26 and 50 players, 2 GeoPlunge decks are used. If there are between 51 and 75 players, 3 GeoPlunge decks are used. If there are between 76 and 100 players, 4 GeoPlunge decks are used.

A player is eliminated from the game when the player does not have any GeoPlunge cards remaining and is not entitled to receive any bonus GeoPlunge cards (as described below). The last player to have GeoPlunge cards remaining is the champion, and the $2^{nd}$, $3^{rd}$ and $4^{th}$ to last players to have GeoPlunge cards remaining are the "near champions."

The teacher gives each student a player number so that one student is player no. 1, another student is player no. 2, another student is player no. 3, and so on.

Each player is dealt two GeoPlunge cards. Each player may look at his or her own GeoPlunge cards but may not look at any other player's GeoPlunge cards.

For each player, the object of the game is to try to guess what states are in each of the other players' hands while not having the other players correctly guess what states are held in your hand. As explained below, the GeoChallenge cards determine the clues that are given to help the players try to guess the states held in the other players' hands.

Throughout the game, the players take turns being the clue-giver (with player no. 1 being the first clue-giver, player no. 2 being the second clue-giver, and so on). At any time, the clue-giver is the person who is then giving a clue about one of his or her cards.

For each clue-giver, there is a "Guesser Player." Except for the player who has the highest player number assigned by the teacher, at the beginning of the game, for each clue-giver, the "Guesser Player" is the player whose player number is one higher than the clue-giver's player number. For example, at the beginning of the game when player no. 1 is the clue-giver, player no. 2 is the Guesser Player; when player no. 2 is the clue-giver, player no. 3 is the Guesser Player; when player no. 3 is the clue-giver, player no. 4 is the Guesser Player, and so on. At the beginning of the game, when the player with the highest player number assigned by the teacher is the clue-giver, player no. 1 is the Guesser Player.

The only time the Guesser Player for a clue-giver changes is when either that clue-giver or that Guesser Player is eliminated from the game. When a player is eliminated from the game, (1) the new Guesser Player, for the player whose Guesser Player was just eliminated, is the player who was the Guesser Player for the eliminated player; and, similarly, (2) the new clue-giver, for the player whose clue-giver was just eliminated, is the player who was the clue-giver for the eliminated player. An example is helpful here. If player no. 3 is eliminated from the game, thereafter (until player no. 2 or player no. 4 is eliminated) when player no. 2 is the clue-giver, the Guesser Player for player no. 2 is player no. 4. If later in the game, player no. 4 is also eliminated from the game, the new Guesser Player when player no. 2 is the clue-giver is player no. 5.

To start the game, player no. 1 is the first clue-giver and player no. 2 is the first Guesser Player. Immediately after a player is the Guesser Player, that player becomes the next clue-giver. Therefore, after player no. 1 is the clue-giver, player no. 2 will be the next clue-giver (and player no. 3 will then be the Guesser Player), and so on. If a player that is the Guesser Player is eliminated from the game, the player who would have been the next Guesser Player (were that other player not just eliminated) becomes the next clue-giver.

In this game, a player is only entitled to receive a bonus GeoPlunge card where the player otherwise meets the conditions to receive a bonus GeoPlunge card and the player is still in "First Phase." A player is in First Phase only where the player still has one or both of his original GeoPlunge cards. (A player that loses both of his original GeoPlunge cards is never considered to be in First Phase again during the game, including even where he or she receives one of his or her original GeoPlunge cards again as a bonus GeoPlunge card).

Where a player is entitled to receive one or more bonus GeoPlunge cards, the player shall receive those cards only at the time—and not before—that the player loses the last to be lost of his or her two original GeoPlunge cards dealt to the player. Accordingly, immediately after a player has lost both of his or her original GeoPlunge cards, where such player is entitled to receive one or more bonus GeoPlunge cards, the GeoPlunge cards then not in use are reshuffled and the player is dealt the bonus GeoPlunge cards (which are the then top GeoPlunge cards in the deck after the reshuffling).

At any time, if a player who is permitted to guess at the clue-giver's card guesses the state of that card correctly, the clue-giver must put that card back into the GeoPlunge deck.

Once a player loses both of his or her original GeoPlunge cards dealt, that player remains in the game only if by then the player is entitled to receive one or more bonus GeoPlunge cards (as explained below).

At any time during a game, if a player other than the clue-giver must "Discard," that means the player must put one of the GeoPlunge cards in his or hand back into the Geo-Plunge deck. If the player has more than one GeoPlunge card at that time, the player can decide which card to discard. If the player has only one card remaining at that time prior to the Discard, the player is eliminated from the game unless the player is entitled to receive any bonus GeoPlunge cards (see below).

For each player, when it is that player's turn to be a clue-giver, the manner in which the game is played varies depending upon whether it is a "Starting Turn" for that clue-giver or a "Repeat Turn" for that clue-giver, as those terms are defined below.

For each player, it is a Starting Turn for that player the first time during the game that the player is a clue-giver. For each player, it is also a Starting Turn for that player each time during the game that it is the player's turn to be the clue-giver where the player no longer has the card in which he or she gave clues on during the immediately preceding time that player was the clue-giver (either because that card was correctly guessed by another player or the player otherwise has since chosen or been forced to Discard that card).

For each player, it is a Repeat Turn for that player any time that the player is a clue-giver in which it is not a Starting Turn for that player.

Throughout the game, whoever's turn it is to be the Guesser Player picks the then top GeoChallenge card from the GeoChallenge card deck and reads that card for everyone to hear. A GeoChallenge card is placed face-up after it has been used, and the GeoChallenge card deck is reshuffled each time after all of the GeoChallenge cards have been used.

Throughout the game, after the Guesser Player picks the then top GeoChallenge card from the GeoChallenge card deck, the clue-giver gives a clue about one of his or her GeoPlunge cards (which clue is determined by the GeoChallenge card chosen). Some GeoChallenge cards indicate exactly what clue is to be given, other cards give the Guesser Player some option as to what clue to receive, and others give the clue-giver (referred to as the "Opponent" in the GeoChallenge cards) some option as to what clue to give.

Throughout the game, after the Guesser Player receives a clue from the clue-giver, the Guesser Player will try to guess the state of the clue-giver's card. Where the GeoChallenge card says "No Clue," that still counts as a clue for the "Guesser Player."

During each Starting Turn for a clue-giver, when the clue-giver is giving his or her first clue during that turn, the clue-giver (if he or she has more than one card in his or her hand at that time) may select which of the GeoPlunge cards in his or her hand to give the clue about, and may make this selection after the GeoChallenge card is read by the Guesser Player. Thereafter, for the remainder of the Starting Turn and any Repeat Turns, that clue-giver must give clues only about that same GeoPlunge card until another player correctly guesses the state of that card or the player otherwise has chosen or been forced to Discard that card. Whenever a clue-giver has more than one choice of which clue to give, the clue-giver must, if possible, give a clue that he or she has not given before for that GeoPlunge card during that game.

During each Starting Turn for a clue-giver, if the Guesser Player guesses the state of the clue-giver's card correctly after receiving the first clue, the Guesser Play is entitled to a bonus GeoPlunge card if the Guesser Player is still in First Phase.

During each Starting Turn for a clue-giver, if the Guesser Player guesses incorrectly after receiving the first clue a clue-giver gives about a GeoPlunge card, the Guesser Player picks the next top GeoChallenge card from the GeoChallenge card deck and the clue-giver gives the Guesser Player another clue as to that same GeoPlunge card (which clue is based on the new GeoChallenge card picked).

After the Guesser Player receives the second clue about the card during a Starting Turn, the Guesser Player tries to guess the state of the clue-giver's card again. If the Guesser Player guesses incorrectly after the second clue during a Starting Turn, the Guesser Player must "Discard."

During a Repeat Turn, the clue-giver must give one (not two) clues about the same card which no one guessed correctly during the Starting Turn and prior Repeat Turns, if any, which clue given will be determined by the GeoChallenge card then selected during that Repeat Turn by the Guesser Player for that clue-giver. On a Repeat Turn, the Guesser Player is not entitled to receive a bonus GeoPlunge card if the Guesser Player guesses correctly. On a Repeat Turn, if the Guesser Player guesses incorrectly after receiving the first clue during the Repeat Turn, the guesser player must Discard. Therefore, unlike during a Starting Turn, during a Repeat Turn, the Guesser Play receives only one clue.

During any Starting Turn in which the Guesser Play guesses incorrectly on both of his or her guesses, and during any Repeat Turn in which the Guesser Player guesses incorrectly on his or her one guess, except as provided below, each other player (beginning with the player who will be the next Guesser Player, followed by the player who would be the subsequent Guesser Player and so on) has an option to guess at that same GeoPlunge card (but does not receive any further clues) that the Guesser Player did not guess correctly, except that no more than two other players may take guesses at the card during any turn for a clue-giver. If a player opts to guess at the card and guesses incorrectly, that player must Discard. If a player opts to guess at the card and guesses correctly, that player is entitled to a bonus GeoPlunge card if that player is still in the First Phase. Where multiple decks are used, a player who is not the Guesser Player may not seek to guess the state of the clue-giver's card if that player knows or should know that he or she is also holding that same state card in his or her hand.

Where a player guesses the state of a card in the clue-giver's hand that is not the card for which the clue was given, that is considered an incorrect guess. For example, if a clue-giver has Arkansas and Wyoming in his or her hand, and gives a clue about Arkansas, and the Guesser Player or another player guesses Wyoming, that is considered an incorrect guess.

No player may talk during this game except where it is that player's turn to guess or give a clue. Any player that violates the rule must Discard, or, at the teacher's discretion, is eliminated from the game.

GeoPlunge Classroom Win and Advance Challenge—4 to 100 Players

Playing the Game and Determining the Winner:

The teacher divides the class into either 2, 3, 4, 5 or 6 groups with the same number of players in each group, or at most some groups having one more player than the other groups. The teacher determines the number of groups into which the players are divided.

For each group, there is a "Challenge Round", with group no. 1 playing the first Challenge Round, group no. 2 playing the second Challenge Round and so on.

During each group's Challenge Round, a player from a different group, chosen by the teacher, is the "moderator" for that Challenge Round.

During a Challenge Round, the moderator takes the top three cards in the GeoPlunge deck and looks at them. The moderator does not show the cards to any other player. The moderator then discards two of the cards and keeps one card. The card kept by the moderator is the "Selected Card."

The moderator then takes the top card in the GeoChallenge deck and reads it for everyone to hear. Some GeoChallenge cards indicate exactly what clue is to be given, other cards give the players guessing some option as to what clue to receive, and others give the moderator (referred to as the "Opponent" in the GeoChallenge cards) some option as to what clue to give.

If the GeoChallenge card gives the moderator an option as to what clue to give, the moderator makes the decision as to which clue to give. If the GeoChallenge card give the players some option as to what clue to receive (such GeoChallenge cards begin with the word "Choose"), the moderator will select one player from the group of players competing in that Challenge Round to determine the clue to be given (the moderator cannot choose the same player twice in a round to decide the clue to be given, unless all other players have already been chosen once during that round to decide what clue to be given).

After it is determined what clue is to be given, the moderator gives that clue for the Selected Card.

The first player in the group to guess the state of the Selected Card wins the Challenge Round. However, if a player guesses incorrectly, that player is eliminated from the Challenge Round (except that player can compete for second place in the Challenge Round if the teacher allows a second place competition for each Challenge Round).

The teacher should decide how it will be determined which player guesses first. For example, the teacher could decide the players will simply call out the state as quickly as they can if they believe they know the correct answer and whoever says it first (remember, players have only one guess) wins the Challenge Round, or the teacher could decide the players will raise their hands as quickly as they can if they believe they know the answer and whoever raises their hand first guesses first, followed by whoever raises their hand second, and so forth. The teacher may also choose any other method he or she desires to make this determination.

If no player competing in the Challenge Round guesses the Selected Card state correctly after the first clue, those players still competing in that Challenge Round (i.e., those who were not eliminated by guessing incorrectly), will receive a second clue (which will be determined by the moderator choosing the next GeoChallenge card in the deck and then giving a clue based on that GeoChallenge card).

This process continues until a player guesses the Selected Card correctly (in which case that player wins the Challenge Round) or every player but one has guessed incorrectly (in which case that remaining player wins the Challenge Round), except that if more than one player is remaining after four clues have been given and all guesses have been made by any player competing in that Challenge Round who wishes to guess, all players competing in that Challenge Round will be considered to have lost that Challenge Round.

For each group, whichever player wins the Challenge Round for that group becomes a Finalist, and competes in the Championship Round.

If a teacher wishes, after a player wins a Challenge Round, the same group competing in that Challenge Round (except for the player that won) can continue the Challenge Round (with the new moderator being the champion of that Challenge Round) to see who comes in second place in the Challenge Round. The same rules apply that applied in the initial phase of the Challenge Round (i.e., the moderator takes the next three cards in the GeoPlunge deck and looks at them without showing the cards to any other player; the moderator then discards two of the cards and keeps one card called the Selected Card; and the players still competing in that Challenge Round try to guess the Selected Card based on clues they receive, which are determined by the GeoChallenge cards picked by the moderator). Under that scenario, whoever wins the continuation of the Challenge Round (i.e., comes in second place in the entire Challenge Round) is also a Finalist and competes in the Championship Round.

After each Challenge Round, both the GeoPlunge cards and the GeoChallenge cards are reshuffled.

After all of the Challenge Rounds are played, the teacher chooses a new moderator for the Championship Round, and all Finalists compete in that round. That round is played the same way that the Challenge Rounds were played. The winner of the Championship Round is the champion. If the teacher wishes, once a champion is determined the champion can become the new moderator and all other Finalists can continue the Championship Round to determine who finishes in second place, using the same rules that were used to determine the champion.

No player may talk during this game except where expressly permitted by the rules. Any player that violates this rule should be penalized or eliminated from the game at the teacher's discretion.

GeoPlunge Classroom Two Team Challenge: 4 to 100 Players

Playing the Game:

The teacher divides the class into two teams with the same number of players on each team, or one team having at most one more player than the other team.

This game is played one round at a time. For the first round, one team (chosen by the teacher) deals itself and the other team three GeoPlunge cards. For each round thereafter, whichever team wins the round is the dealer for the next round.

For each team, the object of the game is to correctly guess all three states in the other team's hand before the other team correctly guesses all three states held in your team's hand.

After each team is dealt three GeoPlunge cards, the teams give each other clues about the GeoPlunge cards in their hands, and the GeoChallenge cards determine the clues that are given.

The teams take turns picking the top card in the GeoChallenge card deck. The team whose turn it is to guess picks and reads the GeoChallenge card. Some GeoChallenge cards indicate exactly what clue is to be given, other cards give the guessing team some option as to what clue to receive, and others give the team giving the clues (referred to as the "Opponent" in the GeoChallenge cards) some option as to what clue to give. A GeoChallenge card is placed at the bottom of the deck after it is used.

Each round, the team that is the dealer gives the first clue.

For each team, the first time in a round that the team gives a clue about one of their GeoPlunge cards, the team may select which of the three GeoPlunge cards to give the clue about, and may make this selection after the GeoChallenge card is read by the other team. Thereafter, the team must give clues only about that same GeoPlunge card until the other team correctly guesses the state of that card or the round is over. Once the state of a card is correctly guessed, the same rules apply to the second card in the clue-giver team's hand for which clues will be given.

Whenever a team giving clues has more than one choice of which clue to give, the team must, if possible, give a clue that they have not given before for that GeoPlunge card during that round.

Where a team guesses the state of a card in the other team's hand that is not the card for which the clue was given, that is considered an incorrect guess. For example, if a team has Arkansas, California and Wyoming in their hand, and they give a clue about Arkansas, and the other team guesses California or Wyoming, that is considered an incorrect guess.

The GeoPlunge cards and the GeoChallenge cards are reshuffled after each round.

Whenever more than one player on a team wishes to take an action on behalf of a team (e.g., guessing the answer, determining which clue to receive, determining which clue to give, or determining which card on which to give the clue), either the teacher (or the team captain if the teacher wishes to appoint team captains) will make the decision as to which player will act on behalf of the team at that time.

Scoring:

The first team to guess all three of the other team's GeoPlunge cards correctly in a round receives 10 points.

Fifteen bonus points are awarded if the team that wins the round correctly guesses all three of the other team's GeoPlunge cards before the other team has correctly guessed any of the winning team's GeoPlunge cards.

The first team to reach 50 points wins the game.

GeoPlunge Classroom Multi-Team Challenge: 4 to 100 Players

Playing the Game:

All of the rules of GeoPlunge Classroom Two Team Challenge apply, except as follows.

The teacher divides the class into 3, 4, 5 or 6 teams (whichever number of teams the teacher chooses) with the same number of players on each team, or some teams at most having one more player than the other teams.

Each round, the team that is the dealer will be the first clue-giver, followed by the team to the left of the dealing team, followed by the team second to the left of the dealing team, and so on.

Each team other than the team that is at that time the clue-giver gets to guess what the clue-giver team's card is until one of the other teams guesses correctly each team has had a chance to guess. If each team guesses incorrectly, that same GeoPlunge card will be guessed at next time by each team when it is the clue-giver team's turn to give a clue again, which turn will occur once all of the other teams have had their next turn giving a clue on one of their GeoPlunge cards.

The team to the immediate left of the clue-giver team picks the GeoChallenge card, is the first team to guess, and where the guessers have some choice as to what clue to receive based on the GeoChallenge card picked, is also the team that determines the clue for the guessers to receive (i.e., each team does not get to pick a separate GeoChallenge card; instead the teams guessing make their guess based on the GeoChallenge card picked by the team to the immediate left of the clue-giver team).

Once all of a team's GeoPlunge cards have been guessed correctly in a round, that team may no longer give clues but may still guess as to the GeoPlunge cards other team have. The winning team for a round is the last team to have any GeoPlunge cards remaining.

Scoring:

The team that wins the round receives 15 points, except that if that team has all three GeoPlunge cards remaining when every other team has none, that team receives 15 bonus points.

The next to last team to have any GeoPlunge cards remaining receives 8 points, and where there are four or more teams in the game, the third to last team to have any GeoPlunge cards remaining receives 3 points.

The first team to reach 50 points wins the game.

GeoPlunge Classroom Quick Series Games

General Rules that Apply to all GeoPlunge Classroom Quick Series Games

There are 5 GeoPlunge Classroom Series games: GeoPlunge Classroom Quick Border Series, GeoPlunge Classroom Quick SSP Series, GeoPlunge Classroom Quick First Letter Capital Series, GeoPlunge Classroom Quick Same Relations Capital Series, and GeoPlunge Classroom Quick Mixed Series. Only the GeoPlunge cards are used in these games. Each of these games may be played with anywhere from 10 to 100 players. (Note: In other variations of these games, the players may be dealt any different number of cards so long as each player is dealt at least two cards and all the players, other than the player to the dealer's left who receives one more card than the other players, receive the same number of cards. Where the cards used are the GeoPlunge country cards, these same types of games described below (which descriptions are based on use of the state cards) may be played and the types of groups that may be formed are, for example, the types of groups that may be formed for those GeoPlunge Series games described earlier that use country cards, such as the GeoPlunge country cards).

Playing the Games:

With two exceptions (described below), the players are divided into teams of 5 to 7 players each. Every team should have the same number of players, but if that is not possible then at most some teams should have one more player than the other teams.

If necessary, more than one GeoPlunge deck should be used, depending on how many players are in the game. If there are 16 or fewer players, 1 GeoPlunge deck is used. If there are between 17 and 33 players, 2 GeoPlunge decks are used. If there are between 34 and 50 players, 3 GeoPlunge decks are used. If there are between 51 and 66 players, 4 GeoPlunge decks are used. If there are between 67 and 83 players, 5 GeoPlunge decks are used. If there are between 84 and 100 players, 6 GeoPlunge decks are used.

A game consists of 4 rounds, played one round at a time. The GeoPlunge cards are shuffled at the beginning of the game and after each round.

Players on the same team should be in close proximity to each other (i.e., sitting or standing right near each other) while the game is played.

For each round, each player is dealt 3 GeoPlunge cards. No player may look at any of his or her cards (or anyone else's cards) until all players have been dealt their cards and the teacher says the "Starting Words" (which are different for each game; see under specific game descriptions below the Starting Words for each game). Once the teacher says the Starting Words, the players may look at their own cards and their teammates' cards, but not look at the cards of players on other teams. Players may talk to other players on their team throughout each round but may not talk to players on other teams.

Under no circumstances may a player give to any other player (including a player on his or her own team) or trade with any other player (including a player on his or her own team) any of that player's cards. If a player does so, his or her team automatically loses the round. (Teachers, if they wish to do so, may decide not to enforce this rule).

In each round, a player can only use one of his cards during that round (the "Selected Card" for that player), and each player may make the determination of which card to use at any time during the round. (In other variations, a player may be permitted to use more than one, or even all, of his or her cards (which each would be Selected Cards). Also, in other variations, the teacher may decide to increase or decrease the number of cards needed in the group).

If multiple decks are used, two or more players on the same team cannot choose the same state during a hand to be each player's Selected Card. For example, if two teammates are both dealt the Texas GeoPlunge card during a hand, at most one of those players can use the Texas card as that player's Selected Card for that hand.

The way in which a team wins a round differs for each game (see specific game descriptions below for how a team wins a round in that game).

The teacher will decide how a team announces it has won a round. It can be announced by having the team captain (which should vary per round) raise his or her hand, by having the team captain be the first team captain to sit in the "winning seat" in that round (which may be a chair chosen by the teacher to be used as the winning seat), or by any other method the teacher chooses.

Once a team announces it has won a round, all other teams must stop talking, and the team that announces it won must immediately show it has done so. If it has incorrectly announced it has won the round or cannot immediately show that it has won the round, that team automatically loses the round, and the other team wins the round (unless there is more than one other team remaining in which case the other teams continue the round, communicating once again among teammates).

If after 3 minutes (or any other period of time chosen by the teacher), no team has accurately announced that it has won the round, the teacher will announce that this round ended in a tie.

Scoring:
The winning team is team that has the most points at the end of the game.

All of the other scoring rules are game specific (see specific game descriptions below)

Specific Rules for each GeoPlunge Classroom Series Game will now be described in detail.

GeoPlunge Classroom Quick Border Series—14 to 100 Players

Playing the Game:
To begin each round, the teacher says the "Starting Words," which for GeoPlunge Classroom Quick Border Series is "GeoPlunge Borders."

In GeoPlunge Classroom Quick Border Series, to win the round a team must be the first team to accurately announce that it has a "3 Border Group" (as defined below).

A "3 Border Group" is a group of three players in which one player's Selected Card is a border state of each of the other two players' Selected Cards.

Scoring:
During the first two rounds, the team that wins the round receives 10 points. During the first two rounds, if the winning team has a "has a 3 All (defined below) it receives 5 bonus points.

During the third and fourth rounds, the team that wins the round receives 20 points. During those rounds, if the winning team has a "3 All" (defined below) it receives 10 bonus points.

A 3 All is a group of 3 players where each player's Selected Card is a border state of each of the other two player's Selected Cards.

GeoPlunge Classroom Quick SSP Series—14 to 100 Players

Playing the Game:
To begin each round, the teacher says the "Starting Words," which for GeoPlunge Classroom Quick SSP Series is "GeoPlunge SSP."

In GeoPlunge Classroom Quick SSP Series, to win the round a team must be the first team to accurately announce that it has a "3 SSP Group" (as defined below).

A "3 SSP Group" is a group of three players in which those three players' Selected Cards have successive ranks of Size, have successive ranks of Statehood, or have successive ranks of Population.

Scoring:
During the first two rounds, the team that wins the round receives 10 points. During the first two rounds, if the winning team has a "3 Zone All" (defined below) it receives 5 bonus points.

During the third and fourth rounds, the team that wins the round receives 20 points. During those rounds, if the winning team has a "3 Zone All" (defined below) it receives 10 bonus points.

A 3 Zone All is where all 3 Selected Cards in the 3 SSP Group are considered to be in the same time zone for the purposes of this game (see no. 4 below). That is, all of the states in that group must have color coded borders at the top of the card that all are red, or that all are green, or that are all are blue, or that all are purple.

The color coded border at the top of the GeoPlunge cards is red for eastern time zone states, green for central time zone states, blue for mountain time zone states and purple for Alaska, Hawaii and pacific time zone states (referred to as the pacific/other time zone for purposes of this game). For purposes of playing this game, if a state is located in two time zones, the state is considered to be in, and the color coded border reflects, the time zone most of the state is located in. (The portion of the state not in that time zone is shaded a different color in the state's picture near the bottom of the card so that the player is aware that the state is in two time zones, although that will not impact the playing of the game).

GeoPlunge Classroom Quick First Letter Capital Series—14 to 100 Players

Playing the Game:
To begin each round, the teacher says the "Starting Words," which for GeoPlunge Classroom Quick Capital Series is "GeoPlunge Capitals."

In GeoPlunge Classroom Quick Capital Series, to win the round a team must be the first team to accurately announce that it has a "3 Same First Letter Capitals Group" (as defined below).

A "3 Same First Letter Capitals Group" is a group of three players whose Selected Cards have state capitals that all begin with the same first letter.

Scoring:

During the first two rounds, the team that wins the round receives 10 points. During the first two rounds, if the winning team's winning group consists of cards that all have state capitals beginning with the letter D, or that all have state capitals beginning with the letter J, or that all have state capitals beginning with the letter L, or that all have state capitals beginning with the letter M, or that all have state capitals beginning with the letter P, or that all have state capitals beginning with the letter T, the team receives 5 bonus points.

During the third and fourth rounds, the team that wins the round receives 20 points. During those rounds, if the winning team's winning group consists of cards that all have state capitals beginning with the letter D, or that all have state capitals beginning with the letter J, or that all have state capitals beginning with the letter L, or that all have state capitals beginning with the letter M, or that all have state capitals beginning with the letter P, or that all have state capitals beginning with the letter T, the team receives 10 bonus points.

GeoPlunge Classroom Quick Same Relations Capital Series—14 to 100 Players

Playing the Game:

To begin each round, the teacher says the "Starting Words," which for GeoPlunge Classroom Capital Series is "GeoPlunge Capitals."

In GeoPlunge Classroom Capital Series, to win the round a team must be the first team to accurately announce that it has a "3 Same Relations Capital Group" (as defined below).

A "3 Same Relations Capital Group" is a group of three players whose Selected Cards are each the same in relation to the Top 3 Cities for their respective states (which is called "Same Relation Capitals"). That is, all of the cards in a 3 Same Relations Capital Group must be such that (a) all of the state capitals are Red Top Cities (which are called "Red Top City Capitals"); or (b) all of the state capitals are Blue Top Cities (which are called "Blue Top City Capitals"); or (c) all of the state capitals are Green Top Cities (which are called "Green Top City Capitals"); or (d) none of the state capitals is a Red Top City, Blue Top City or a Green Top City (which are called "No Top City Capitals").

Scoring:

During the first two rounds, the team that wins the round receives 10 points. During the first two rounds, if the winning team has Green Top City Capitals as its 3 Same Relations Capital Group it receives 5 bonus points.

During the third and fourth rounds, the team that wins the round receives 20 points. During those rounds, if the winning team has Green Top City Capitals as its 3 Same Relations Capital Group it receives 10 bonus points.

GeoPlunge Classroom Quick Mixed Series—14 to 100 Players

Playing the Game and Scoring:

A game consists of 4 rounds, played one at a time.

For the 1$^{st}$ round, all of the rules for playing the game and scoring of GeoPlunge Classroom Quick Border Series apply.

For the 2$^{nd}$ round, all of the rules for playing the game and scoring of GeoPlunge Classroom Quick SSP Series apply.

For the 3$^{rd}$ round, all of the rules for playing the game and scoring of GeoPlunge Classroom First Letter Capital Series apply.

For the final round, all of the rules for playing the game and scoring of GeoPlunge Classroom Same Relations Capital Series apply.

GeoPlunge Classroom Junior Games

GeoPlunge Classroom Junior Match Game—14 to 50 Players

Only the GeoPlunge cards are used in this game, and the GeoPlunge cards are reshuffled after every hand. This game can be played with anywhere from 14 to 50 players. (Note: In other embodiments of this game, students may be dealt more than one card each, or may be dealt country cards (such as GeoPlunge country cards) in which case the matches will relate to the type of matches used in those GeoPlunge Match games that use country cards.

Playing the Game and Scoring:

For this game, the teacher divides the class into teams, and, if possible, every team should have the same number of players, which number of players per team should be between 7 and 10 (and the teacher should make the decision as to whether the number of players on each team are 7, 8, 9, or 10 based on the goal of having each team have the same number of players). If it is impossible for each team to have the same number of players (which will be the case if there are 23 players playing, for example), then each hand the team or teams with one extra player will have a player sit out that hand (and it should be a different player each time so that no player should be sitting out very often).

The teacher will give each team a team number, such that one team will be team no. 1, another team will be team no. 2 and so forth. Before each hand begins, players on the same team should be in close proximity to each other (i.e., sitting or standing right near each other). In addition, each team should be placed in close proximity to the team that is one team number higher or lower than them.

This game is played one hand at a time. Team no. 1 is the dealer for the first hand. Thereafter, whichever team wins the hand is the team that deals on the next hand.

For each hand, one of the players on the team whose turn it is to be the dealer deals each player one GeoPlunge card (other than a player that may be sitting out that hand if one or more teams has an extra player). Team members should look at each other's cards, but no player should show his or her card to a player on another team.

For each hand, the number of tricks played during the hand equals the number of players playing for each team. For example, there will be 8 tricks per hand if there are 8 players on each team playing during a hand.

A trick consists of one player on each team, one at a time, playing his or her GeoPlunge card. A player plays his or her GeoPlunge card by walking to the front of the room, or other area of open space designated by the teacher, holding his or her GeoPlunge card for everyone to see with the teacher (or the student if the student is able) reading the name of the state on the card for everyone to hear.

On the first trick of each hand, the team that was the dealer for that hand will be the first team to have a player play his or her GeoPlunge card on that trick (this is called leading). Thereafter, for each other trick of a hand, the team that will lead on that trick (i.e., the first team to have a player play his or her GeoPlunge card on that trick) will be whichever team won the immediately preceding trick.

For each trick, after the team leading on the trick plays a card, the next team to play a card is the team whose team number is one number higher than the team that led, and the following team to play a card will be the team whose team number is one number higher than the second team to have thrown a card on that trick, and so on, except that after the team with the highest team number plays a card, the next team to play a card is team no. 1. For example, if team no. 3 leads on a trick and there are five teams in the game, team no. 4 will play a card next, followed by team no. 5, followed by team no. 1, followed by team no. 2.

For each trick, each team can play any card then remaining in that team's hand (a team cannot play any card that the team has already played on a prior trick in that hand; that is, each player will play his or her card on exactly one trick during the hand).

If there is any disagreement among team members as to which card should be played by the team on a trick, either the teacher will decide which card will be played (or, if there is a team captain, the team captain will decide). Where there is a team captain, the player who is the team captain should alternate after each hand.

After each trick, each of the players who played a card during that trick should sit or stand in a group together in a location near the team that won the trick so that everyone will remember which team won that trick.

The team that leads on a trick will win the trick only if none of the other teams play a card on that trick in which the color coded border at the top of the card played is the same color as the color coded border at the top of the card led on that trick. (The color coded border at the top of the GeoPlunge cards is red for eastern time zone states, green for central time zone states, blue for mountain time zone states and purple for Alaska, Hawaii and pacific time zone states (referred to as the pacific/other time zone for purposes of this game). For purposes of playing this game, if a state is located in two time zones, the state is considered to be in, and the color coded border reflects, the time zone most of the state is located in. (The portion of the state not in that time zone is shaded a different color in the state's picture near the bottom of the card so that the player is aware that the state is in two time zones, although that will not impact the playing of the game)).

If only one team, who did not lead on the trick, plays a card on the trick in which the color coded border at the top of the card played is the same color as the color coded border at the top of the card led, that team wins the trick. If two or more teams play such a card on the trick, the last team to play such a card on the trick wins the trick.

The team that wins the most tricks during the hand wins the hand. If two or more teams tie for the most tricks won during a hand, the team that took the last trick among the teams that tied, wins the hand. Whichever team wins the hand receives 10 points.

Where there are exactly two teams, if one team wins all but one or two of the tricks during a hand, that team is considered to have a "super win" for that hand. Where there are three or more teams, if one team wins the majority of tricks during the hand, that team is considered to have a "super win" for that hand. If a team has a "super win" for a hand, that team receives 10 bonus points (i.e., 20 points total).

If one team wins all of the tricks during the hand, that team is considered to have the "ultimate win" for that hand. If a team has an "ultimate win" for a hand, that team receives 30 bonus points (i.e., 40 points total).

The first team to reach 50 points wins the game (or, if the teacher prefers, whichever team has the most points at the time the teacher decides the game has ended wins the game).

GeoPlunge Classroom Junior Series Game: 14 to 100 Players

Only the GeoPlunge cards are used in this game. This game may be played with anywhere from 14 to 100 players. In other embodiments of this game, different numbers of GeoPlunge cards may be used or dealt or needed to form groups (and the number of groups necessary may be different), and in some embodiments country cards (such as GeoPlunge country cards) are used in which instance groupings may be based on continents instead of time zones.

Playing the Game:

With two exceptions (described below), the players are divided into teams of 9 to 12 players each. Every team should have the same number of players, but if that is not possible then at most a team should have one more player than the other teams.

Unless there are fewer than 18 players in the game (in which case at least 1 team will have 8 players or less), no team should have less than 9 players. Unless there are exactly 25 or 26 players (in which case at least 1 team will have 13 players), no team should have more than 12 players.

If there are 26 or fewer players, the teacher should divide the class into 2 teams. If there are more than 26 players, the teacher should divide the class into the greatest number of teams that are possible with at least 9 players being on each team. Therefore, there would be 3 teams if there are between 27 and 35 players; 4 teams if there are between 36 and 44 players; 5 teams if there are between 45 and 53 players; and so on.

If necessary, more than one GeoPlunge deck should be used, depending on how many players are in the game. If there are 25 or fewer players, 1 GeoPlunge deck is used. If there are between 26 and 50 players, 2 GeoPlunge decks are used. If there are between 51 and 75 players, 3 GeoPlunge decks are used. If there are between 76 and 100 players, 4 GeoPlunge decks are used.

A game consists of 4 rounds, played one round at a time. The GeoPlunge cards are shuffled at the beginning of the game and after each round.

Players on the same team should be in close proximity to each other (i.e., sitting or standing right near each other) while the game is played.

For each round, each player is dealt 2 GeoPlunge cards. No player may look at any of his or her cards (or anyone else's cards) until all players have been dealt their cards and the teacher says "GeoPlunge Time Zones." Once the teacher says GeoPlunge Time Zones, the players may look at their own cards and their teammates' cards, but not at the cards of players on other teams. Players may talk to other players on their team throughout each round but may not talk to players on other teams.

Under no circumstances may a player trade any cards with any other player (including a player on his or her own team). If a player does so, his or her team automatically loses the round. (Teachers may, if they wish, disregard this rule).

In each round, a player can only use one of his cards during that round (the "Selected Card"), and each player may make the determination of which card to use at any time during the round. Where multiple decks are used, two players on the same team who were each dealt the same card (e.g., they were both dealt the California card) cannot both choose that card to be the Selected Card.

To win the round, a team must be the first team to accurately announce that it has a "4 Time Zone Group" and a "3 Time Zone Group" (as each are defined below).

A "4 Time Zone Group" is a group of four players in which those four players' Selected Cards all have the same color coded border at the top of the card. (The color coded border at the top of the GeoPlunge cards is red for eastern time zone states, green for central time zone states, blue for mountain time zone states and purple for Alaska, Hawaii and pacific time zone states (referred to as the pacific/other time zone for purposes of this game). For purposes of playing this game, if a state is located in two time zones, the state is considered to be in, and the color coded border reflects, the time zone most of the state is located in. (The portion of the state not in that time zone is shaded a different color in the state's picture near the bottom of the card so that the player is aware that the state is in two time zones, although that will not impact the playing of the game)).

A "3 Time Zone Group" is a group of three players in which those three players' Selected Cards all have the same color coded border at the top of the card.

No player's Selected Card can be used in both groups.

To win a round, a team must not only have a 4 Time Zone Group and a 3 Time Zone Group but in addition (1) the color coded border at the top of each of the cards in the 4 Time Zone Group must be different than the color coded border of each of the cards in the 3 Time Zone Group; and (2) at least one of the two groups must have color coded borders that are all blue or that are all purple.

The teacher will decide how a team announces it has won a round. It can be announced by having the team captain (which should vary per round) raise his or her hand, by having the team captain be the first team captain to sit in the "winning seat" in that round (which may be a chair chosen by the teacher to be used as the winning seat), or by any other method the teacher chooses.

Once a team announces it has won a round, all other teams must stop talking, and the team that announces it won must immediately show it has done so. If it has incorrectly announced it has won the round or cannot immediately show that it has won the round, that team automatically loses the round, and the other team wins the round (unless there is more than one other team remaining in which case the other teams continue the round, communicating once again among teammates).

If after 3 minutes (or any other period of time chosen by the teacher), no team has accurately announced that it has won the round, the round ends in a tie.

Scoring:

During the first two rounds, the team that wins the round receives 10 points. During the first two rounds, if the 4 Time Zone Group for the winning team for the round consists of Selected Cards that all have purple color coded borders at the top, that team receives 10 bonus points, and if the 4 Time Zone Group for the winning team consists of Selected Cards that all have blue color coded borders at the top, that team receives 5 bonus points.

During the third and fourth rounds, the team that wins the round receives 20 points. During the third and fourth rounds, if the 4 Time Zone Group for the winning team for the round consists of Selected Cards that all have purple color coded borders at the top, that team receives 20 bonus points, and if the 4 Time Zone Group for the winning team consists of Selected Cards that all have blue color coded borders at the top, that team receives 10 bonus points.

The winning team is the team that has the most points at the end of the game.

Example embodiments of the present invention have now been described in accordance with the above advantages. It will be appreciated that these examples are merely illustrative of the invention. Many variations and modifications will be apparent to those skilled in the art.

The invention claimed is:

1. A computer assisted method for playing a card game via a processing device, the method comprising:
   dealing, via the processing device, a plurality of geopolitical entity cards from a set of geopolitical entity cards to each of a group of at least two players, such that each player has a player hand of geopolitical cards;
   receiving via the processing device, from each player, identification of at least two matching cards from each player hand, wherein receiving identification of at the at least two matching cards includes receiving at least one selected from a group consisting of:
   each of the at least two matching cards having a common geographic border, and
   each of the at least two matching cards including at least three matching cards,
   wherein each of the at least three matching cards having a common border with at least one of the other of the at least three matching cards;
   the processing device determining which of the group of at least two players first identifies the at least two matching cards from the player hand; and
   awarding a score to the first of the at least two players that first identifies the at least two matching cards from the player hand.

2. A computer assisted method for playing a card game via a processing device, the method comprising:
   dealing, via the processing device, a plurality of geopolitical entity cards from a set of geopolitical entity cards to a player, such that the player has a player hand of geopolitical cards;
   receiving via the processing device, from the player, identification of at least two matching cards from the player hand, wherein receiving identification of at the at least two matching cards includes receiving at least one selected from a group consisting of:
   each of the at least two matching cards having a common geographic border, and
   each of the at least two matching cards including at least three matching cards, wherein each of the at least three matching cards having a common border with at least one of the other of the at least three matching cards;
   the processing device determining whether the player identified the at least two matching cards from the player hand within a preset time period; and
   the processing device awarding a score to the player if the player identified the at least two matching cards from the player hand prior to expiration of the preset time period.

* * * * *